US012602033B2

(12) United States Patent
Negi et al.

(10) Patent No.: US 12,602,033 B2
(45) Date of Patent: Apr. 14, 2026

(54) MONITORING AND CONTROL PLATFORM FOR INDUSTRIAL EQUIPMENT WITH EXTENSIBLE DATA MODEL

(71) Applicant: ROCKWELL AUTOMATION TECHNOLOGIES, INC., Mayfield Heights, OH (US)

(72) Inventors: Abhishek Negi, Mayfield Heights, OH (US); Douglas D. Fisher, Mayfield Heights, OH (US); Jennifer M. Kite, Mayfield Heights, OH (US); Ajai Singh, Mayfield Heights, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 331 days.

(21) Appl. No.: 18/373,775

(22) Filed: Sep. 27, 2023

(65) Prior Publication Data

US 2025/0103030 A1 Mar. 27, 2025

(51) Int. Cl.
*G05B 19/418* (2006.01)

(52) U.S. Cl.
CPC . *G05B 19/41865* (2013.01); *G05B 19/41885* (2013.01)

(58) Field of Classification Search
CPC .................... G05B 19/41865; G05B 19/41885
USPC .......................................................... 700/97
See application file for complete search history.

(56) References Cited

U.S. PATENT DOCUMENTS

| | | | |
|---|---|---|---|
| 10,528,700 B2 * | 1/2020 | Thomsen | ........... G05B 19/4183 |
| 10,732,810 B1 * | 8/2020 | Cohen | ................... G06F 16/235 |
| 11,906,950 B1 * | 2/2024 | McCormick | ....... G05B 19/4183 |
| 11,909,752 B1 * | 2/2024 | Kapoor | ................. H04L 67/306 |
| 11,954,112 B2 * | 4/2024 | Siebel | ....................... G06F 8/35 |
| 2003/0220709 A1 | 11/2003 | Hartman et al. | |
| 2009/0143873 A1 | 6/2009 | Navratil et al. | |
| 2009/0149981 A1 | 6/2009 | Evans et al. | |
| 2012/0016528 A1 | 1/2012 | Raman et al. | |
| 2012/0029720 A1 | 2/2012 | Cherian et al. | |
| 2012/0079461 A1 | 3/2012 | Copass et al. | |

(Continued)

OTHER PUBLICATIONS

Non-Final Office Action for U.S. Appl. No. 18/373,714, dated Dec. 22, 2025.

(Continued)

*Primary Examiner* — Md Azad
(74) *Attorney, Agent, or Firm* — Foley & Lardner LLP

(57) ABSTRACT

A system and method for monitoring and controlling an industrial process using a data model extensible to different industry applications. The system is configured to: receive data describing the industrial process from one or more data sources in a first format; contextualize and transform the data by determining one or more tags for the data, the one or more tags comprising context information describing characteristics of the entities involved in the industrial process; generate a data model describing the industrial process based on the one or more tags; receive a first indication from a user indicating a first industry application to which the data model will be applied; and extend the data model to include a second plurality of nodes representing entities associated with the first industry application and a second plurality of edges connecting the second plurality of nodes and describing relationships between the second plurality of nodes.

20 Claims, 33 Drawing Sheets

(56)     References Cited

U.S. PATENT DOCUMENTS

| | | | |
|---|---|---|---|
| 2014/0277806 A1 | 9/2014 | Keller et al. | |
| 2016/0092820 A1* | 3/2016 | Ebel | G05B 19/41885 |
| | | | 705/7.41 |
| 2020/0265329 A1* | 8/2020 | Thomsen | G06N 20/10 |
| 2022/0068440 A1 | 3/2022 | Mrziglod et al. | |
| 2022/0107630 A1 | 4/2022 | Zope et al. | |
| 2022/0137569 A1* | 5/2022 | Paulson | G06N 3/0895 |
| 2022/0187894 A1 | 6/2022 | Wang et al. | |
| 2022/0260271 A1 | 8/2022 | Sikora et al. | |
| 2023/0266733 A1 | 8/2023 | Chillar et al. | |
| 2024/0004355 A1 | 1/2024 | Zhao et al. | |

OTHER PUBLICATIONS

Non-Final Office Action for U.S. Appl. No. 18/373,631, dated Jan. 23, 2026.
Non-Final Office Action for U.S. Appl. No. 18/373,752, dated Jan. 5, 2026.

* cited by examiner

600

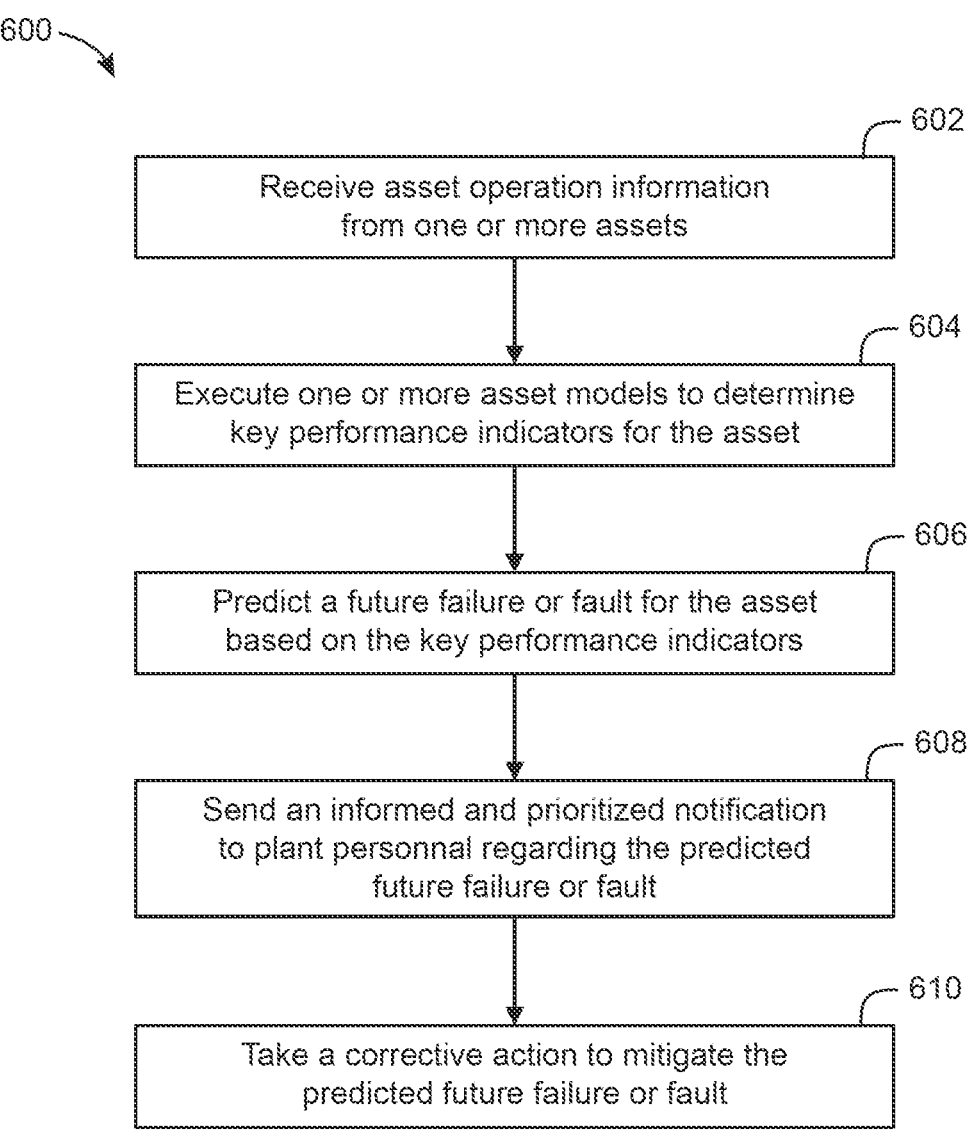

602

Receive asset operation information
from one or more assets

604

Execute one or more asset models to determine
key performance indicators for the asset

606

Predict a future failure or fault for the asset
based on the key performance indicators

608

Send an informed and prioritized notification
to plant personnal regarding the predicted
future failure or fault

610

Take a corrective action to mitigate the
predicted future failure or fault

FIG. 6

Unified Asset Performance Management

Overview ▸ Health Summary ▸ Advisory Summary

Advisory Summary

| Unique ID | Functional Location | Asset ID | Change Point | Start Date | Description | Status |
|-----------|---------------------|----------|--------------|------------|-------------|--------|
| ADV000005 | RO_IO_PR_BM_BM002_Motor | I000006 | 10-20-2022 | 10-29-2022 | Motor Fault | Inprogress |
| ADV000006 | RO_IO_PR_BM_BM002_Lubesystem | I000006 | 10-20-2022 | 10-29-2022 | Lube System FaultOpen | |
| ADV000007 | RO_IO_PR_BM_BM002_Motor | I000006 | 10-20-2022 | 10-29-2022 | Motor Fault | Open |

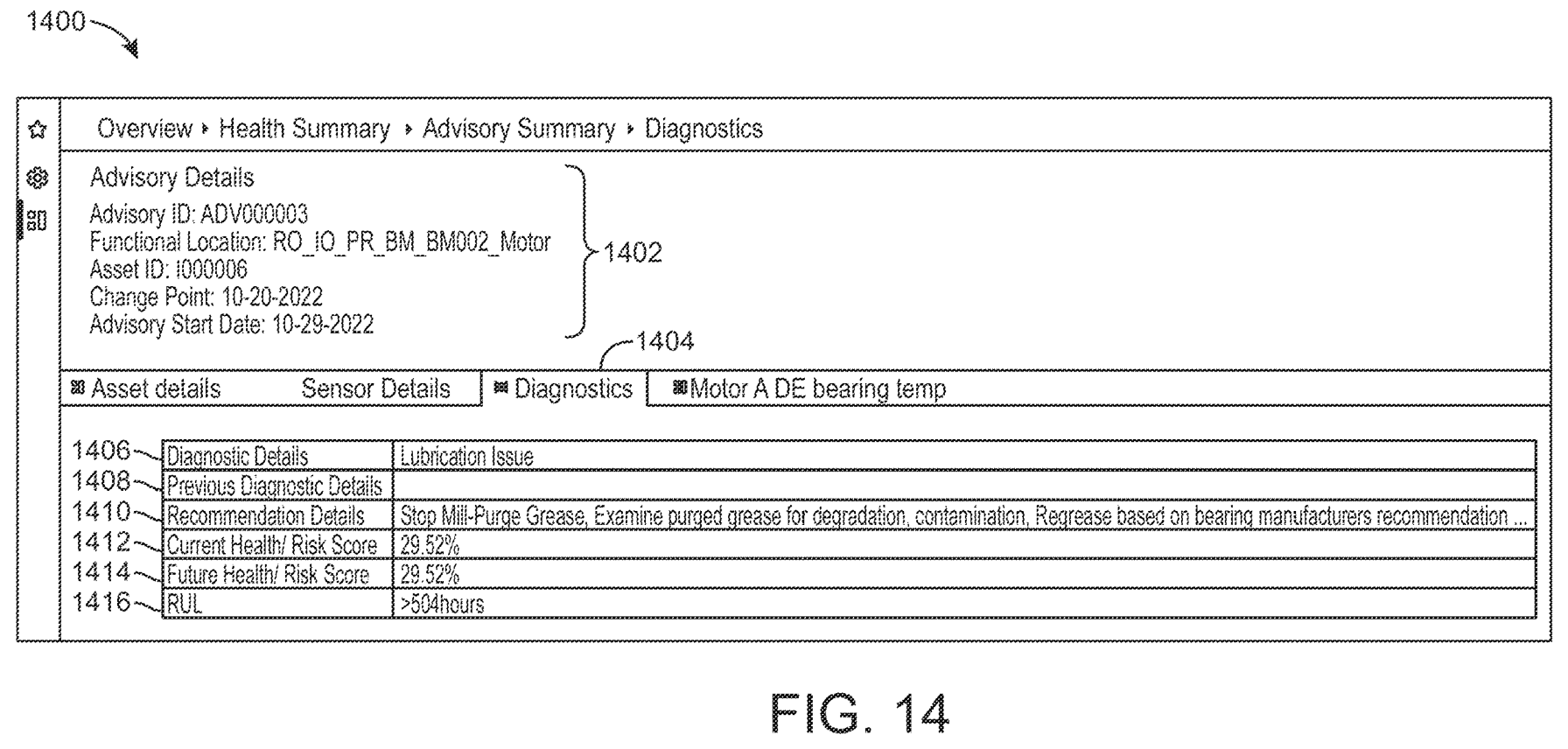

Overview ▸ Health Summary ▸ Advisory Summary ▸ Diagnostics

Advisory Details

Advisory ID: ADV000003
Functional Location: RO_IO_PR_BM_BM002_Motor
Asset ID: i000006    }1402
Change Point: 10-20-2022
Advisory Start Date: 10-29-2022

▦ Asset details    Sensor Details    ▯ Diagnostics    ▦ Motor A DE bearing temp

— 1404

| | Diagnostics |
|---|---|
| 1406 — Diagnostic Details | Lubrication Issue |
| 1408 — Previous Diagnostic Details | |
| 1410 — Recommendation Details | Stop Mill-Purge Grease. Examine purged grease for degradation, contamination. Regrease based on bearing manufacturers recommendation ... |
| 1412 — Current Health/ Risk Score | 29.52% |
| 1414 — Future Health/ Risk Score | 29.52% |
| 1416 — RUL | >504hours |

FIG. 14

MONITORING AND CONTROL PLATFORM FOR INDUSTRIAL EQUIPMENT WITH EXTENSIBLE DATA MODEL

BACKGROUND

The present disclosure relates generally to an extensible data model which can be applied to multiple applications to a variety of industry areas.

SUMMARY

One implementation of the present disclosure is a system for monitoring and controlling an industrial process using a data model extensible to different industry applications, the system including one or more memory devices configured to store instructions, that, when executed by the one or more processors, cause the one or more processors to: receive data describing the industrial process from one or more data sources in a first format; contextualize and transform the data by determining one or more tags for the data, the one or more tags including context information describing characteristics of the entities involved in the industrial process and relationships between the entities; generate a data model describing the industrial process based on the one or more tags, wherein the data model is a graph data structure including: a first plurality of nodes representing entities associated with the industrial process; and a first plurality of edges connecting the first plurality of nodes and describing relationships between the first plurality of nodes, wherein at least one of the first plurality of nodes or the first plurality of edges are generated using the context information; receive a first indication from a user indicating a first industry application to which the data model will be applied; and extend the data model to include a second plurality of nodes representing entities associated with the first industry application and a second plurality of edges connecting the second plurality of nodes and describing relationships between the second plurality of nodes.

Another implementation relates to a method for monitoring and controlling an industrial process using a data model extensible to different industry applications. The method includes receiving data describing the industrial process from one or more data sources in a first format; contextualizing and transform the data by determining one or more tags for the data, the one or more tags including context information describing characteristics of the entities involved in the industrial process and relationships between the entities; generating a data model describing the industrial process based on the one or more tags, wherein the data model is a graph data structure including: a first plurality of nodes representing entities associated with the industrial process; and a first plurality of edges connecting the first plurality of nodes and describing relationships between the first plurality of nodes, wherein at least one of the first plurality of nodes or the first plurality of edges are generated using the context information; receiving a first indication from a user indicating a first industry application to which the data model will be applied; and extending the data model to include a second plurality of nodes representing entities associated with the first industry application and a second plurality of edges connecting the second plurality of nodes and describing relationships between the second plurality of nodes.

Another implementation relates to a non-transitory computer readable medium having computer-executable instructions embodied therein that, when executed by at least one processor of a computing system, cause the computing system to perform operations, the operations including: receiving data describing the industrial process from one or more data sources in a first format; contextualizing and transform the data by determining one or more tags for the data, the one or more tags including context information describing characteristics of the entities involved in the industrial process and relationships between the entities; generating a data model describing the industrial process based on the one or more tags, wherein the data model is a graph data structure including: a first plurality of nodes representing entities associated with the industrial process; and a first plurality of edges connecting the first plurality of nodes and describing relationships between the first plurality of nodes, wherein at least one of the first plurality of nodes or the first plurality of edges are generated using the context information; receiving a first indication from a user indicating a first industry application to which the data model will be applied; and extending the data model to include a second plurality of nodes representing entities associated with the first industry application and a second plurality of edges connecting the second plurality of nodes and describing relationships between the second plurality of nodes.

One implementation of the present disclosure is a method for monitoring and controlling industrial assets to mitigate predicted future faults, the method including: receiving, by a processing circuit, data describing an asset from one or more data sources; generating, by the processing circuit, an asset data model based on the received data; receiving, by the processing circuit, an extensible data model describing an organizational structure of an enterprise associated with the asset; extending, by the processing circuit, the extensible data model to include the asset models executing, by the processing circuit, the extensible data model including the asset models to determine one or more key performance indicators for the asset; predicting, by the processing circuit, a future fault for the asset based on the key performance indicators; sending, by the processing circuit, an informed and prioritized notification to plant personnel regarding the predicted fault; and taking a corrective action to mitigate the predicted future fault.

Another implementation relates to a non-transitory computer readable medium having computer-executable instructions embodied therein that, when executed by at least one processor of a computing system, cause the computing system to perform operations, the operations including: receiving data describing an asset from one or more data sources; generating, by the processing circuit, an asset data model based on the received data; receiving an extensible data model describing an organizational structure of an enterprise associated with the asset; extending, by the processing circuit, the extensible data model to include the asset models executing the extensible data model including the asset models to determine one or more key performance indicators for the asset; predicting a future fault for the asset based on the key performance indicators; sending an informed and prioritized notification to plant personnel regarding the predicted fault; and taking a corrective action to mitigate the predicted future fault.

Another implementation relates to a system for monitoring and controlling industrial assets to mitigate predicted future faults. The system including one or more memory devices configured to store instructions, that, when executed by the one or more processors, cause the one or more processors to: receive data describing an asset from one or more data sources, generate an asset data model based on the received data, receive an extensible data model describing an organizational structure of an enterprise associated with the asset, extend the extensible data model to include the asset models, execute the extensible data model including the asset models to determine one or more key performance indicators for the asset, predict a future fault for the asset based on the key performance indicators, send an informed and prioritized notification to plant personnel regarding the predicted fault, take a corrective action to mitigate the predicted future fault.

One implementation of the present disclosure is a method for monitoring and controlling production of batches of products in an industrial process, the method including: receiving, by a processing circuit, data describing a batch of products generated in an industrial process from one or more data sources; contextualizing, by the processing circuit, the data describing the batch of products generated in the industrial process; generating, by the processing circuit, a batch data model based on the contextualized data; executing, by the processing circuit, the batch data model to determine key performance indicators for the batch of products; comparing, by the processing circuit, the key performance indicators to pre-determined key performance indicators; and performing an automated action based on a result of the comparison.

Another implementation relates to a non-transitory computer readable medium having computer-executable instructions embodied therein that, when executed by at least one processor of a computing system, cause the computing system to perform operations, the operations including: receiving data describing a batch of products generated in an industrial process from one or more data sources; contextualizing the data describing the batch of products generated in the industrial process; generating a batch data model based on the contextualized data; executing the batch data model to determine key performance indicators for the batch of products; comparing the key performance indicators to pre-determined key performance indicators; and performing an automated action based on a result of the comparison.

Another implementation relates to a system for monitoring and controlling production of batches of products in an industrial process. The system including one or more memory devices configured to store instructions, that, when executed by the one or more processors, cause the one or more processors to: receiving data describing a batch of products generated in an industrial process from one or more data sources; contextualizing the data describing the batch of products generated in the industrial process; generating a batch data model based on the contextualized data; executing the batch data model to determine key performance indicators for the batch of products; comparing the key performance indicators to pre-determined key performance indicators; and performing an automated action based on a result of the comparison.

One implementation of the present disclosure is a method for monitoring and controlling energy use in an industrial process, the method including: receiving, by a processing circuit, data describing energy use in an industrial process from one or more data sources; contextualizing, by the processing circuit, the data describing the energy use in an industrial process; generating, by the processing circuit, an energy data model based on the contextualized data; executing, by the processing circuit, the energy data model to determine key performance indicators for the energy use in an industrial process; displaying, by the processing circuit, the key performance indicators to a user; determining, by the processing circuit, if the key performance indicators are above one or more pre-determined thresholds; and taking a corrective action in response to the key performance indicators being above the one or more pre-determined thresholds.

Another implementation relates to a non-transitory computer readable medium having computer-executable instructions embodied therein that, when executed by at least one processor of a computing system, cause the computing system to perform operations, the operations including: receiving data describing energy use in an industrial process from one or more data sources; contextualizing the data describing the energy use in an industrial process; generating, by the processing circuit, an energy data model based on the contextualized data; executing, by the processing circuit, the energy data model to determine key performance indicators for the energy use in an industrial process; displaying the key performance indicators to a user; determining if the key performance indicators are above one or more pre-determined thresholds; and taking a corrective action in response to the key performance indicators being above the one or more pre-determined thresholds.

Another implementation relates to a system for method for monitoring and controlling energy use in an industrial process. The system including one or more memory devices configured to store instructions, that, when executed by the one or more processors, cause the one or more processors to: receiving data describing energy use in an industrial process from one or more data sources; contextualizing the data describing the energy use in an industrial process; generating, by the processing circuit, an energy data model based on the contextualized data; executing, by the processing circuit, the energy data model to determine key performance indicators for the energy use in an industrial process; displaying the key performance indicators to a user; determining if the key performance indicators are above one or more pre-determined thresholds; and taking a corrective action in response to the key performance indicators being above the one or more pre-determined thresholds.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE FIGURES

The disclosure will become more fully understood from the following detailed description, taken in conjunction with the accompanying figures, wherein like reference numerals refer to like elements, in which:

FIG. 6 is a flow diagram of a method implemented by the asset intelligence management system of FIG. 5, according to some embodiments.

FIGS. 10-15 are example user interfaces showing various dashboards and graphical illustrations of the asset management system of FIG. 5, according to some embodiments.

DETAILED DESCRIPTION

Figure 1A:
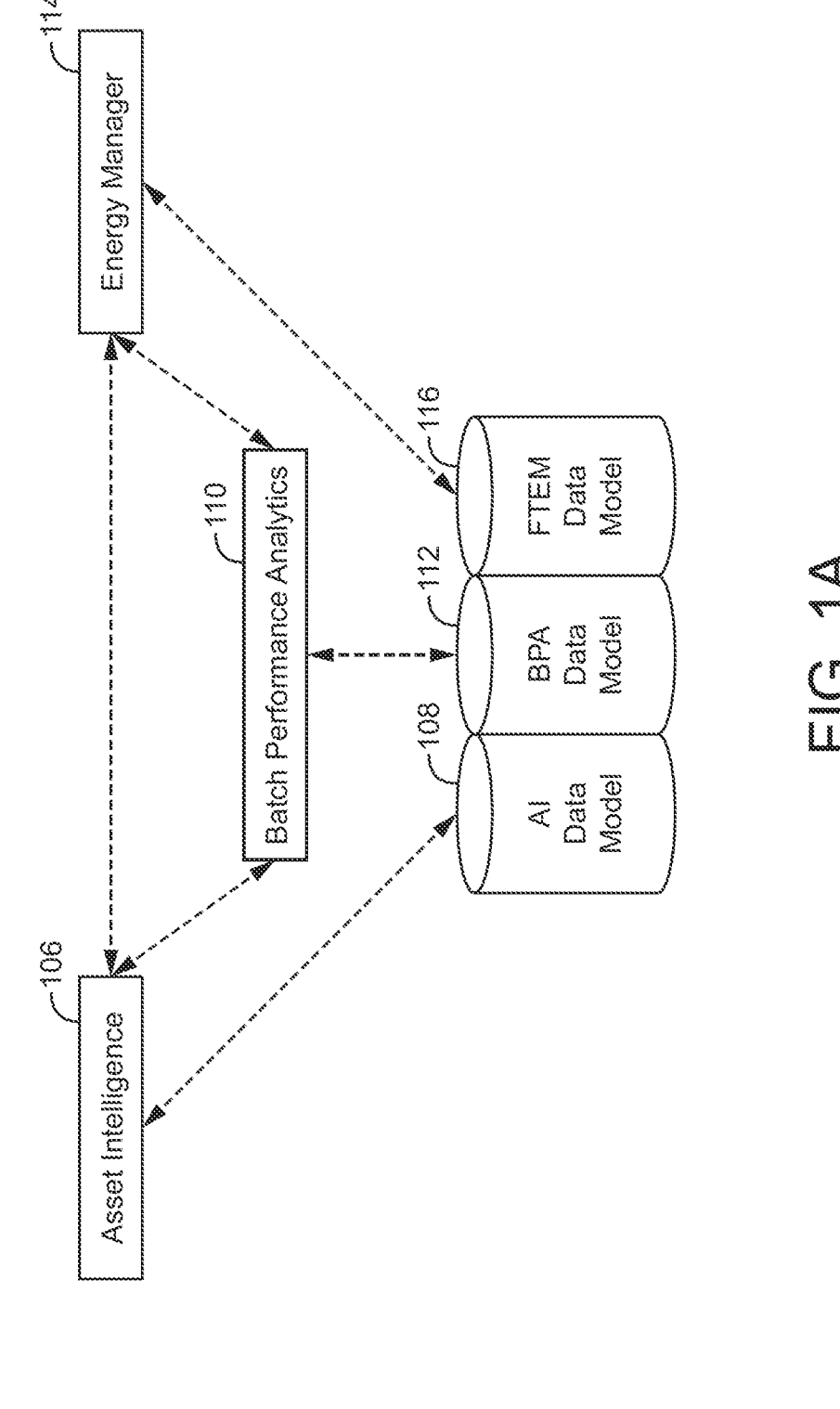
FIG. 1A is a block diagram of separate and rigid application driven data models, according to some embodiments.

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Referring generally to the FIGURES, systems and methods for generating an extensible data model and applying to a variety of different industry applications are described herein. An extensible data model refers to a graph data structure which describes the organizational structure of an enterprise. An enterprise may refer to any company or organization which implements an industrial process such as manufacturing, mining, and the like. The enterprise may have a top-down organizational structure. In some embodiments, it may be desired to generate a data model which includes a large volume of data describing all of the different industrial processes associated with the enterprise. Once the data model for the enterprise has been generated, it may be desired to extend the data model generated for the enterprise to apply to a multiple different industry applications as will be described in more detail below.

Extensible Homogeneous Data Model

Referring to FIGS. 1-4, systems and methods for an extensible homogenous data model which may be applied and extended to cover a wide variety of industry application are described. Users involved in industrial businesses and processes (e.g., mining, manufacturing, etc.) may develop and maintain one or more data management and operation platforms to manage their data. Based on the managed data, the users may gain insight into their industrial processes to improve the operation of their industrial processes. Specifically, the industrial processes may improve their efficiency, cost, energy usage, resource usage, etc.

In typical data management and operation platforms, it may be common for a single user to have a mix of data solutions provided by a number of vendors and varied in age and technology stack. While each data solution might present the data it gathers sufficiently to meet a specific targeted outcome, utilizing that data for more comprehensive analysis over multiple industry applications is often a complex integration project which costs significant time and money to implement and leads to building a large and custom data model for each user. Therefore, a homogenous data model which may be extended to process and manage data for different industry solution applications may be desired. The systems and methods described herein provide a homogenous data model to allow various industry applications to work seamlessly together over a single data platform. An industry solution application may be defined as a data management application which receives data regarding a particular industrial process and evaluates the data to provide insights regarding the industrial process. For example, the industrial process may be a mining process. In this case, an industry solution application may be developed to gather data regarding the mining process and provide insights regarding the mining process.

The extensible homogeneous data model provides may benefits including: (1) reducing the effort and time required to develop models to deploy different industrial solution applications, (2) modifying the extensible homogeneous data model to in a single place automatically ripples through the extensible industry specific portions of the model, (3) increasing the ease of adding additional industry solution applications, (4) standardized user security across the extensible homogeneous data model including any extensible homogeneous data model, and (5) standardized reporting and rollup of common KPIs across industry solution applications simplifies analytics and enables cross industrial solution applications insights.

Referring now to FIG. 1A, a block diagram of a system 102 including separate and rigid application driven data models is shown, according to an exemplary embodiment.

FIG. 1A shows a current system for data models which may be applied to different industry solution applications. Each industry solution application maintains its own data model. In the example shown in FIG. 1A, each of the industry solution applications are individually coupled to their respective data models. For example, FIG. 1A shows an asset intelligence industry solution 106 coupled to an asset intelligence data model 108, a batch performance analytics industry solution 110 coupled to a batch performance analytics data model 112, and an energy manager industry solution 114 coupled to an energy manager industry solution 116.

An enterprise, such as a mining company or manufacturing company may include industrial operations which could benefit from analysis by multiple industry solution applications. For example, an asset intelligence application 106 may be configured to receive data about one or more assets (e.g., large physical devices used in an industrial process) and provide insights about the operation of the asset. Additionally, the batch performance analytics application 110 may be configured to receive data about a batch of products produced by a manufacturing process and provide relevant insights. The mining company or manufacturing company may need to use both the asset intelligence application 106 and batch performance analytics application 110 to gain insights into its operation. However, As shown in FIG. 1A, the data models 108, 112, and 116 are distinct from each other and do not interact. Therefore, it can be difficult to keep data relationships synchronized and connected when using the system shown in FIG. 1A.

Figure 1B:
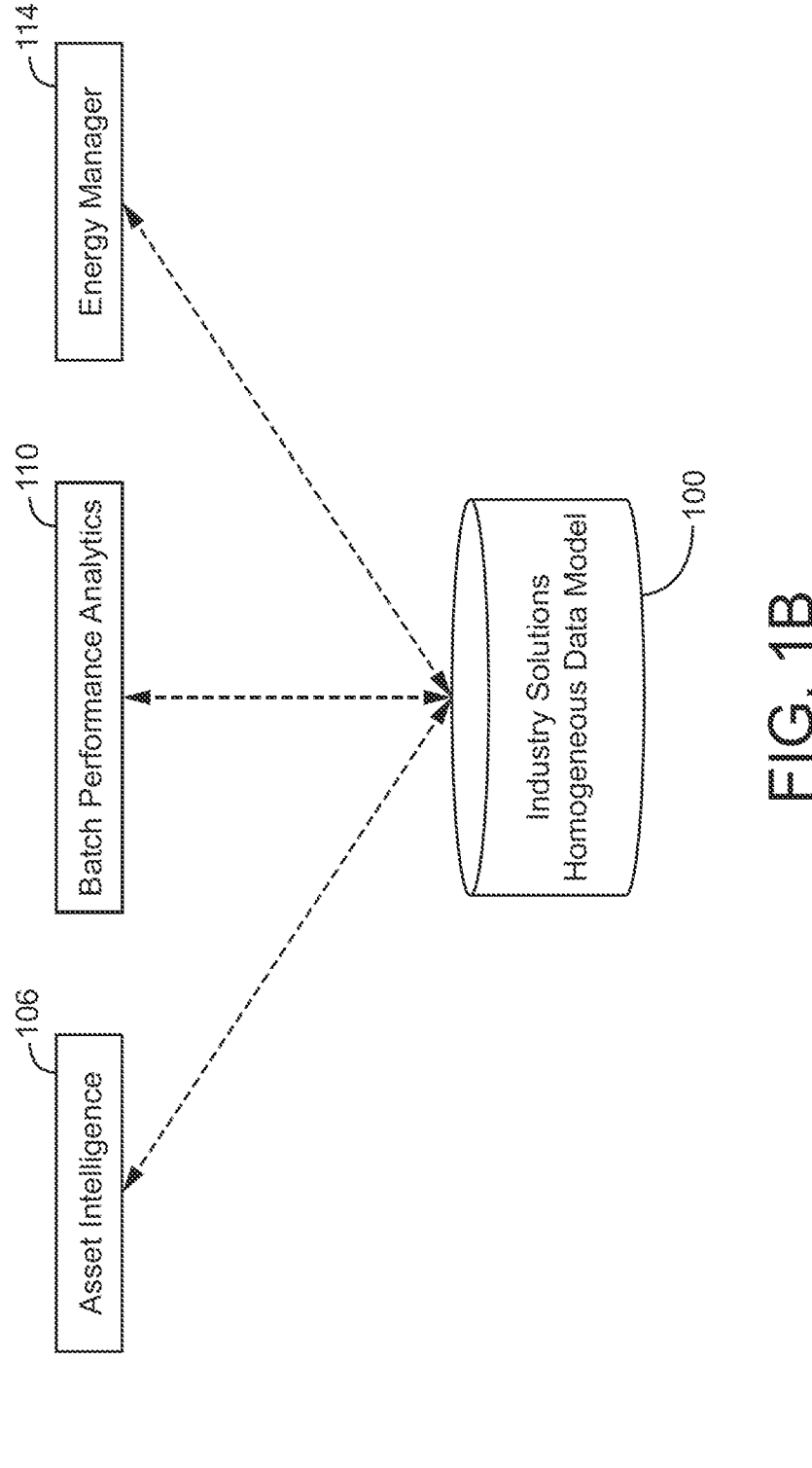
FIG. 1B is a block diagram of a single homogeneous data model for multiple industry applications, according to some embodiments, according to some embodiments.

In contrast, in FIG. 1B, an improved system 104 including a homogeneous data model 100 which is extensible and can be used across multiple industry applications. Specifically, the homogeneous data model 100 may be applied to the asset intelligence application 106, the batch performance analytics application 110, and the energy manager application 114. The homogeneous data model 100 may be an industrial knowledge graph which spans multiple industrial sectors. The homogeneous data model 100 organizes different types of data received from an enterprise (e.g., an industrial company) into a data schema. The homogeneous data model 100 can be extended to cover a new industry sector. For example, as described herein, industrial solutions covering the energy, batch performance, and asset intelligence sections are covered. However, the homogeneous data model 100 may be extended to cover other sectors relevant to an enterprise. The homogeneous data model 100 can also be extended to create new relationships between nodes within the homogeneous data model 100.

In some embodiments, the homogeneous data model 100 improves the functioning of computer systems within an enterprise. Specifically, with the homogeneous data model 100, data pertaining to the enterprise only need to be stored once (e.g., within the homogeneous data model 100) instead of multiple times in different data models (e.g., asset intelligence data model 108, batch performance analytics data model 112, and energy manager data model 116). This reduces the excessive bandwidth, storage, and computing resources needed by the computing system to manage and use the data models to gain insights into the industrial processes of the enterprise. Further, the data model 100 is a new and improved data structure that is organized in a hierarchical way that provides the structure which can be applied to a wide variety of organizations for immediate deployment (e.g., without needing to spend much time and resources developing a separate model for each application)

while providing some flexibility so that the models can each be customized for the specific organization it is associated with.

Figure 2:
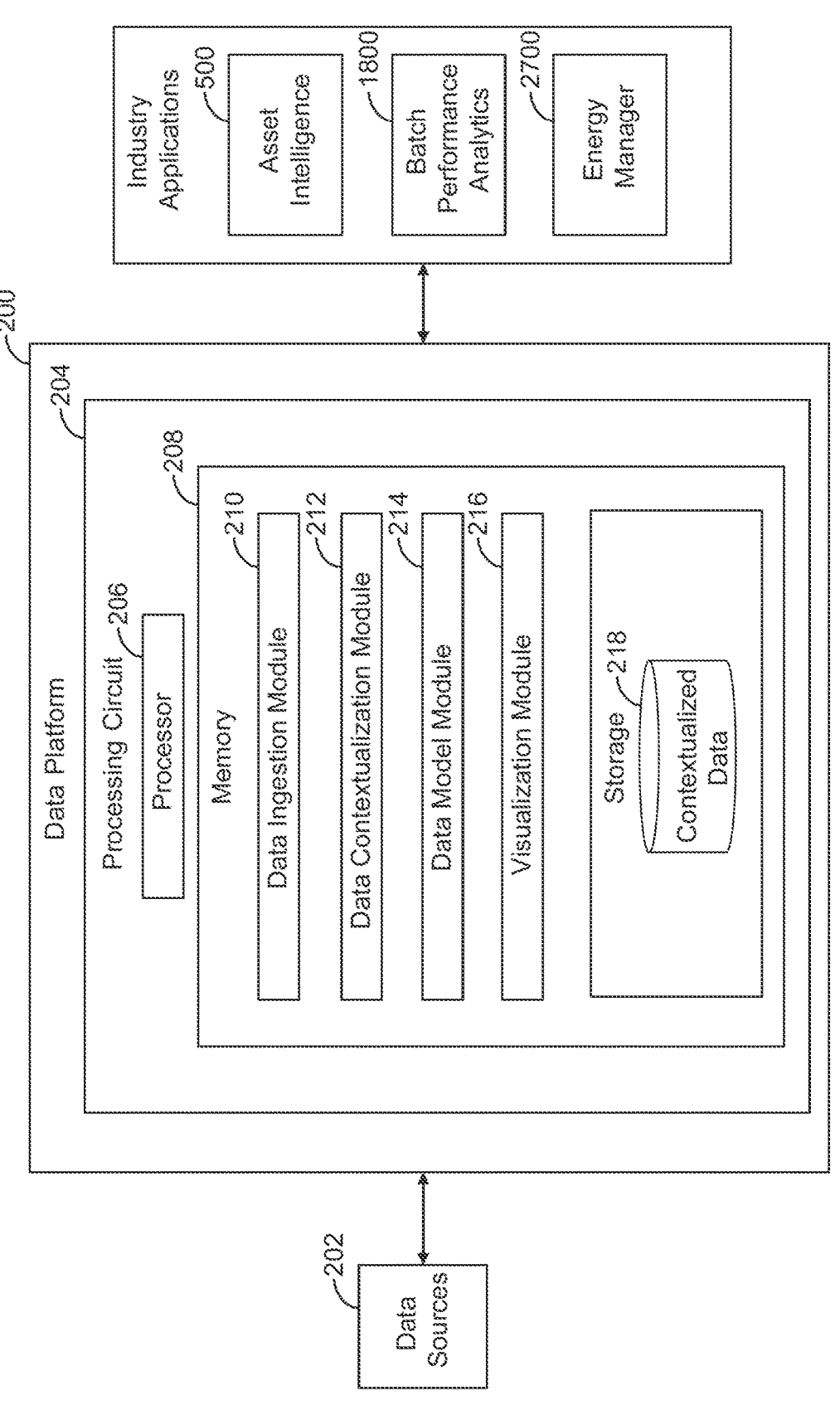
FIG. 2 is a block diagram of an exemplary data platform, according to some embodiments.

Referring now to FIG. 2, a block diagram of an exemplary data platform 200 is shown, according to some embodiments. The data platform 200 may be configured to generate and manage the homogeneous data model 100. The data platform 200 may be configured to receive data regarding an industrial process, process/evaluate the data to determine insights regarding the industrial process, and present the insights to the user. The data platform 200 may be configured to receive data in a first format from the data sources 202 and transform/contextualize that data into a second format. In some embodiments, the second format may be a standardized format that converts the raw data received from the data sources 202 into a standardized format that can be used to create the homogenous data model. For example, the raw data from the data sources may be received in a first type of unit (e.g., metric, imperial, etc.). The data may be transformed from this first unit type to a second unit type. The transformed data in the second formant may be used to create the homogeneous data model 100. The homogeneous data model 100 may be a graph data structure created by the homogeneous data model. In some embodiments, the data platform may contextualize the data by mapping the data to create a graph data structure. Data mapping refers to a process of linking the data received from the data sources 202 to relevant portions of an industrial plant/process. For example, an industrial enterprise such as a mining company may mine for natural resources at multiple sites in multiple geographic regions, and using a wide variety of equipment. To manage its operations, the mining company may collect a large and varying volume of data from each of regions, sites, and equipment. For this data to be useful, all of the data collected needs to be assigned a tag (e.g., tagged) or mapped to one or more instances of assets, pieces of equipment, or other system elements (e.g., meters, metrics, formula variables, etc.) to indicate which parts of the industrial process the data is associated with. A tag may be defined as a descriptor of the data which includes identifying information about the tag. In some embodiments, the descriptor may specifically include an owner of the data (e.g., enterprise), a location where the data was collected from (e.g., site or region), a piece of equipment it is associated with (e.g., an asset), a type of data collected, etc. For example, all the timeseries data collected at a certain site and from a sensor associated with a piece of equipment will be tagged as being associated with that site and with that piece of equipment. Further, in data mapping, the data tags may be used to link associated pieces of data. For example, all the equipment operation data for a first site of the mining company may be linked together because they share a commonality (e.g., installed at the same site). In some embodiments, the tags may be manually assigned by a user. In other embodiments, the tags may be automatically assigned through the use of templates and naming conventions or patterns which allow for automatically assigning tags. In some embodiments, multiple tags may be bulk uploaded to the system.

In some embodiments, the data platform 200 is implemented via the processing circuit 204 (e.g., a memory and/or a processor) and/or implemented across multiple processing circuits 204 (e.g., multiple memories and/or processors). The processor 206 can be a general purpose processor, an application specific integrated circuit (ASIC), one or more field programmable gate arrays (FPGAs), a group of processing components, or other suitable electronic processing components. Processor 206 can be communicatively coupled to the memory 208. The memory 208 can include one or more devices (e.g., memory units, memory devices, storage devices, etc.) for storing data and/or computer code for completing and/or facilitating the various processes described in the present disclosure.

The memory 208 can include random access memory (RAM), read-only memory (ROM), hard drive storage, temporary storage, non-volatile memory, flash memory, optical memory, or any other suitable memory for storing software objects and/or computer instructions. The memory 208 can include database components, object code components, script components, or any other type of information structure for supporting the various activities and information structures described in the present disclosure. The memory 208 can be communicably connected to the processor 206 via the processing circuit 204 and can include computer code for executing (e.g., by the processor 208) one or more processes described herein.

Memory 208 is shown to include a data ingestion module 210 which may be configured to facilitate the ingestion of data from the data sources 202. The data sources 202 may include timeseries data received from one or more components associated with the manufacturing process. In some embodiments, the data sources 202 may include industrial system data (e.g., plant system data, site system data, etc.). The site system data may include data related to enterprise resource planning (ERP), site labs, and any third-party site components. The plant system data may include data relating to control mechanisms for any of the plant components or assets (e.g., distributed control system (DCS), programmable logic controllers (PLC), etc.) In some embodiments, the data ingestion module 210 may be configured to receive data from one or more extractors which are configured to extract data from the data sources 202.

Memory 208 is shown to include a data contextualization module 212 which may be configured to contextualize the data received from the data sources 202. In some embodiments, the data contextualization module 212 may be configured to simplify and automate data collection and contextualization. One of the challenges with data collection and analytics in industrial applications is how to manage and contextualize the large volume of data generated from an incredibly wide range of equipment, sensors, and automation systems involved within the industrial application. This large volume of data is vital for the efficient management of these manufacturing plants and operations but only when this data is provided with proper context with its related equipment. The data contextualization module 212 may configure, connect, map, and contextualize the data to make the data stored in the edge data store 1814 to give the data more meaning. In some embodiments, the data contextualized by data contextualization module 212 may be stored in the contextualized data database 218. Memory 208 is shown to include a visualization module 216 which is configured to create graphics which may display the homogeneous data module 100 and any insights generated by the homogeneous data module 100.

Memory 208 is shown to include a data model module 214 which is configured to create a homogeneous data model (e.g., homogenous data model 100). As mentioned above, the homogeneous data model may be a graph data structure or schema which describes the operation of industrial processes. The data model module 214 creates a graph data structure based on the contextualized data. In some embodiments, the homogeneous data model may include one or more nodes and one or more edges.

Figure 4:
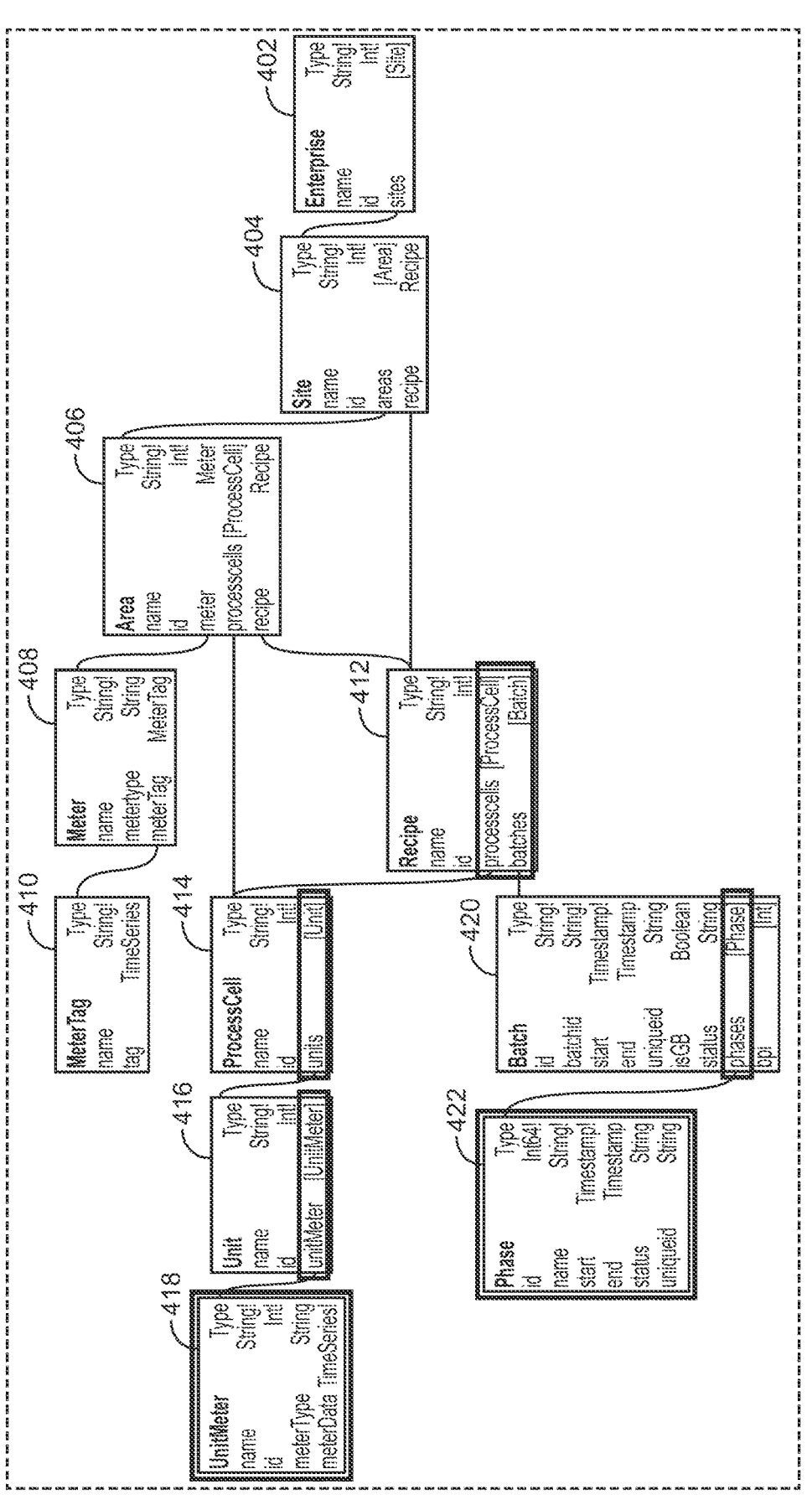
FIG. 4 is a block diagram of an example schema of the homogeneous data model of FIG. 1B, according to some embodiments.

For example, as shown in FIG. 4, a homogeneous data model in a graph data structure 400 is shown according to an exemplary embodiment. The graph data structure includes a plurality of nodes which are connected by edges. The nodes each represent objects associated with an industrial plant or process. The edges may describe the relationship between the nodes. In some embodiments, the nodes may include one or more attributes which describe the characteristics of the nodes. For example, the graph data structure includes an enterprise node 402 which represents an organization associated with an industrial process. The attributes of the enterprise node 402 may include a name, an identification number, and sites associated with the enterprise node 402. In some embodiments, an attribute of one node may be a node unto itself. For example, an attribute of the enterprise node 402 may be site which has its own site node 404. As another example, a unit meter node 418 may be an attribute of a unit node 416 which may be an attribute of a process cell node 414 which may be an attribute of a recipe node 412. Therefore, each of the nodes within the graph data structure may be connected to each other based on their attributes. The enterprise node 402 may be connected, by an edge, to the site node 404. The site node 404 represents a site where the enterprise conducts an industrial process. In some embodiments, the attributes of the site node 404 may include a name, an identification number, areas associated with the site node 404, and recipes associated with the site node 404. The site node 404 may be connected to an area node 406 and a recipe node 412 by an edge. The area node 406 is connected to a meter node 408 which is connected to a meter tag node 410. The recipe node 412 is connected to a batch node 420 which is connected to a phase node 422.

Memory 208 is shown to include a visualization module 216 which is configured to create graphics which may display the homogeneous data module 100 and any insights generated by the homogeneous data module 100. In some embodiments, the data platform 200 may be used to generate insights using the asset intelligence system 500, the batch performance analytics system 1800, and the energy management system 2700 which are described in more detail below.

Figure 3:
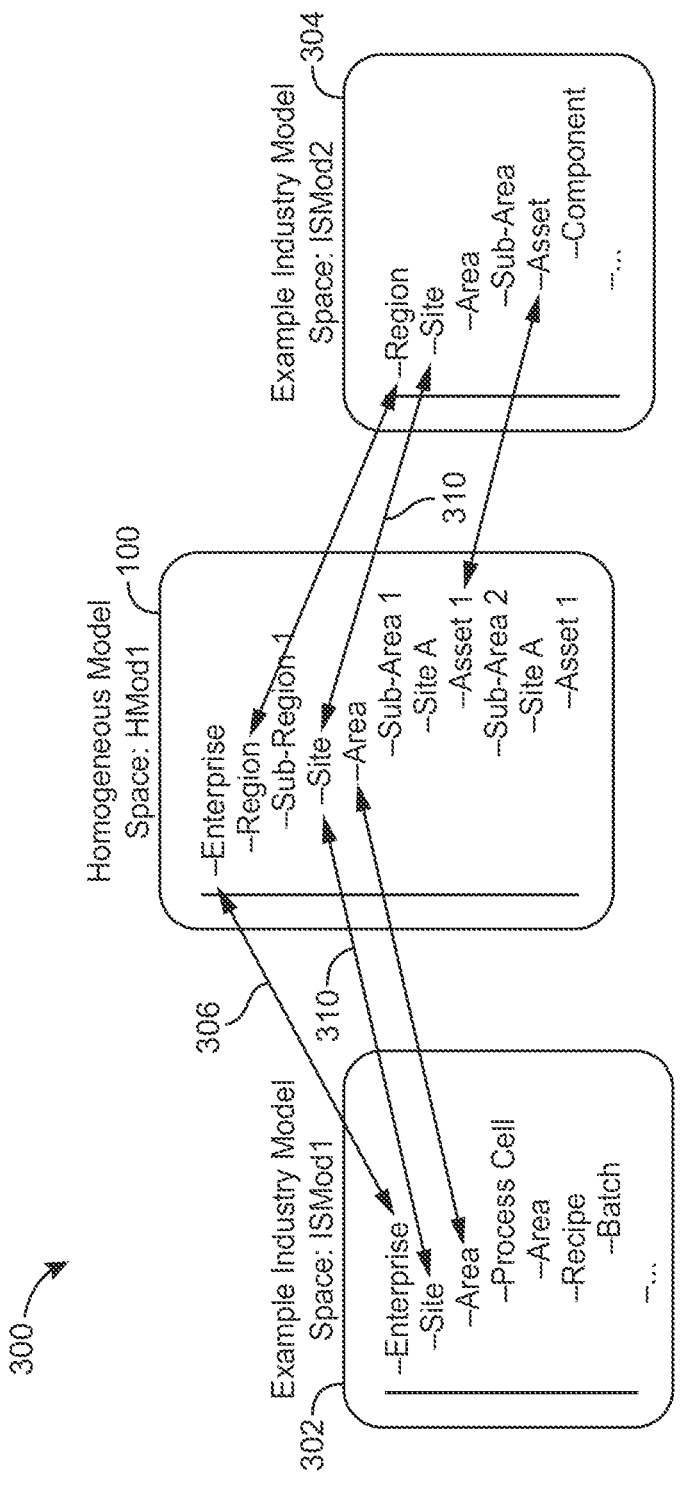
FIG. 3 is a block diagram of an example extension of the homogeneous data model to apply to multiple industry applications, according to some embodiments, according to some embodiments.

Referring now to FIG. 3, an example extension 300 of the homogeneous data model 100 to apply to multiple industry applications is shown, according to an example embodiment. As referenced about, the homogeneous data model 100 may be extended to apply to a first industry application and a second industry application. Extending the homogeneous data model refers to a process of adding nodes and edges to the graph data structure of the homogeneous model. These additional nodes and edges may include extra data which is specifically relevant to that industry solution. A first industry specific data model 302 and second industry specific data model 304 are examples of the extended homogeneous data model. The first industry specific data model 302 may be for a batch performance analytics application while the second industry specific data model 304 may be directed to an asset intelligence application. Both of these applications are described in more detail below.

The first industry specific data model 302 and the second industry specific data model 304 each create some amount of hierarchy that provides organizational structure but does not match the flexibility or detail of the homogeneous data model 100. However, each of these industry specific models have common components which will need to be mapped properly to the homogeneous data model 100. For example, the enterprise from the homogeneous data model 100 is mapped to the first industry specific data model 302 at 306.

As another example, the site from the homogeneous data model 100 is mapped to both the first and second industry specific data models 302 and 304 are both mapped to the homogeneous data model 310. Therefore, the homogeneous data model may be extensible to a variety of applications.

Mining Asset Intelligence Application of Homogeneous Data Model

The systems and methods described herein provide an asset intelligence application which a solution that acts to support users in improving the reliability and availability of physical assets while minimizing risk and operating costs within an industrial plant. The asset intelligence application is a cloud-based Software as a Service (SAAS) offering that contextualizes data by using pre-built industry specific asset models, surfaced in dashboards with alert notification management and the ability to configure by persona and user. The asset intelligence application is intended to provide short time to value to your operations and maintenance teams. The asset intelligence application pre-built asset models, asset monitoring, fleetwide analysis and asset management strategy capabilities to be applied to multiple asset classes, with real time data ingestion.

Figure 5:
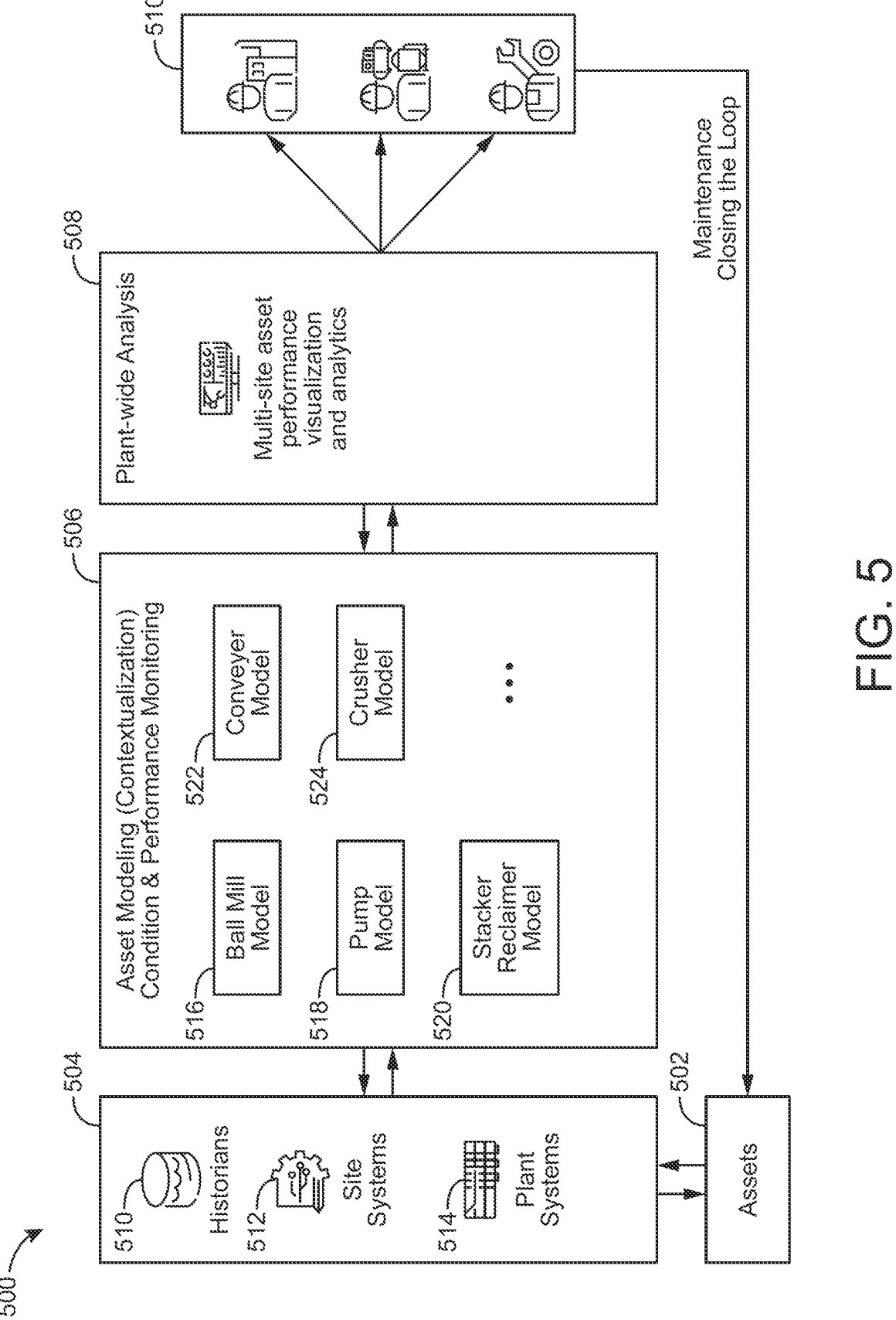
FIG. 5 is a block diagram of an asset intelligence management system using the homogeneous data model of FIG. 3, according to some embodiments.

Referring now to FIG. 5, a block diagram of an asset intelligence management system 500 using the extensible homogeneous data model 100 is shown according to an exemplary embodiment. The asset intelligence management system 500 is an industry solution that acts to improve the operation (e.g., health, reliability, availability, etc.) of one or more physical assets within an industrial plant while reducing risk and operating costs associated with the physical asset. In the disclosure herein, the asset intelligence management system 500 is described with respect to a mining industrial plant, however, this description is only meant to be exemplary. The asset intelligence management system 500 may be used to improve the operation of any industrial plant (e.g., manufacturing plants, chemical plants, etc.).

In some embodiments, the asset intelligence management system 500 includes one or more assets 502, model inputs 504, asset models 506, and a plant analytics application 508. The one or more assets 502 may be any type of large physical piece of infrastructure within an industrial plant. In some embodiments, the assets 502 may include one or more sub-systems and/or sub-components. For example, in the mining context, the assets 502 may be any type of large physical component (e.g., a ball mill, a pump, a stacker reclaimer, a conveyor, or a crusher, etc.) used in a mining industrial plant. Each of these large physical components may include sub-components. For example, a ball mill may include a gear sub-component, a drum sub-component, a bearing sub-component, among other sub-components.

In some embodiments, data about the assets 502 may be collected by one or more measurement devices (e.g., sensors, monitors, meters, etc.) and sent to the model inputs 504. The model inputs 504 include data that is fed into asset models 506. In some embodiments, the model inputs 504 can include a data historian 510, site system data 512, and plant system data 514. The data historian 510 may be a database which stores timeseries data associated with the assets 502. In some embodiments, the site system data 512 includes details on how an asset is used or deployed. For example, if an order schedule says to process ore in a mining industrial process at a specific level of quality, those details impact when a given asset is used and how it is configured and ran. These details are included in the site system data 512. In some embodiments, the site system data 512 includes maintenance records of when assets are active, inactive, maintained, replaced, etc. The site system data 512 may receive data from the enterprise resource planning (ERP), computerized maintenance management systems (CMMS), site labs, and any third-party site components. The plant system data 514 may include data relating to control mechanisms for any of the plant components or assets (e.g., distributed control system (DCS), programmable logic controllers (PLC), etc.). Further, the plant system data 514 may include data for any auxiliary systems which support the industrial plant such as distributed control systems, air compressors, hydraulic packs, electrical switchgear infrastructure, water utilities, an power generation units, among other systems. Distributed control systems provide the connections from individual sensors on equipment to a central system where programs are run to remotely control and monitor an asset. The control commands are sent and watched from a secure location.

The data collected and stored in the model inputs 504 are sent and ingested by the asset models 506 to be processed. Specifically, the asset models 506 may be configured to evaluate the data from the model inputs 504 to determine key performance indicators which may be used to predict the status and health of one or more assets. The "health" of an asset herein may be described as a measurement of how well an asset is operating. For example, an asset or sub-component of an asset with no faults or maintenance actions may be considered healthy while an asset or sub-component of asset with multiple faults or pending needed maintenance actions may be considered unhealthy. The asset models 506 may be configured to determine and predict the health of one or more assets (e.g., assets 502). In some embodiments, the asset models 506 may include specific models for each individual asset. For example, the asset models 506 may include a ball mill model 516 which models a ball mill asset. The asset models 506 may also include a pump model 518 which models a pump asset. The asset models 506 may also include a stacker reclaimer model 520 which models a stacker reclaimer model 520. The asset models 506 may also include a conveyor model 522 which models a conveyer asset. The asset models 506 may also include a crusher model 524. In some embodiments, the asset models 506 may include other models which model assets not specifically named herein.

The asset models 506 may determine and predict the health of the one or more assets by ingesting raw data about an industrial plant from the model inputs 504 for a previous period of time (e.g., previous 7 days, previous 30 days, previous 3 months, etc.). The data used to generate the asset models 506 may be transformed and/or contextualized before being used to generate the asset models. Once the data is processed, the asset models 506 computes target variables for each of the assets 102 and their sub-components based on the downtime history data (e.g., ingested from the data historian 510) and a failure more and effects analysis (FMEA) based rule engine built for that asset. In some embodiments, FMEA is step-by-step approach for identifying all possible failures in a design, manufacturing, or assembly process. FMEA is a recognized standard which may be used to determine the health of an asset. In some embodiments, the target variable may be a risk score which is an indicator of the health of the asset. In some embodiments, the target variable may be a failure indicator which predicts future faults and failure for assets and their sub-components.

Based on the target variables, risk score, and failure indicator, the asset models 506 may compute a first set of key performance indicators (KPIs) describing the current operation of the assets 502. In some embodiments, a KPI in the first set of KPIs which may be generated is a Current Risk Score which is an indicator of the health of the asset at the time the asset model 506 is executed which is based on the latest date for which data is available. In some embodiments, another KPI in the first set of KPIs which may be generated is a Sensor Fault which provides a percentage of invalid data measured by a sensor for an asset based on a pre-determined threshold which screens out invalid data. In some embodiments, another KPI in the first set of KPIs which may be generated is a Data Availability Confidence Score which provides a percentage of each of the following at a component level: valid data, invalid data, and missing data. Based on these percentages, the Data Availability Confidence Score will prove a confidence level (e.g., high, medium, and low) for each parameter when an advisory or warning is generated by the asset models 506.

Figure 15:
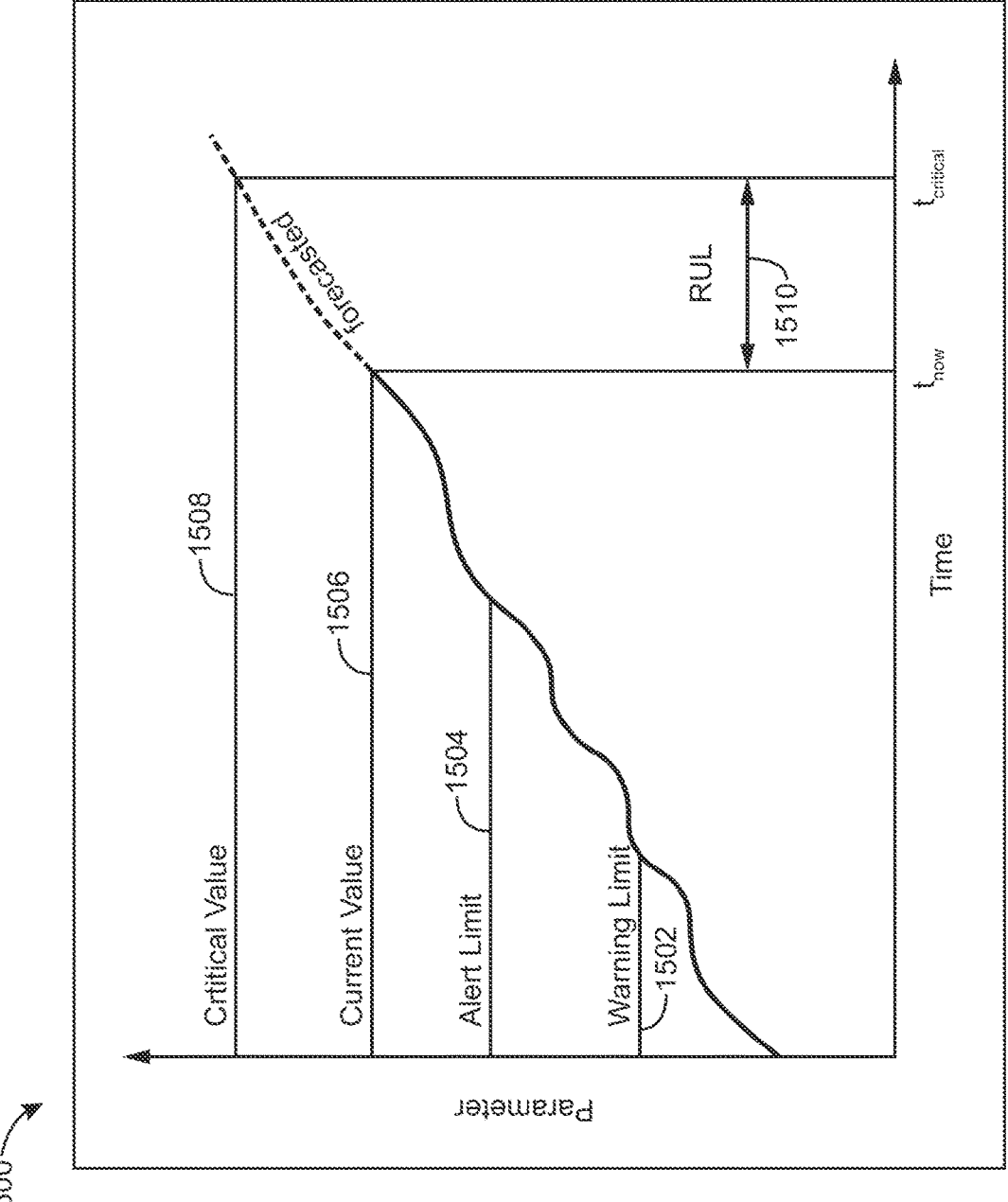

Based on the first set of generated KPIs, the asset models 506 is executed to forecast primary parameters (e.g., sensor and PLC data) for a certain future period of time (e.g., 1 week, 3 weeks, 1 month, etc.). Once the primary parameters are forecasted, the asset models 506 are executed to compute virtual parameters. Based on these virtual parameters, the asset models 506 predicts a second set of KPIs, including a Future Risk Score and Future Failure Indicator. The second set of KPIs are generated by leveraging the best models registered for a given asset component during the training stage of the asset models. More details regarding the training of the asset models are provided below. Finally, based on the second set of generated KPIs, the asset models 506 are executed to generate a third set of KPIs, including an Advisory and Remaining Useful Life (RUL). The Advisory KPI may include a past diagnosis for an asset, a present diagnosis for an asset, and a recommendation for addressing any issues for each sub-component within an asset. The RUL KPI is a number of hours the component can continue to function properly before fault or failure. In some embodiments, the RUL is generated based on the Future Risk Score and the Future Failure Indicator KPIs. In some embodiments, there are three severity levels of the Advisory, warning, alert, and critical, going from least to most severe. The severity levels of the Advisory are shown in FIG. 15 which displays a graph 1500 which shows the measured values for parameter 1501 over time. The parameter 1501 may be measured by a sensor associated with an asset or sub-components for the asset. The graph 1500 shows the measured values of the parameter as the associated asset or sub-component of the asset approaches failure. The graph 1500 plots the parameter value 1501 on the y-axis and the time of the measured parameter value on the x-axis. The parameter value 1501 may be compared to multiple severity levels as it is measured over time. The severity levels correspond with the severity levels determined for the Advisory. For example, graph 1500 shows a first severity level 1502 which corresponds to the warning severity level, a second severity level 104 which corresponds to the alert severity level, and a third severity level 1508 which corresponds to the critical security level. In some embodiments, the RUL 1510 of the asset can be determined based on a prediction of when the measured parameter value 1501 will surpass the critical limit 1508. The severity level of the Advisory may be based on the virtual parameters and the RUL KPI. In some embodiments, the asset intelligence management system 500 may automatically close an active advisory if the virtual parameters become normal in the future. Otherwise, an Advisory may be manually closed by an operator after addressing the advisory.

The development and training of the asset models 506 is done leveraging historical sensor and PLC data in conjunction with the known downtime history of the asset which are received from the model inputs 504. In some embodiments, the asset intelligence management system 500 may be a part of a cloud server, e.g., AMAZON WEB SERVICES (AWS) or MICROSOFT AZURE. The asset models 506 may therefore be hosted on AWS or MICROSOFT AZURE. The asset intelligence management system 500 can form an asset management system for an asset that can be deployed on-premises and/or off-premises (e.g., solely on-premises or off-premises or a combination of on-premises and off-premises devices and/or systems). In some embodiment, the training of the asset models 506 may be performed on each component of the asset using four different machine learning algorithms (Random Forest, Decision Forest, XGBoost and SVM). The best model is picked based on the error metrics such as MAE (mean absolute error) and MAPE (mean absolute percentage error) and registered using MLflow for further consumption. Once the training pipeline is successfully executed, each component will have two trained models that respectively compute Risk Score and Failure Indicator. In some embodiments, the asset models 506 may be dual models that each include a data model component and a machine learning/artificial intelligence component. Specifically, the data model component is used by the system 500 to organize the data to provide the hierarchy/structure to find and navigate branches of the organization to find specific assets and their related data. The artificial intelligence/machine learning model is a model which is defined for a specific type of asset where details of a given type of asset like parts, performance behavior, lifetime, and use are stored and used. An asset class is a group of similar assets, like all heat exchangers, conveyors, ball mills, etc. In some embodiments, AI/ML models are created for both individual assets and for entire asset classes.

Figure 10:
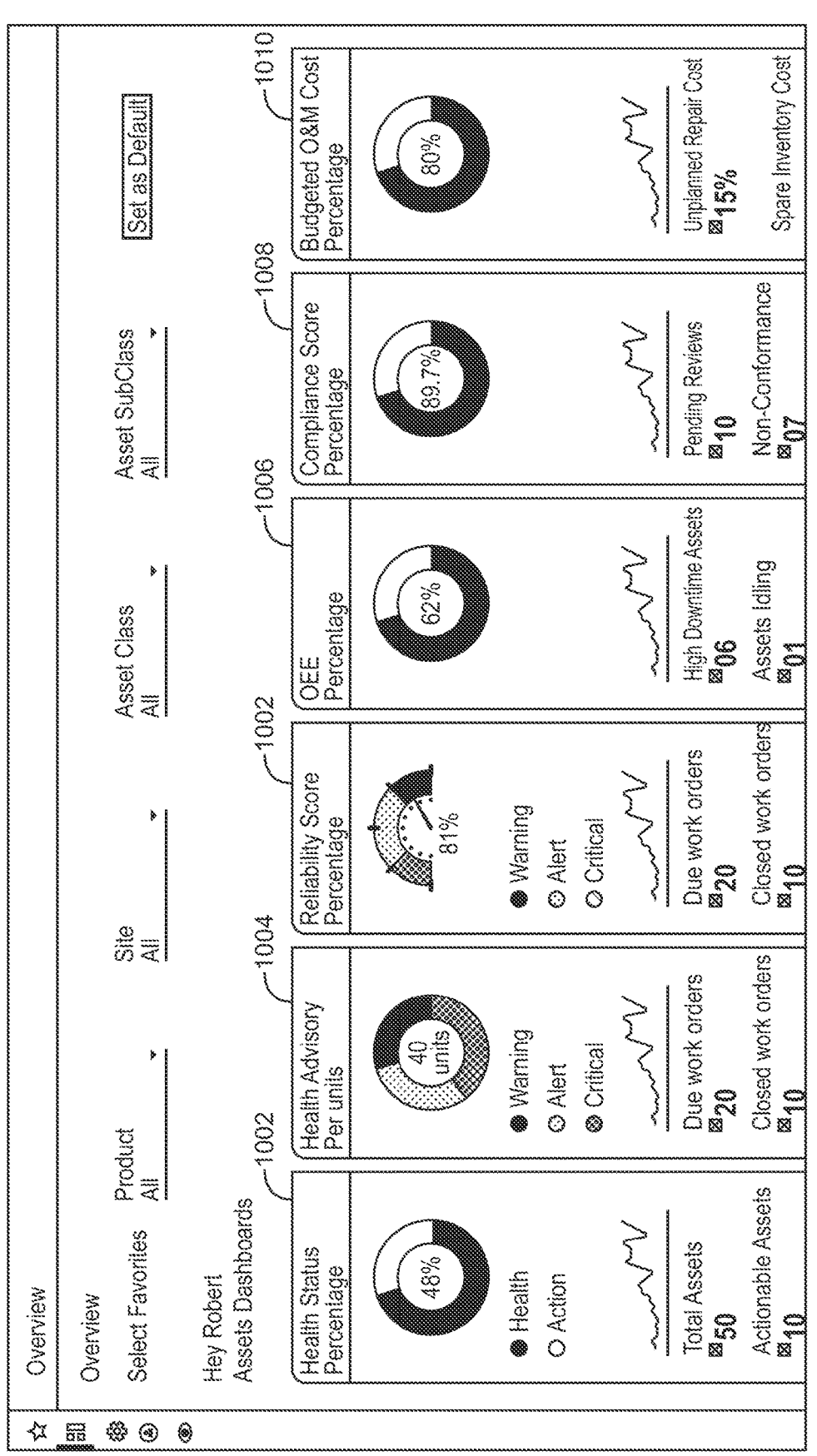

In some embodiments, the KPIs determined by the asset models 506 may be converted to graphical analytics (e.g., graphs, charts, messages, etc.) by the plant analytics application 508. The graphics may be displayed on dashboards or reports which are presented to plant personnel 510. The dashboards and reports are described in more detail in FIGS. 10-15 which are described below. In some embodiments, the plant personnel 510 may update operation of the assets 502 based on the graphical analytics which are presented by the plant analytics application 508. For example, referring now to FIGS. 10-15, example user interfaces showing various dashboards and graphical illustrations of the asset management system 500 are shown, according to exemplary embodiments. FIG. 10 displays a user interface 1000 that is shown on a dashboard to describe the health status of one or more assets. In some embodiments, the user interface 1000 may include a health status user interface portion 1002. The health status user interface portion 1002 may include a graphic which shows the percentage of assets which are healthy and the percentage of assets which are not healthy and need action. In the example shown in FIG. 10, the percentage of assets that require action (e.g., are unhealthy) is 48%. In some embodiments, the user interface 1000 may include a health advisory user interface portion 1004 may display the amount of units which a health advisory is currently active for. In the example shown in user interface portion 1002, there are 40 units which currently have an active health advisory. In some embodiments, the severity of the health advisory is shown on the user interface portion 1002. Specifically, the health advisory user interface portion 1004 may display the relative number of active advisories based on their severity level (e.g., warning, alert, and critical).

In some embodiments, the user interface 1000 may include a reliability score user interface portion 1006. The reliability score user interface portion 1006 may include a graphic showing a percentage of how reliable the assets are. In some embodiments, the user interface 1000 may include an overall equipment effectiveness (OEE) user interface portion 1008. The overall equipment effectiveness user interface portion 1008 may include a graphic which shows an OEE percentage which in the example shown in FIG. 10 is 62%. In some embodiments, the user interface portion 1000 may include a compliance score user interface portion 1010. The compliance user interface portion 1010 may be configured to provide information about the level of compliance for one or more assets with any relevant compliance standards. The compliance standards may be set by one or more governmental agencies. In some embodiments, the user interface portion 1000 includes a budget user interface portion 1012. The budget user interface portion 1012 may be configured to display the percentage of the budgeted operation and management cost which have been spent on repair costs for the assets 502.

Figure 11:
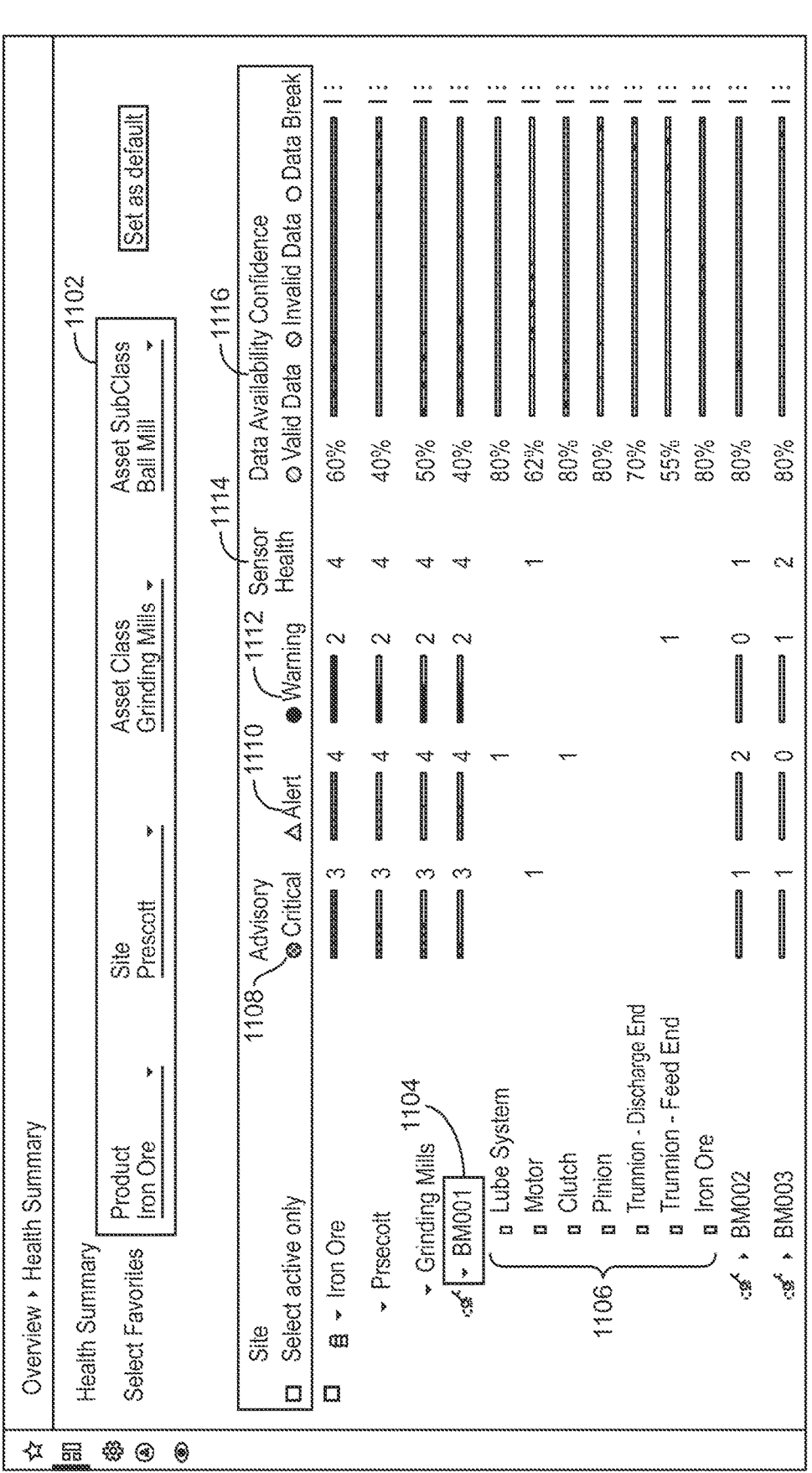
Figure 13:
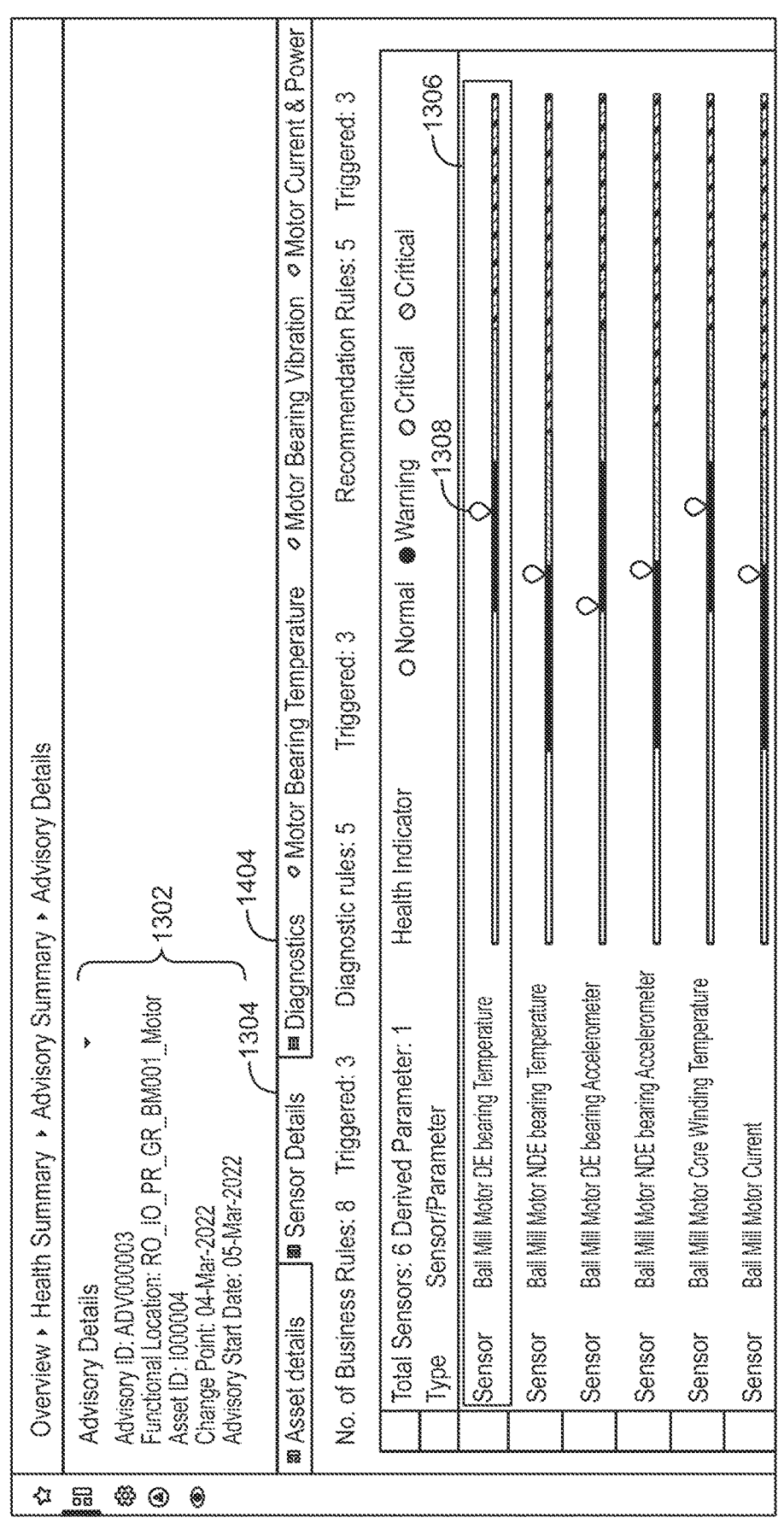

While FIG. 10 provides a generalized overview of the each of the assets a user has access to, FIG. 11 shows a user interface 1100 which provides a more specific health summary for a specified type of asset. Specifically, at user interface portion 1102, the user can specify the product, site, asset class, and asset subclass the user wishes to view. In this case, the asset class (e.g., grinding mills) and the asset subclass (e.g., ball mills) are selected. The user can select a particular ball mill 1104 (e.g., BM001) to see more details about it. The health summary shown in user interface 1100 includes the number of critical advisories 1108, alert advisories 1110, and warning advisories 1112, associated with assets at the product level (e.g., iron ore), site level (e.g., "Prescott"), asset class level (e.g., "Grinding Mills"), and asset subclass level (e.g., "BM001"), and sub-component level (e.g., sub-components 1106). The user interface 1100 also displays a sensor health 1114 for each of the previously described levels. The user interface 1100 also includes a data availability confidence score 1116. Specifically, the data availability confidence score describes the proportional amount received from sensors which are valid, invalid, or not available (e.g., data break). For example, for the iron ore product, the data availability confidence score is 60%.

In some embodiments, the user can select an individual asset subclass such as the particular ball mill 1104 to navigate to a user interface which provides a summary of any advisories associated with the asset subclass. For example, referring now to FIG. 12, a user interface 1200 is shown according to an exemplary embodiment. The user interface 1200 may be configured to provide a summary of one or more advisories associated with the asset subclass. For example, an asset advisory 1202 may be included in the advisory summary. The asset advisory 1202 may include a unique identification, location, asset identification, start date, description, and status of the advisory. In some embodiments, the user can select one of the asset advisories included in the advisory summary to navigate to a user interface which provides more details about that particular advisory. For example, referring now to FIG. 13, a user interface 1300 is shown according to an exemplary embodiment. The user interface 1300 may be configured to show details about the asset advisory. For example, the user interface 1300 may include advisory details 1302 which include an advisory identification, a functional location, an asset identification, a change point, and an advisory start date. Further, the user interface 1300 can include tabs 1304 and 1404 which describe details of the advisory. For example, tab 1304 describes sensor details and tab 1404 describes diagnostic details. At user interface portion 1306, details regarding the severity 1308 of the advisory associated with that particular sensor are provided. FIG. 14 shows a user interface 1400 which may be configured to show details about the asset advisory when the tab 1404 is selected. Similar to user interface 1300, the user interface 1400 includes advisory details 1402. The user interface 1400 may also include diagnostic details 1406 which describes the determined fault or problem with the asset. The user interface 1400 may include any previous diagnostic details 1408 for the asset. The user interface 1400 may also include recommendation details 1410 which describes any recommended actions the asset intelligence management system 500 suggests taking to resolve the fault with the asset. The user interface 1400 may also include a current health score 1412 and predicted future health score 1414 which may be determined as described above. The user interface 1400 may also include a RUL value which provides the remaining useful life for the asset in hours.

Referring now to FIG. 6, a method 600 for predicting faults for an asset 502 is shown is shown according to an exemplary embodiment. In some embodiments, the method 600 may be performed by the asset intelligence management system 500. The process 500 can be performed in order to determine the health of one or more assets 502, predict the future health of assets 502, and send a prioritized notification to a user regarding the predicted future health of the assets 502. In some embodiments, the method 600 is performed in a targeted manner (e.g., to evaluate a specific asset 502 in the industrial plant) or is performed iteratively or periodically for all of the assets 502 in an industrial plant.

The method 600 begins at step 602 where asset operation information is received from one or more assets (e.g., assets 502). As mentioned above, the one or more assets 502 may be any type of large physical pieces of infrastructure within an industrial plant. The asset operation information about the assets 502 may be collected by one or more measurement devices (e.g., sensors, monitors, meters, etc.).

The method 600 continues to step 604 where one or more asset models 506 are executed to determine KPIs for the assets 502. As described above, the asset models 506 may generate a series of KPIs in a particular order (e.g., a first set of KPIs, a second set of KPIs, and a third set of KPIs). In some embodiments, the first set of KPIs may include a Current Risk Score, a Sensor Fault, and a Data Availability Confidence Score. The first set of KPIs may be generated by the asset models 506 and based on the target variables generated by the asset models 506. Based on the first set of KPIs, the second set of KPIs may be generated by the asset models 506. The second set of KPIs may include a Future Risk Score and Future Failure Indicator. Based on the second set of KPIs, the third set of KPIs may be generated by the asset models 506. The third set of KPIs may include an Advisory and Remaining Useful Life (RUL). In some embodiments, the KPIs may be combined at one or more levels of the enterprise so that the asset intelligence system can provide a summarized view of the health of the asset on the different levels in the enterprise hierarchy (e.g., enterprise, region, area, site, etc.).

The method 600 continues to step 606 where the asset intelligence management system 500 predicts a future failure or fault for the asset based on the key performance indications. At step 608, the asset intelligence management system 500 sends an informed and prioritized notification to plant personnel regarding the predicted future failure or fault. Specifically, the KPIs determined by the asset models 506 may be converted to graphical analytics (e.g., graphs, charts, messages, etc.) which describes the health and the status of the assets 502 by the plant analytics application 508. This graphical information may be presented to the plant personnel in a prioritized fashion which highlights the most critical (e.g., urgent and most impactful) predicted faults and failures associated with the assets 502. At step 610, a corrective action may be taken to mitigate the predicted future failure or fault. In some embodiments, the corrective action may be automatically implemented to correct a fault within component. For example, maintenance may automatically be scheduled if the RUL for a sub-component of an asset is approaching zero hours. As another example, firmware or software running on an asset 502 may be automatically updated if it is determined that the firmware or software is out of date. In other embodiments, the corrective action may be manually taken by the plant personnel 510.

Figure 7:
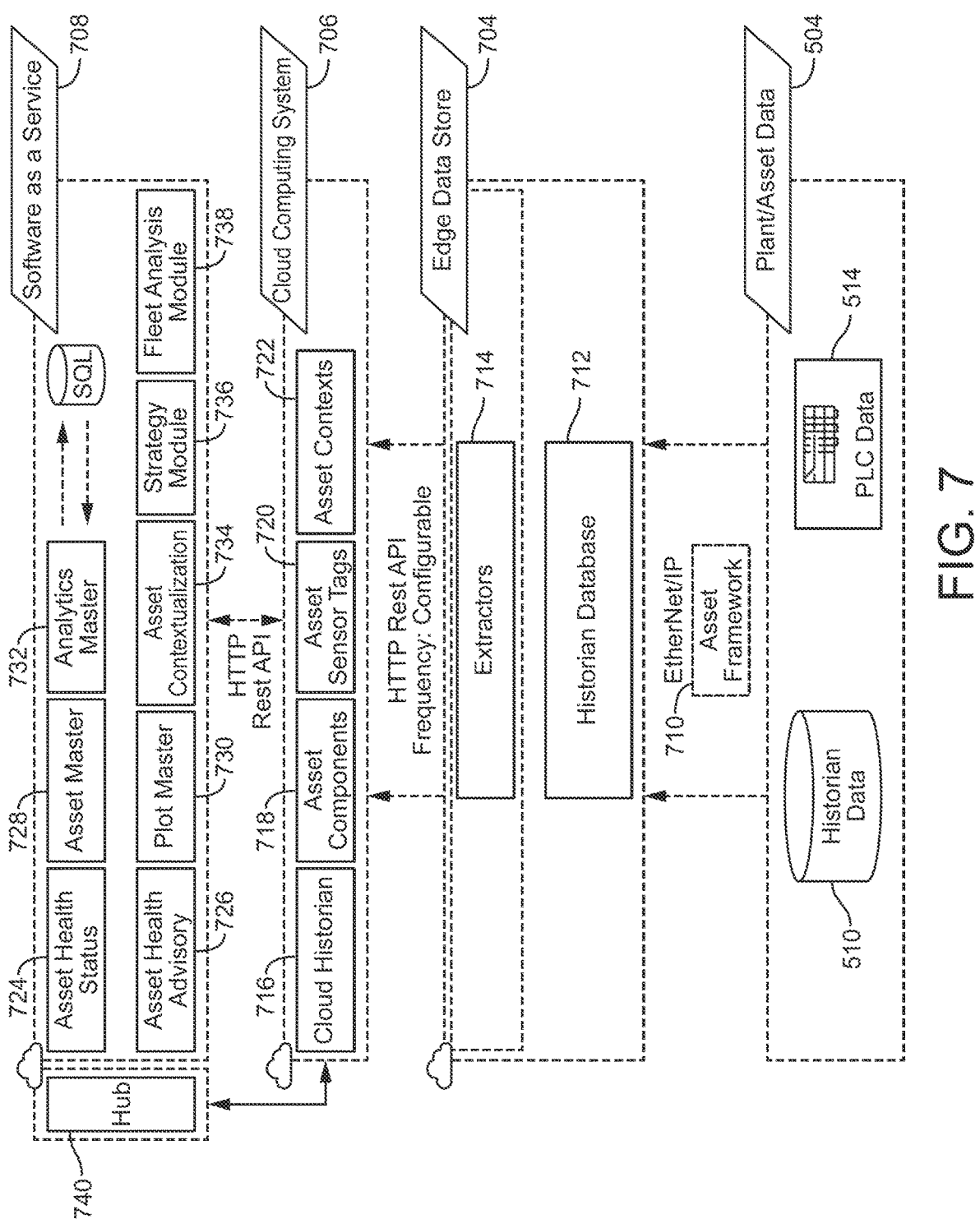
FIG. 7 is a first block diagram of the system architecture of the asset intelligence management system of FIG. 5, according to some embodiments.

Referring to FIG. 7, a first block diagram of the system architecture 700 of the asset intelligence management system 500 is shown according to an exemplary embodiment. In some embodiments, includes four portions that comprise the system architecture of the asset intelligence management system 500. Specifically, the system architecture includes plant/asset data 702, edge data store 704, cloud computing system 706, and a software as a service (SAAS) application 708.

The plant/asset data 702 is a data layer that includes one or more data sources that are collected on-premises at an industrial plant. The data may include operation data for one or more assets operating in an industrial plant. In some embodiments, the plant/asset data 702 includes many of the data sources discussed above including the data historian 510 and the plant system data 514. The data historian 510 may be a database which stores timeseries data associated with one or more assets in an industrial plant. The plant system data 514 may include data relating to control mechanisms for any of the plant components or assets (e.g., distributed control system (DCS), programmable logic controllers (PLC), etc.). The data collected at the plant/asset data 702 is sent to the edge data store 704 through a network connection. In some embodiments, the network connection may include an Ethernet card and port for sending and receiving data via an Ethernet-based communications network and/or a Wi-Fi transceiver for communicating via a wireless communications network. The plant/asset data 702 may be structured to communicate with the edge data store 704 via local area networks or wide area networks (e.g., the Internet) and may use a variety of communications protocols (e.g., IP, LON, Bluetooth, ZigBee, radio, cellular, near field communication). In some embodiments, an asset framework 710 may also be sent to the edge data store 704. The asset framework 710 may be configured to provide additional information about the asset that data is being collected about in order to provide context regarding that sensor data. For example, if the asset is a pump, the timeseries data collected for the pump may be the flow rate for the pump. In addition to the timeseries data about the flow rate, the asset framework may provide additional data such as a vibration of the pump at the time the flow rate was measured, the amp draw of the motor at the time the flow rate was measured, any alarms associated with the pump during the timeseries data, or what site or enterprise the pump is associated with. This additional information allows the timeseries data to be contextualized.

The edge data store 704 is another data storage layer within the system architecture 700 where the data received from the on-premises assets (e.g., physical devices) is ingested and stored on the edge. The edge data store 704 may be configured to store data which may be used for applications on the edge which is closer to the applications. Storing data on the edge, such as in the edge data store 704, reduces latency by storing the data closer to the applications. In some embodiments, the edge data store 704 includes one or more historian databases 712. In some embodiments, the historian database 712 stores the data received from the plant/asset data 702 and the asset framework 710 in the historian database 712. In some embodiments, the historian database 712 contextualizes the data received from the plant/asset data 702 by associating process attributes to physical assets in an industrial plant or facility. The asset definition includes process tags, streaming event-based analytics and notifications, and other data sources such as relational databases. Asset analytics can then be used to configure, schedule, and run expressions, and rollup generations.

The edge data store 704 may also include extractors 714. In some embodiments, the extractors 714 may be configured to extract data from a database such as the historian database 712. In some embodiments, data extraction may be implemented by a script or a tool that has access the database and is configured to copy or transfer data from the database (such as the historian database 712) to a separate application such as the cloud computing system 706. In some embodiments, the extractors 714 may include a PI extractor which is configured to extract data from a PI data management system. For example, in some embodiments, the PI extractor may be a Cognite PI extractor that connects to the OSISoft PI Data Archive and detects and streams time series data into Cognite Data Fusion (CDF) in near real-time. In parallel, the extractor ingests historical data (backfill) to make all time series available in CDF. The PI points in the PI Data Archive correspond to the time series in CDF. In other embodiments, the extractors 714 may include any other type of data extractor configured to ingest streaming or historical time series data into the edge data store 704 or any other data storage. In some embodiments, the extractors 714 may include a custom extractor. Custom extractors may be scripts or tools that source data from unconventional data sources like a custom database or a SaaS API and transform it into a form that can be loaded into the desired application or system such as the cloud computing system 706. In some embodiments, the extractors 714 may include a SQL extractor. The extracted data from the edge data store 704 may sent to the cloud computing system 706 by a Rest API call.

The cloud computing system 706 may be configured to filter, process, and store the timeseries data received from the extractors 714. The cloud computing system 706 may include a cloud historian 716 which is configured to store the extracted timeseries data on the cloud so that it may be used to process and analyze the data on the cloud. Further, the cloud computing system 716 may be configured to create and store an asset configuration. In some embodiments, the asset configuration includes a hierarchy for an asset. For example, the hierarchy of the asset may include from the top down an enterprise (e.g., company) that owns the asset, a region for the asset, a product created by the asset, a site where the asset is operated, an area where the asset is operated, the asset and then any sub-components associated with the asset. For example, a hierarchy for an asset is shown below:

```
....
"assetHierarchy": [
    {
        "Name": "Enterprise",
        "Id": "0000000000000",
        "Type": "Enterprise",
        "children": [
            {
                "Name": "ECMA",
                "Id": "0000000000000111",
                "parentId": "0000000000000",
                "Type": "Region",
                "children": [
                    {
                        "Name": "Gold",
                        "Id": "376332af-075d-40bf-bbd5-f324995cad50",
                        "parentId": "0000000000000111",
                        "Type": "Product",
                        "children": [
                            {
                                "Name": "Tuscan",
                                "parentId": "376392af-075d-40bf-bbd5-
                                f324995cad50",
                                "Id": "376392af-075d-40bf-bbd5-f324995cad51",
                                "Type": "Site",
                                "children": [
                                    {
                                        "Name": "Milling",
                                        "parentId": "376392af-075d-40bf-bbd5-
                                        f324995cad51",
                                        "Id": "376892af-075d-40bf-bbd5-
                                        f324995cad52",
                                        "Type": "Area",
                                        "children": [
                                            {
                                                "Name": "BM0002",
                                                "parentId":    "376892af-075d-40bf-
                                                bbd5-f324995cad53",
                                                "Id":    "376562af-0709-40bf-bbd5-
                                                f324995cad55",
                                                "Type": "Asset",
                                                "children": [
                                                    {
                                                        "Name": "Gearbox",
                                                        "parentId": "376892af-075d-
                                                        40bf-bbd5-f324995cad55",
                                                        "Id":   "3765678f-0709-40bf-
                                                        bbd5-f324995cad57",
                                                        "Type": "Component",
                                                        "Sensors": [ ]
                                                        ...
```

In some embodiments, the asset configuration may include parameter details for the asset components 718. As mentioned above, the asset components 718 are any sub-components associated the assets 502. In some embodiments, the asset components 718 are associated with sensors that are configured to monitor the operation of the asset components 718. The cloud computing system 706 may be configured to generate asset sensor tags 720 for each of these components. The asset sensor tags 720 in conjunction with the timeseries data from the cloud historian 716 may be used by cloud computing system 706 to generate asset contexts 722. The asset context 722 are contextualized data about the asset components 718. Data contextualization refers to tagging or mapping the data to their specific types of components as described above. The contextualized data in the asset context 722 will be sent to the SAAS application 708 through a Rest API call.

The contextualized data will be ingested by the SAAS application 708 for training the asset models 506 and generating predictions regarding the assets using asset models 506. The SAAS application may include a plurality of modules which are configured to generate the predictions and hub 740 for presenting the predictions to a user. Specifically, the plurality of modules may include an asset health status module 724, asset master module 728, an analytics master module 732, an asset health advisory module 726, a plot master module 730, an asset contextualization module 734, a strategy module 736, and a fleet analysis module 738.

In some embodiments, the asset health status module 724 may be configured to determine the health of an asset based on one or more asset models 506. In some embodiments, the asset health status module 724 may determine the health status of the asset based on one or more KPIs as described above.

In some embodiments, asset health advisory module 726 may be configured to determine a health advisory for an asset based on the one or more asset models 506. Specifically, the asset health advisory 726 may be configured to determine the Advisory KPI as described above. The Advisory KPI may include a past diagnosis for an asset, a present diagnosis for an asset, and a recommendation for addressing any issues for each sub-component within an asset.

In some embodiments, the asset master module 728 may be configured to provide configuration for asset components and parameters. The asset configurations will vary from asset to asset, but each configuration has been designed in a modular approach to ensure scalability.

In some embodiments, the analytics matter module 729 may be configured to provide configuration for analytical functions to be bound to an asset based on the type of asset class, these required functions will provide the predictions needed by the asset health status module 724 and the asset health advisory 726.

In some embodiments, the plot master module 730 may be configured to generate graphics based on the predictions generated by the asset health status module 724 and the asset health advisory 726.

In some embodiments, the asset contextualization module 734 may be configured to receive the contextualized data from the cloud computing system 706 and store the contextualized data.

In some embodiments, the strategy module 736 may be configured to define the maintenance and reliability strategies to increase productivity, reduce costs, and minimize (or eliminate) risks.

In some embodiments, the fleet analysis module 738 may be configured to compare assets of the same asset class, and to analyze them from a fleet perspective, being able to identify the worst underperforming assets or the best performing assets.

In some embodiments, the hub 740 may be the front end of the application that is provided to the user. The hub 740 may be configured to authenticate and authorize users. Further the hub 740 may be configured to generate and present graphical user interfaces to a user.

Figure 8:
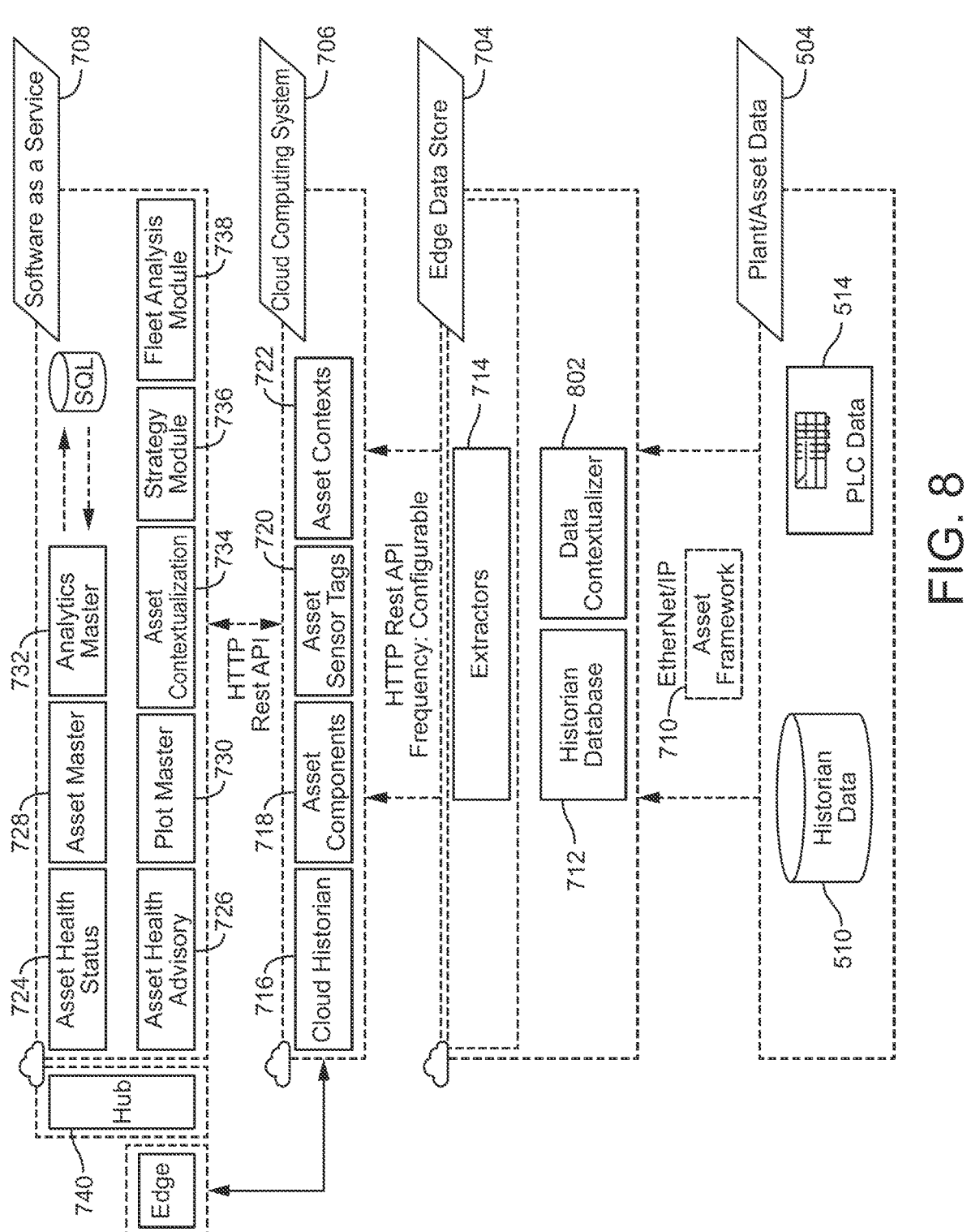
FIG. 8 is a second block diagram of the system architecture of the asset intelligence management system of FIG. 5, according to some embodiments.

Referring to FIG. 8, a second block diagram of the system architecture 700 of the asset intelligence management system 500 is shown according to an exemplary embodiment. The second block diagram shown in FIG. 8 is similar to the first block diagram of the system architecture 700 shown in FIG. 7. Specifically, the second block diagram includes many of the same components described above with respect to FIG. 7. For example, the second block diagram, like the first block diagram of system architecture 700, also includes four portions, plant/asset data 702, edge data store 704, cloud computing system 706, and SAAS application 708, as described above.

The second block diagram of the system architecture 700 differs from the first block diagram of the system architecture 700 by including an additional component, namely a data contextualizer 802. The data contextualizer 802 may be configured to simplify and automate data collection and contextualization on the edge data store 704. One of the challenges with data collection and analytics in industrial plants and operations is how to manage and contextualize the large volume of data generated from an incredibly wide range of equipment, sensors, and automation systems. This large volume of data is vital for the efficient management of these industrial plants and operations but only when this data is provided with proper context with its related equipment. At the edge, the data contextualizer 802 may configure, connect, map, and contextualize the data to make the data stored in the edge data store 706 give the data more meaning. In some embodiments, the data contextualizer 802 may further package this data in a common information model.

Figure 9:
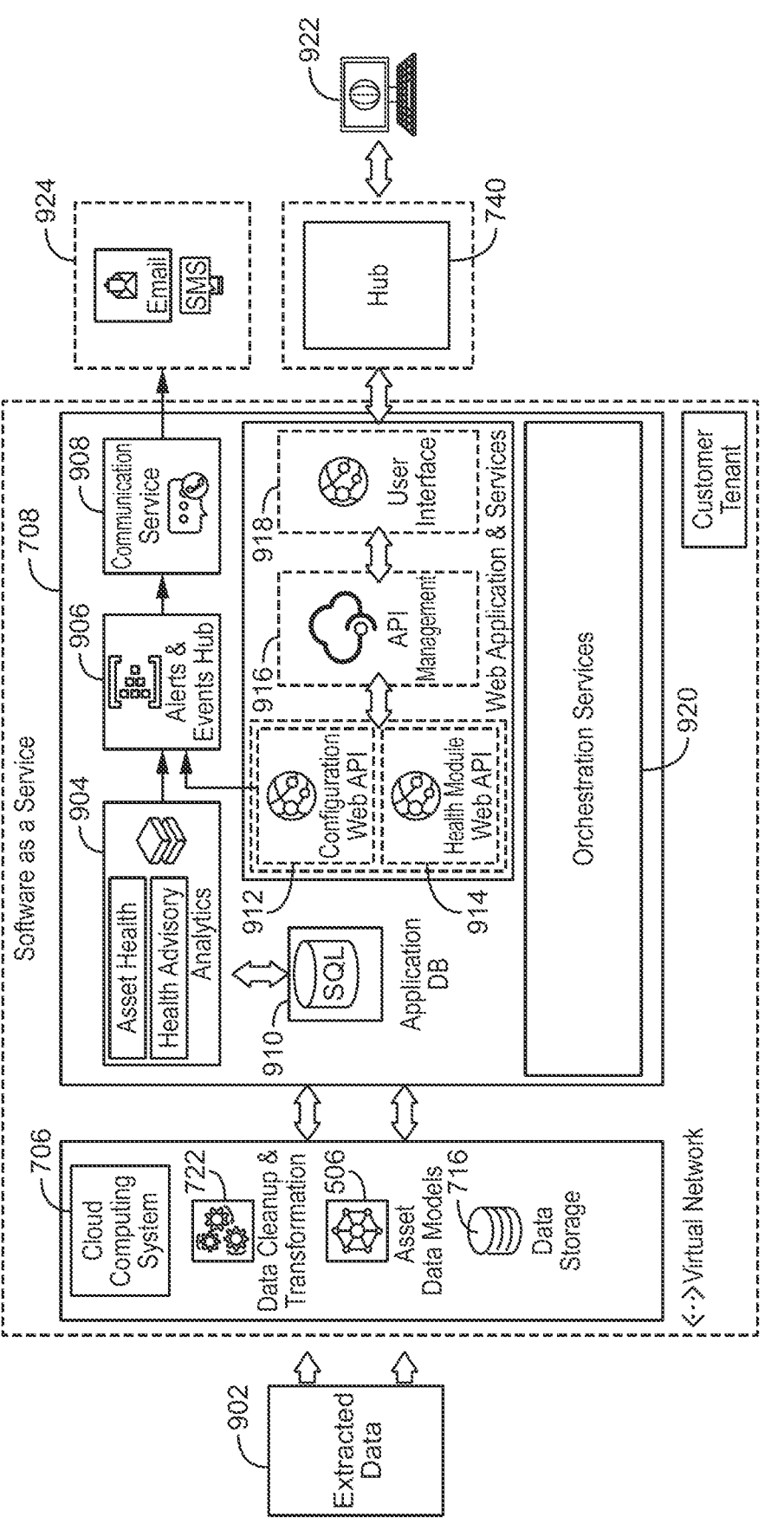
FIG. 9 is a block diagram of the application architecture of the asset intelligence management system of FIG. 5, according to some embodiments.

Referring now to FIG. 9, a block diagram of the application architecture 900 of the asset intelligence management system 500 is shown, according to an exemplary embodiment. The application architecture 900 shows the architecture (e.g., back-end) of an application which gives the user access to the asset intelligence management system 500.

The application architecture 900 includes extracted data 902. As described above, the extracted data 902 may be received from the edge data store 704. In some embodiments, the extracted data 902 may be contextualized. The extracted data 902 may be sent to the cloud computing system 706 where the data is processed by the data transformation 722. The cloud computing system 706 also stores the asset models 506 and the extracted data 902 in data storage (e.g., cloud historian 716). The data stored in the cloud computing system 706 may be sent to the SAAS application 708. Specifically, the data contextualized by the data transformation 22 and the asset models 606 are sent to the SAAS application 708.

The SAAS application 708 may be configured to ingest the contextualized data and asset models 506 to generate KPIs and predictions about the operation of the assets 502 as described above. Specifically, the SAAS application 708 includes analytics 904 which is configured to generate analytics regarding the assets based on the asset models 506. As described above, the asset models 506 may be executed to generate KPIs and predictions about the operation of the assets 502. For example, one or more KPIs may be generated which describe the health of an asset or a health advisory for the asset including a Current Risk Score, a Sensor Fault, a Data Availability Confidence Score, a Future Risk Score, Future Failure Indicator, an Advisory, and a Remaining Useful Life (RUL). Any predictions or KPIs generated by analytics 904 may be stored in an application database 910. The generated KPIs and predictions may be sent to an alerts and events hub 906.

The alerts and events hub 906 can represent a pipeline to stream or forward traffic from analytics 904 to the communication service 908. For example, the alters and events hub 906 can be an intermediary device between the analytics 904 and the communication service 908. In some embodiments, the communication service 908 provides multichannel communication APIs for facilitating communication between the SAAS application 708 and any user devices. Specifically, the communication service 908 may facilitate communication by adding email and SMS communication with user devices 924.

The SAAS application 708 includes one or more web applications and services including a configuration web API 912, a health module web API 914, an API management 916, and a user interface framework 918. In some embodiments, the application database 910 is communicably coupled with the configuration web API 912. The configuration web API 912 may be configured to assist with deploying the SAAS application 708. Specifically, the configuration web API 912 provides a service to centrally manage application settings and feature flags. Some software-as-a-service applications that run in a cloud environment, such as SAAS application 708, may have components which are distributed. Distributing configuration settings in a cloud across these components can lead to hard-to-troubleshoot errors during an application deployment. The configuration web API 912 can store all the settings for a software-as-a-service application in one place to avoid this issue. The health module web API 914 may be configured to determine the health of the SAAS application 708. Specifically, the health module web API 914 may be configured to monitor instances of the SAAS application 708. The health module web API 914 increases the availability of the SAAS application by rerouting requests away from unhealthy instances and replacing instances if they remain unhealthy.

The API management 916 is a hybrid, multi-cloud management platform for APIs across one or more environments. As a platform-as-a-service, the API management 916 supports the complete API lifecycle. Specifically, the API management 916 controls operations of the configuration web API 912, the health module web API 914, and any other APIs associated with the SAAS application 708.

The user interface framework 918 may be a JavaScript based framework for developing applications and any associated user interfaces. The user interface framework 918 may be used to develop user interfaces for the SAAS application 708. The developed user interfaces may be sent to the hub 740 which is the front end application and displayed on a user device 922. In some embodiments, the user device may be any type of computing device such as a laptop, a mobile device, a tablet, etc.

The SAAS application 708 may also include data orchestration services 920. In some embodiments, the data orchestration services 920 may be a cloud service that you can use to create data analytics and create data transformations from unorganized data. The orchestration services 920 does not perform the data transformations itself, but instead calls on different services to perform different tasks in order to facilitate the data transformation.

Batch Performance Application of Homogeneous Data Model

Referring now to FIGS. 16-26, systems and methods for monitoring batch performance within an industrial application are described according to an exemplary embodiment. Industrial entities may produce large quantities of physical products, such as foods, chemicals, and medicines, in many batches. Industrial entities may desire tighter control and manufacturing performance insights to improve product quality, resource and capacity utilization while maximizing yield, and reducing costs while producing batches of the physical products. Ideally, each time a batch is produced, the batch should meet key performance indicator (KPI) targets. However, manufacturing processes often lack visibility on process variability and determined causes for that process variability. Further, manufacturing personnel may not have standards that define the KPIs that make up a standardized and ideal (e.g., "golden batch") and their associated criteria. Operating setpoint changes during production if entered manually by the operator, may not be optimal. As a result, inconsistent quality and off-spec batches are produced, and plant operations lack insights or the ability to make process corrections until it is too late.

For a production batch to be released post-inspection, all the deviations in manufacturing must be investigated and addressed with the implementation of a Corrective and Preventative Action (CAPA). Investigation and resolution can become more costly as the production defects are ignored for longer. Current systems and methods rely on custom tools and manual solutions to analyze batch performance, determine causes of deviations from the target KPIs (e.g., golden batch), and make improvements. These manual solutions and custom tools are not always reliable. For example, the custom tools can break when source code changes or domain knowledge is lost due to subject matter expert unavailability. As another example, manufacturing personnel may be required to manually enter data into spreadsheets from paper records to perform analysis and make improvements which are difficult to mentally perform when considering data from a large quantity of sites, products, and batches. Therefore, systems and methods for automatically monitoring the batch performance in such manufacturing processes may be desired.

Figure 16:
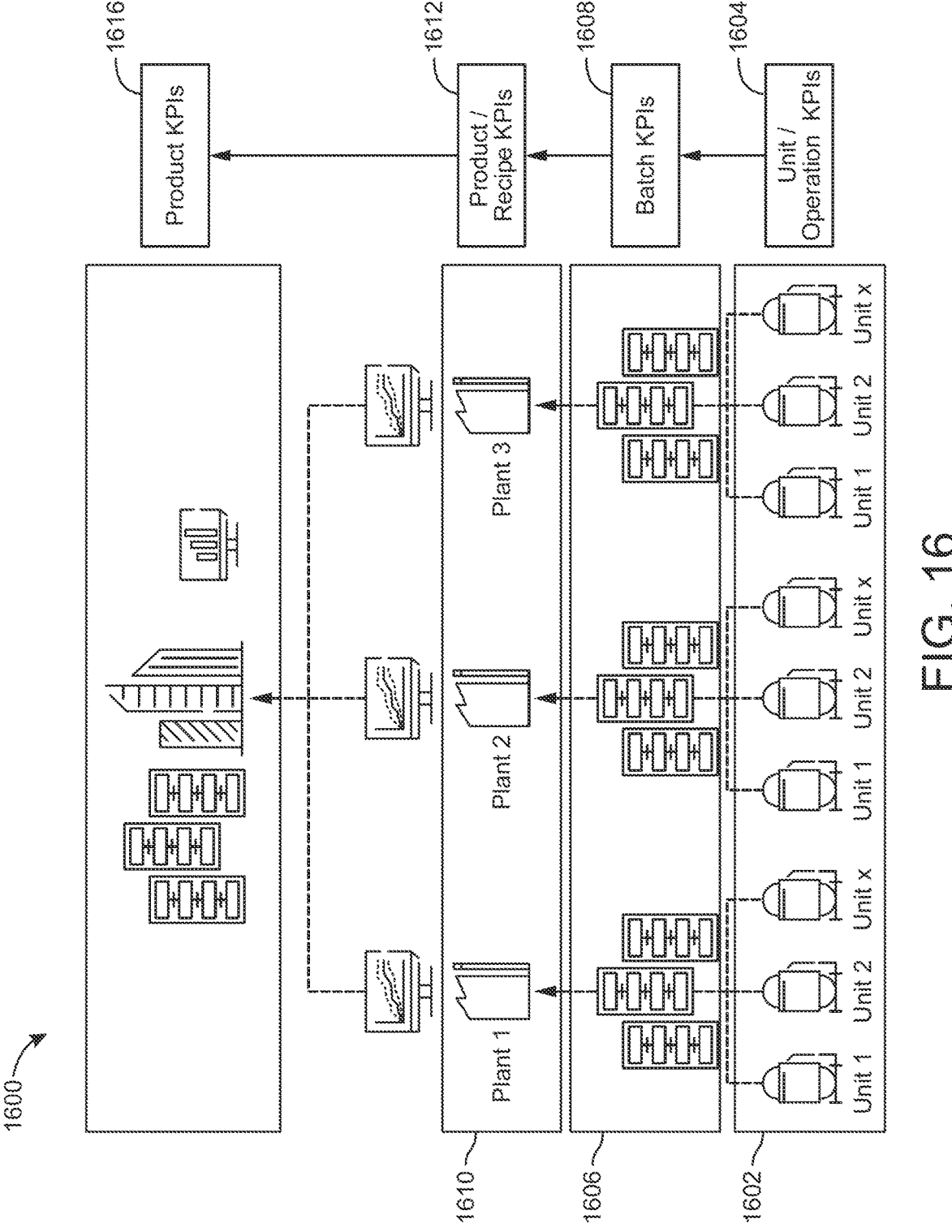
FIG. 16 is a diagram of an enterprise that produces a product, according to some embodiments.

Referring to FIG. 16, a diagram of an enterprise 1600 that produces a product is shown according to an exemplary embodiment. In some embodiments, the enterprise 1600 may be any type of industrial enterprise within the life sciences industry or chemical and consumer packaged goods industries which produces a physical product. For example, the enterprise 1600 may be a chemical plant which produces chemical fertilizer. As another example, the enterprise 1600 may be a pharmaceutical industry which produces medicines. As yet another example, the enterprise 1600 may be an industrial bakery which produces food products. These examples described above are not meant to limit the enterprise 1600 to the examples provided. The enterprise 1600 can be any enterprise which produces products in batch quantities.

The enterprise 1600 may produce products at one or more plants 1610. For example, the enterprise 1600 may produce its products at 3 plants. Each of those three plants may include one or more production units 1602. The production units 1602 may be tanks which the product is generated in. In some embodiments, the production units 1602 may be any other type of equipment used during the manufacturing process. In some embodiments, unit KPIs 1604 may be generated for each of the units 1602. The unit KPIs 1604 may describe any key operational characteristics for the manufacturing process at the unit operation level. Each of the units 1602 may produce product batches 1606. A batch may be defined as a group of products created at the same time and at the same location (e.g., at the same plant/unit). In some embodiments, batch KPIs 1608 may be generated for batches 1606. The batch KPIs may describe any key characteristics for the batches. In some embodiments, the batch KPIs 1608 may be generated based on the unit KPIs 1604. In some embodiments, product KPIs 1612 may be generated for plats 1610. In some embodiments, the product KPIs 1612 may be generated based on the batch KPIs 1612. In some embodiments, product KPIs 1616 may be generated for the entire enterprise 1600. These product KPIs 1616 may describe key characteristics for all the products produced across multiple sites for the enterprise 1600.

Figure 17:
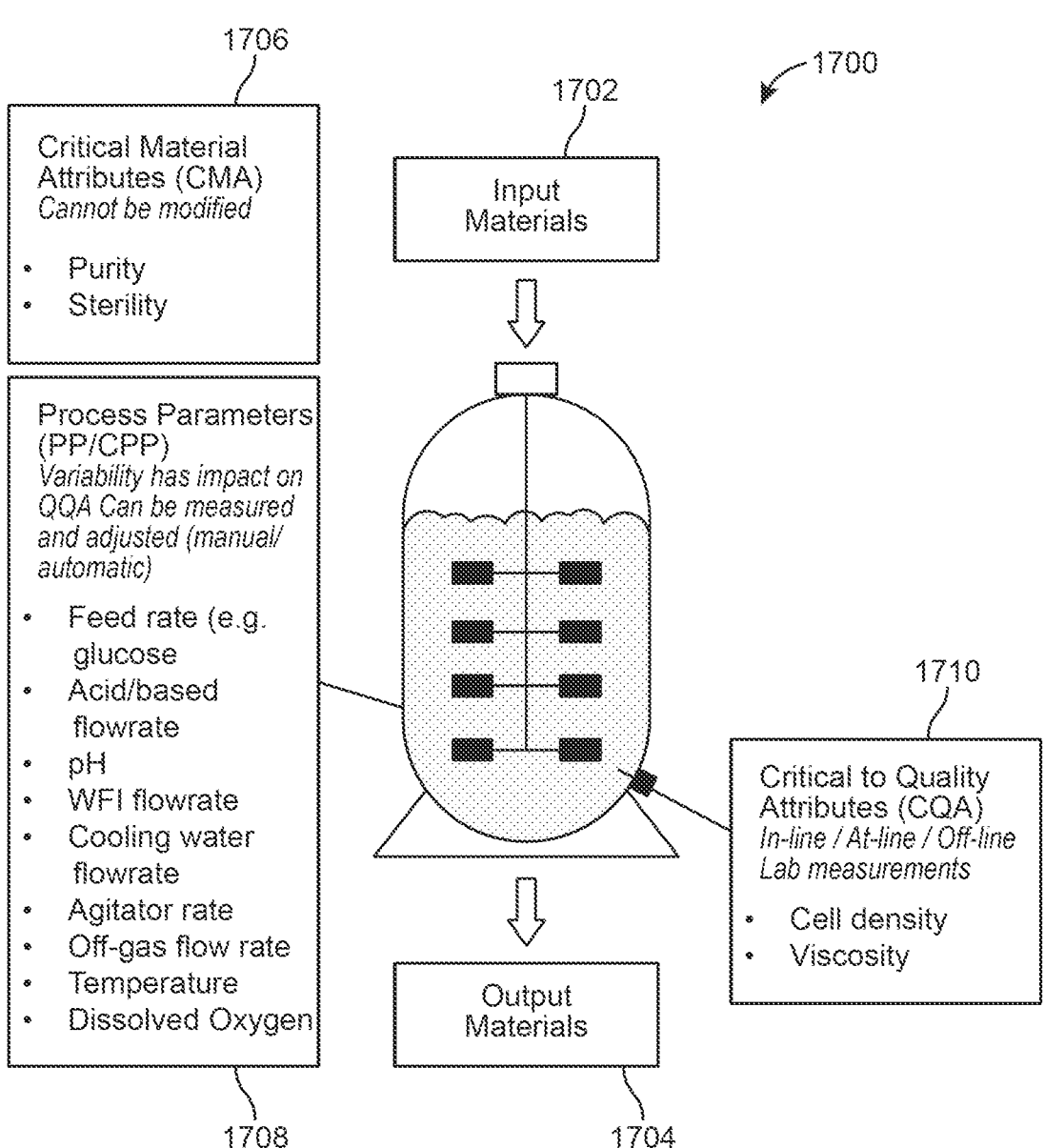
FIG. 17 is a diagram of the batch produced by the enterprise of FIG. 16, according to some embodiments.

Referring now to FIG. 17, a diagram 1700 of a batch produced by one of the units 1602 is shown, according to an exemplary embodiment. The production unit 1602 may receive input materials 1702 and produce output materials 1704. The output materials 1704 may be any type of product produced by the production unit 1602. In some embodiments, the input materials 1702 may be characterized by one or more critical mass attributes (CMAs) 1706. The CMAs 1706 may be defined as any physical, chemical, or biological characteristic of the input materials 1702. For example, in the embodiment shown in FIG. 17, the CMAs 1706 may describe the purity of the input materials 1702 and the sterility of the input materials 1702. Typically, the CMAs 1706 cannot be modified. For example, the chemical composition of the input materials 1702 cannot be modified. The batch may also be described by critical process parameters 1708. The critical process parameters 1708 may be defined as process parameters which have an impact of the output product 1704 of the batch. Specifically, the critical process parameter (CPPs) 1708 may be monitored to detect deviations in standardized production operations and product output quality or changes in critical to quality (CQA) attributes 1710 for the batch produced by 1602. In the example embodiment shown in FIG. 17, the CPPs 1708 may include a feed rate, an acid/base flow rate, a pH, a WiFi flowrate, a cooling water flowrate, an agitator rate, an off-gas flowrate, a temperature value, and a dissolved oxygen. In some embodiments, the CQA attributes 1710 may be defined as physical, chemical, biological, or microbiological properties or characteristics that should be within a pre-determined limit, range, or distribution to ensure a desired product quality. In the example embodiment shown in FIG. 17, the CQA attributes 1710 may include a cell density and a viscosity. Each of the CPP 1708 and the CQA 1710 may be used to determine unit KPIs 1604, batch KPIs 1608, product KPIs 1612, and product KPIs 1616.

Figure 18:
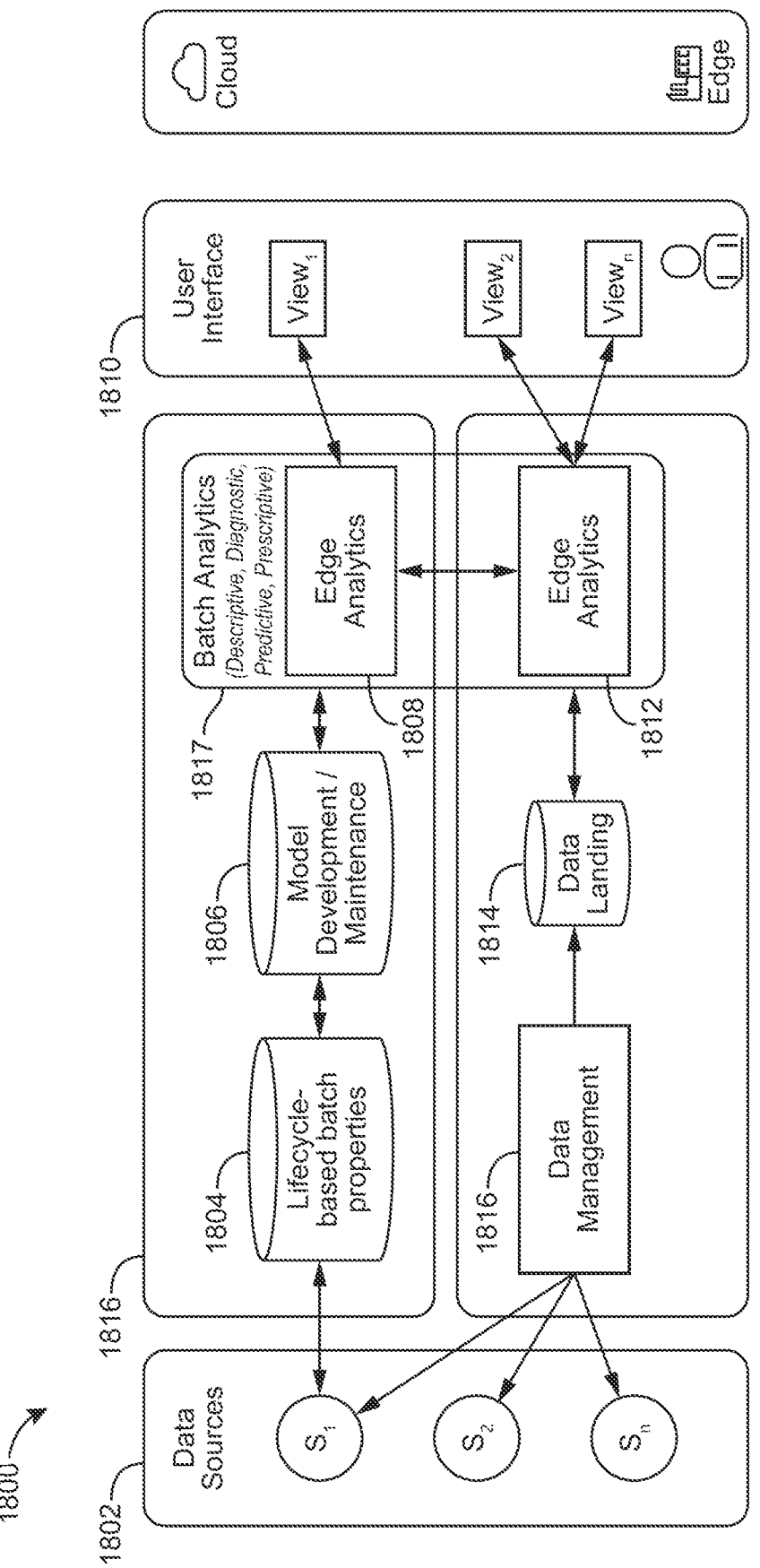
FIG. 18 is a block diagram of a batch performance analytics system using the homogeneous data model of FIG. 3, according to some embodiments.

Referring now to FIG. 18, a block diagram of a batch performance analytics system 1800 using the homogeneous data model 100 is shown, according to some embodiments. The batch performance analytics system 1800 is an industry solution that acts to automatically monitor the batch production process by the enterprise 1600 to improve the batch performance in such manufacturing processes. The batch performance analytics system 1800 is an industrial internet of things (IIoT) solution which provides KPI dashboarding and analytics capabilities from disparate data sources. Specifically, the batch performance analytics system 1800 automates the aggregation and contextualization of batch data from the disparate data sources, correlates key variables that can impact the KPIs, and provides KPI roll up capabilities for supervisory visualization from the unit level to the enterprise level.

As mentioned above, the batch performance analytics system 1800 includes disparate data sources 1802. The disparate data sources 1802 may be data collected from shop floor systems, historians, laboratory information management systems, and manufacturing execution systems, among other data sources. In some embodiments, the data from the data sources 1802 may be stored in the lifecycle-based batch properties database 1804. In some embodiments, a data manager 1816 may be configured to manage the lifecycle-based batch properties database 1804. For example, the data manager 1816 may be configured to record the identity of users entering, changing, confirming, or deleting data in the database 1804 including date and time. The data manager may also be configured to manage the aggregation of data by the data sources 1802. In some embodiments, the data manager 1816 may implement configuration and auditing features within the system 1800. For example, the data manager 1816 may perform user access assignment, implement tag mapping to application-specific elements, audit logs for monitoring actions performed by users and machine accounts, etc. The data manager 1816 may be configured to manage the contextualization of data from the data sources 1802. In some embodiments, the lifecycle-based batch properties database 1804 is coupled to model database 1806. The model database 1806 may be configured to develop, generate, train, and maintain a batch analytics data model. The batch analytics data model may be an extension of the homogenous data model 100 which is described in more detail above. In some embodiments, the data manager 1816 may be coupled to a data landing 1814. In some embodiments, the data landing 1814 may be configured to do any preliminary preprocessing (e.g., filtering, cleaning, etc.) of the data before the data is analyzed by an analytics system 1817. The analytics system 1817 may be configured to determine one or more KPIs for a batch/product based on the data from the data sources 1802 and the batch analytics model stored in the database 1806. The analytics system 1817 may include a portion which is run on the cloud (e.g., enterprise analytics 1808) and a portion which is run on the edge (e.g., edge analytics 1812). The process for generating KPIs is described in more detail with respect to FIG. 18. The generated KPIs may be displayed on the user interface 1810.

Figure 19:
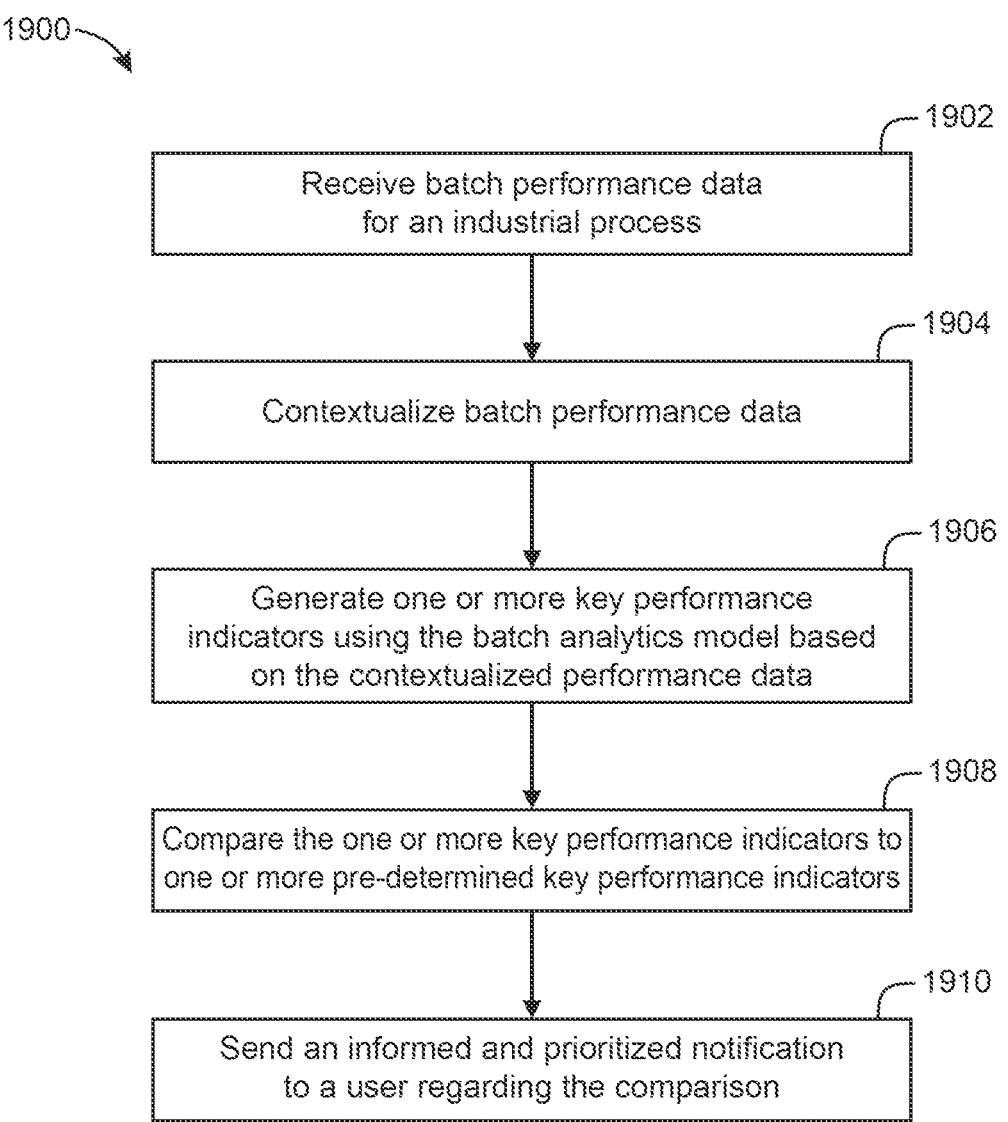
FIG. 19 is a flow diagram of a method implemented by the batch performance analytics system of FIG. 18, according to some embodiments.

Referring now to FIG. 19, a method 1900 for generating one or more KPIs describing the performance of one or more batches produced by an enterprise is shown according to an exemplary embodiment. In some embodiments, the method 1900 may be performed by the batch performance analytics system 1800.

The method 1900 begins at step 1902 receives batch performance data for an industrial process. For example, as described, the batch performance data may be received from the data sources 1802. The batch performance data may include the CMAs 1706, the CPPs 1708, the CQAs 1710.

The method 1900 continues to step 1904 where in the batch performance data received at step 1902 is contextualized. In some embodiments, the batch performance data may be contextualized by the data management system 1804. Contextualizing the data refers to a process of linking pieces of data together or adding related information to the batch performance data so that the data can be more easily digested. For example, it may be easier to determine trends and insights from data that is contextualized. Going back to the example shown in FIG. 17, the batch performance data may include CMAs 1706 (e.g., purity, sterility), however without knowing what batch is being produced (e.g., food product, chemical fertilizer, etc.), it can be difficult to know what the purity and the reference is due to. For example, if the purity is related to a food product, then the threshold for being considered within the appropriate limits for creating a batch may be higher than if the purity was related to a medicine product. Therefore, data contextualizing makes data easier to ingest and interpret.

The method 1900 continues to step 1906 where a batch analytics model is queried to determine one or more KPIs for one or more batches 1602 based on the contextualized batch performance data. Specifically, the batch analytics model may connect different pieces of data (e.g., timeseries data associated with different pieces of equipment, timeseries data associated with different sites, timeseries data associated with different products, etc.) and may use this connected data to provide information and determine KPIs in response to queries. For example, if a user wants to calculate a quality KPI, the system 1800 needs to know what recipe, what product, what time frame, and what parameters are associated with the query. The data model makes these connections between the product, time frame, parameter, etc. and provide all the necessary information to respond to the query. In some embodiments, the one or more KPIs may be a quality value. The quality value may describe the quality of the output product produced. In some embodiments, the user may be able to select from a list of quality attributes which quality attributes they would like to include in the quality KPI. In some embodiments, the one or more KPIs may be a cycle time value. The cycle time value may describe the average time it takes to produce one unit of a product from a batch. In some embodiments, the user may select a number of batches they would like included in the cycle time KPI. In some embodiments, the one or more KPIs may be raw material value. The raw material value may describe the quality of the input raw materials which are input into a batch to create a product. In some embodiments, the one or more KPIs may be an operator performance value. The operator performance value may describe the efficiency of an operator producing a project. In some embodiments, the one or more KPIs may be a yield value. The yield value may describe the units of products produced per batch based on the input materials.

In some embodiments, the KPIs can be combined to create an overall batch performance index (BPI). Specifically, a user may determine which KPIs to include and their relative weights in the BPI generation. For example, the user may decide to generate a BPI according to the equation below:

$$BPI=(0.5) \text{ cycle time value} \times (0.5) \text{ quality value}$$

As another example, the user may decide to generate a BPI according to the equation below:

$$BPI=(0.2) \text{ cycle time value} \times (0.2) \text{ quality value} \times (0.2) \\ \text{raw materials value} \times (0.2) \text{ operator performance} \\ \text{value} \times (0.2) \text{ yield value}$$

The method 1900 continues to step 1908 where the batch performance analytics system 1800 compares the one or more KPIs generated at step 1906 to one or more pre-determined performance indicators. The pre-determined performance indicators may be characteristics which describe a desired batch (e.g., a golden batch). In other words, the golden batch is the target batch which the enterprise 1600 is trying to create. Therefore, the pre-determined performance indicators may be considered target KPIs. The actual performance indicators generated at step 1906 may be compared to these target KPIs to determine the variation between the actual batch produced and the golden batch.

The method 1900 continues to step 1910, the batch performance analytics system 1800 sends an informed and prioritized notification to the manufacturing personnel regarding the comparison. Specifically, the KPIs determined at 1906 may be converted to graphical analytics (e.g., graphs, charts, messages, etc.) which describes how well the batch KPIs approximate the golden batch KPIs. This graphical information may be presented to the users through one or more user interfaces which will be described in more detail below.

Figure 20:
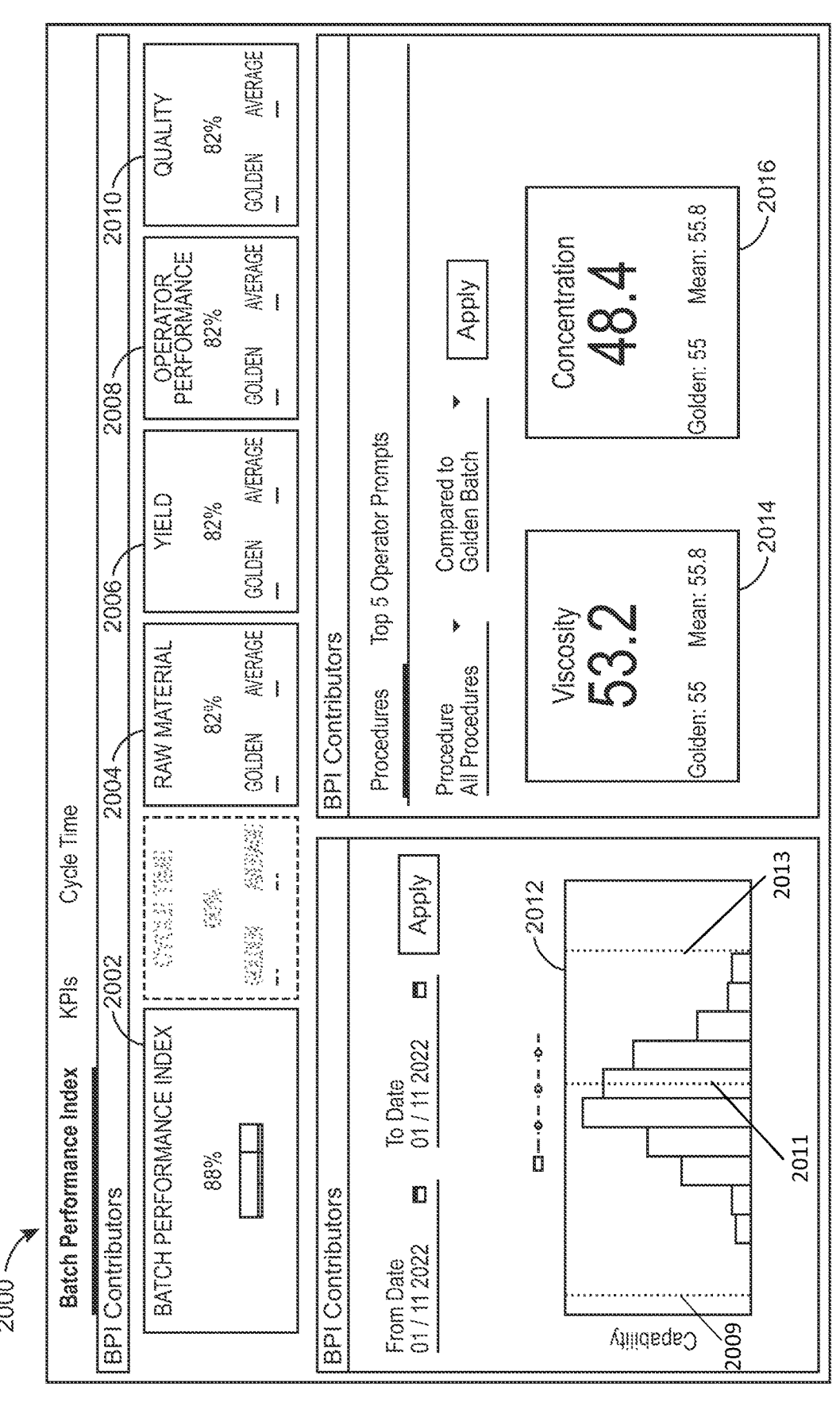
FIGS. 20-22 are example user interfaces showing various dashboards and graphical illustrations produced by the batch performance analytics system of FIG. 18, according to some embodiments.

For example, referring to FIG. 20, an example user interface 2000 is shown according to an example embodiment. The example user interface 2000 may display a batch performance index 2002. The batch performance index may be defined as a combination of key performance indicators as described above. For example, in the example user interface 2000, the KPIs included in the BPI include the raw material KPI 2004, yield KPI 2006, operator performance KPI 2008, and quality performance KPI 2010.

In some embodiments, the example user interface 2000 also includes quality distribution histogram 2012 which shows the distribution of quality KPI values for multiple batches produced between two dates (e.g., Jan. 11, 2021-Jan. 11, 2021). In some embodiments, a mean 2011 of the quality KPI values is shown on the histogram 2012. The histogram 2012 also shows the upper specification limits (USL) 2009 and lower specification limits (LSL) 2013. The USL 2009 and LSL 2013 describe the upper and lower thresholds for acceptable values for the quality distribution KPI. In some embodiments, the histogram 2012 may display other KPIs such as the cycle time KPI, raw material KPIs, yield KPIs, and operator performance KPIs. In some embodiments, the example user interface 2000 may also display CQAs. Specifically, the user interface 2000 displays the viscosity 2014 and concentration 2016 compared to a golden batch.

Figure 21:
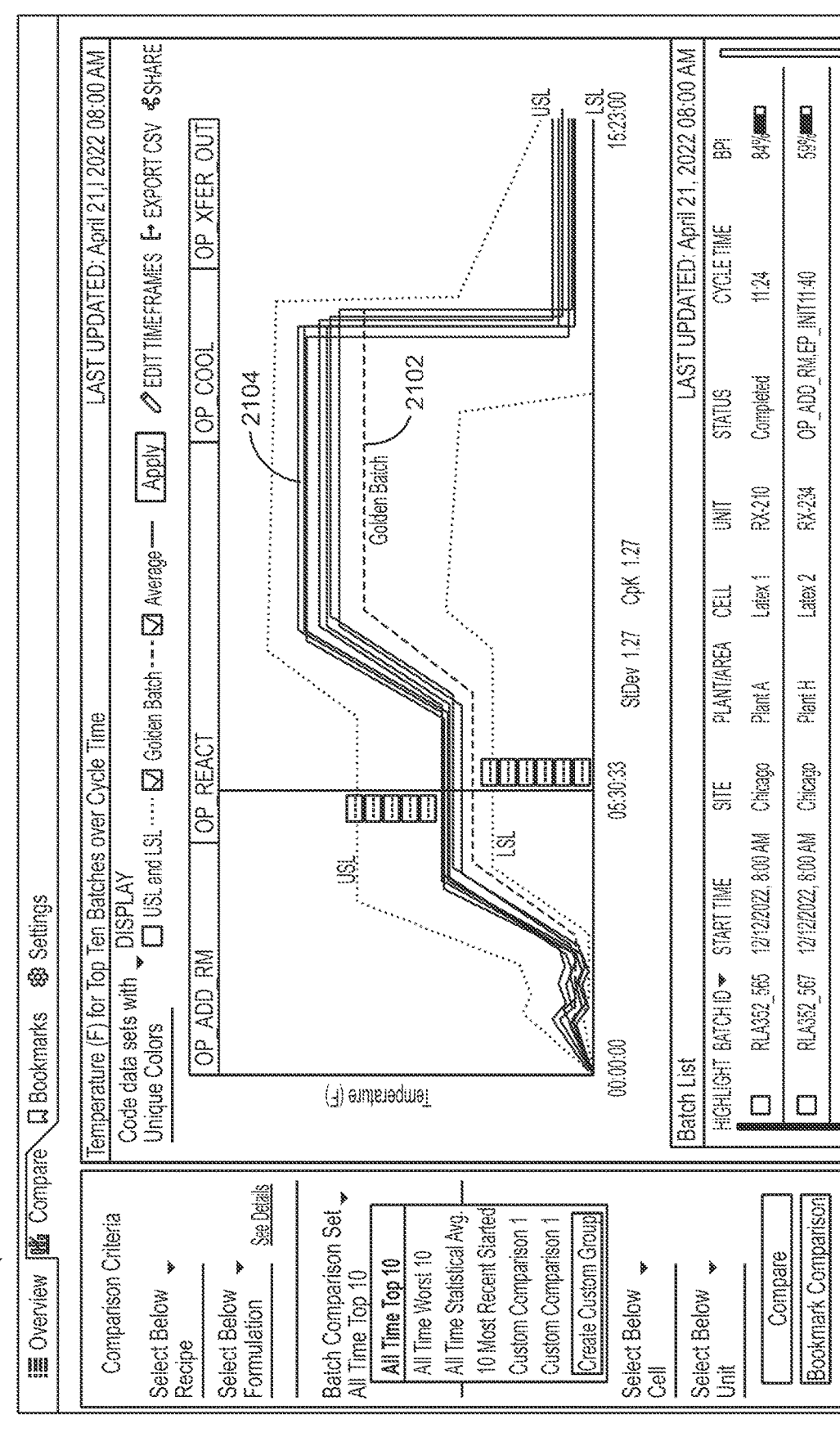

Referring now to FIG. 21, an example user interface 2100 is shown according to an example embodiment. The example user interface 2100 may be configured to display the temperature for a pre-determined number of batches (e.g., top 10, 20, etc.) over a cycle time period. The plotted temperature over time 2104 for the predetermined amount of batches is compared to the golden batch plotted temperature over time 2102.

Figure 22:
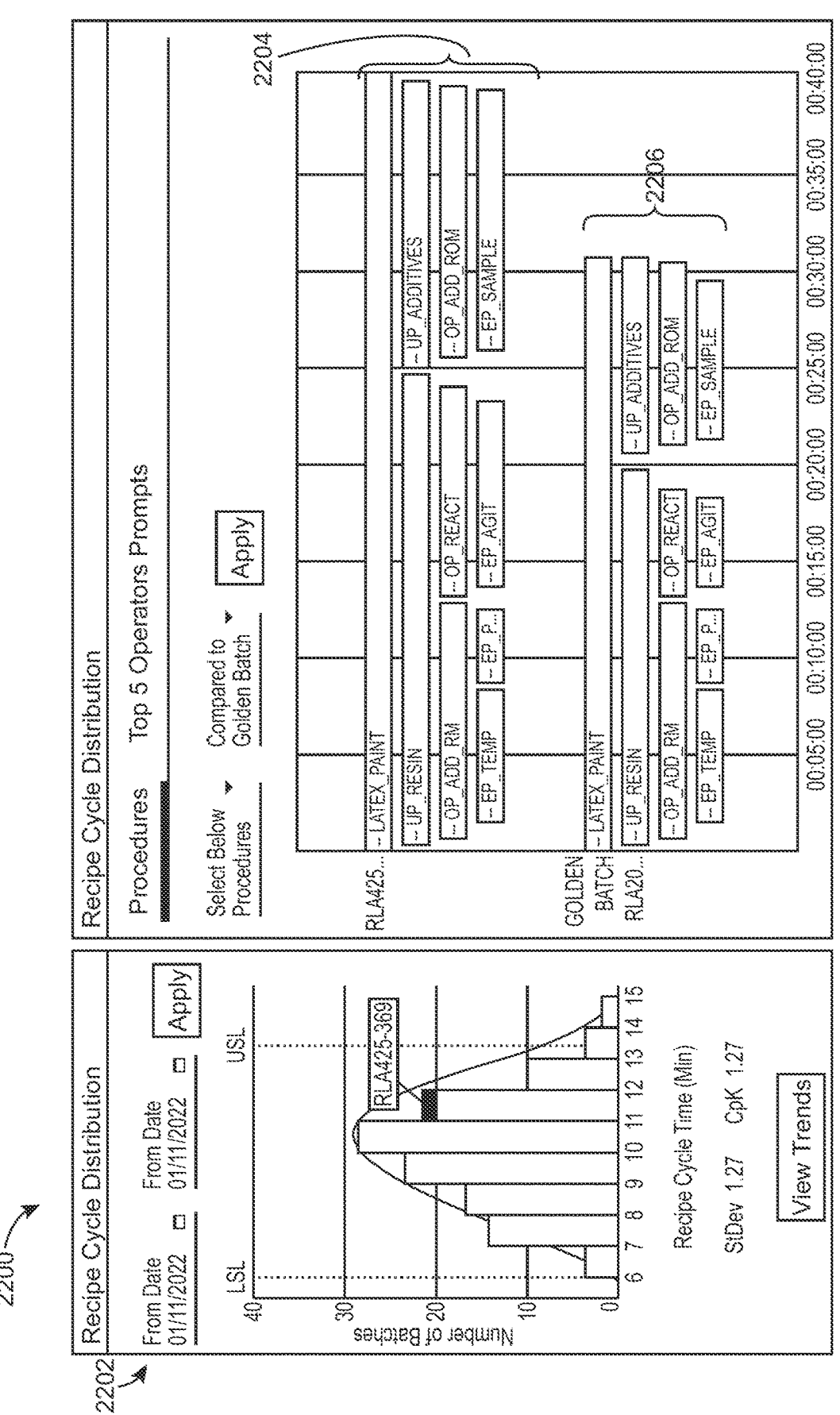

Referring now to FIG. 22, an example user interface 2200 is shown according to an exemplary embodiment. The example user interface 2200 may be configured to display a cycle time for a selected batch compared to a golden batch. Specifically, user interface 2200 includes a first user interface portion 2204 which is configured to display the cycle time for the selected batch. The user interface 2200 also includes a second user interface portion 2206 which is configured to display the cycle time for the golden or target batch. In some embodiments, the user interface 2200 may include a recipe cycle histogram distribution 2202. The recipe cycle histogram 2202 shows a distribution of the cycle time for one or more batches between two dates (e.g., Jan. 11, 2021-Jan. 11, 2021).

Figure 23:
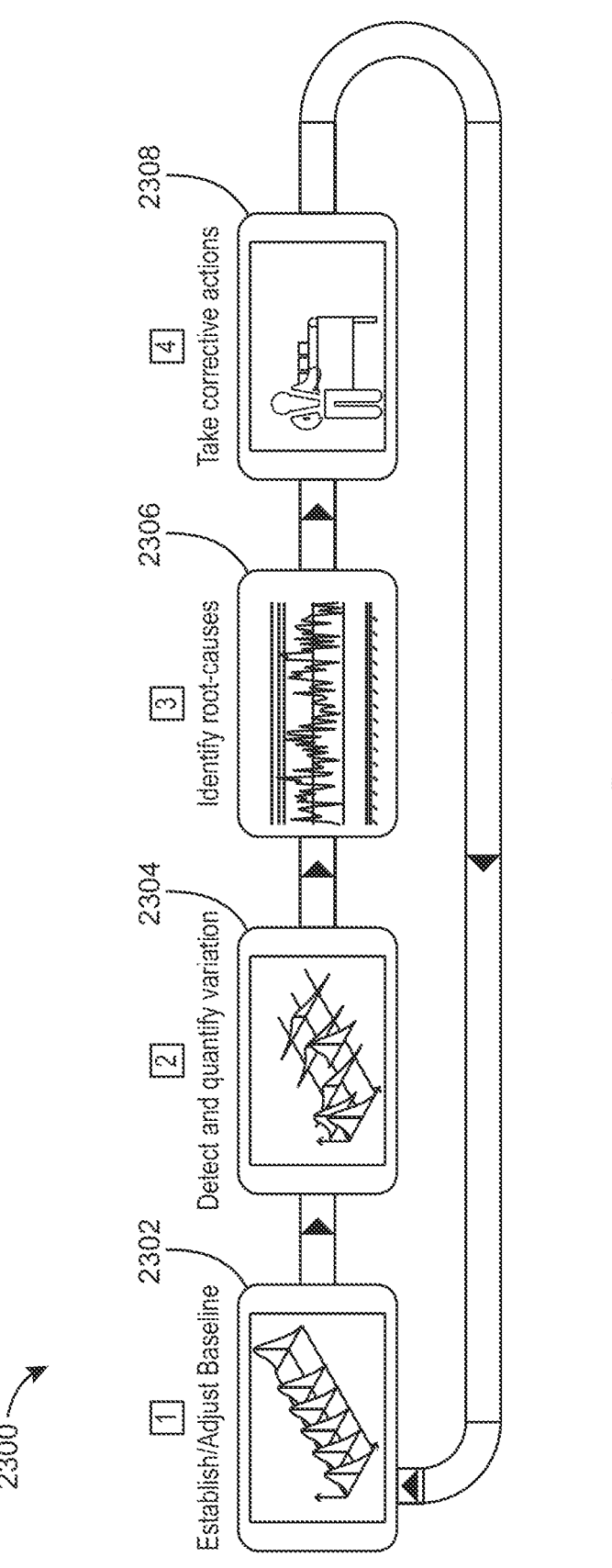
FIG. 23 is a flow diagram of a process for batch quality control, according to some embodiments.

Referring now to FIG. 23, a flow diagram of a process 2300 for batch quality control is shown, according to an exemplary embodiment. At the first step of the process 2300, a baseline for a KPI value for a batch is established at 2302. For example, the baseline for the quality KPI may be established to be above a certain threshold. As another example, the baseline for the cycle time KPI may be established to be between a lower threshold and a higher threshold.

In the next step for the process 2300, a variation between one or more actual KPIs which have been determined for the batch and the baseline KPI values established above is determined at step 2302. If the variation is large enough between the determined KPIs and the baseline KPIs, then the variation may be noted for further evaluation. Specifically, the variation may be further analyzed to determine the root causes of the variation at step 2306. In some embodiments, the real-time unit operation and batch performance metrics may be compared against targets to determine whether they are outside the bounds of the baseline set at 2302. At step 2306, the KPIs may be evaluated to determine what is causing the variation. For example, a change in raw materials may cause a drop in the quality KPI. These root causes may be determined by the batch performance analytics system 1800. Once the root causes have been identified at step 2306, one or more corrective actions can be taken to address the root causes of the variation. In some embodiments, the corrective action may include automatically updating the operation of the manufacturing process by operating one or more machines involved in the manufacturing process to implement the automatic update. For example, the operating temperature for generating the batch may automatically be updated if it is identified as a root cause for the variation. Based on the corrective action, the baseline for one or more KPIs may automatically be adjusted.

Figure 24:
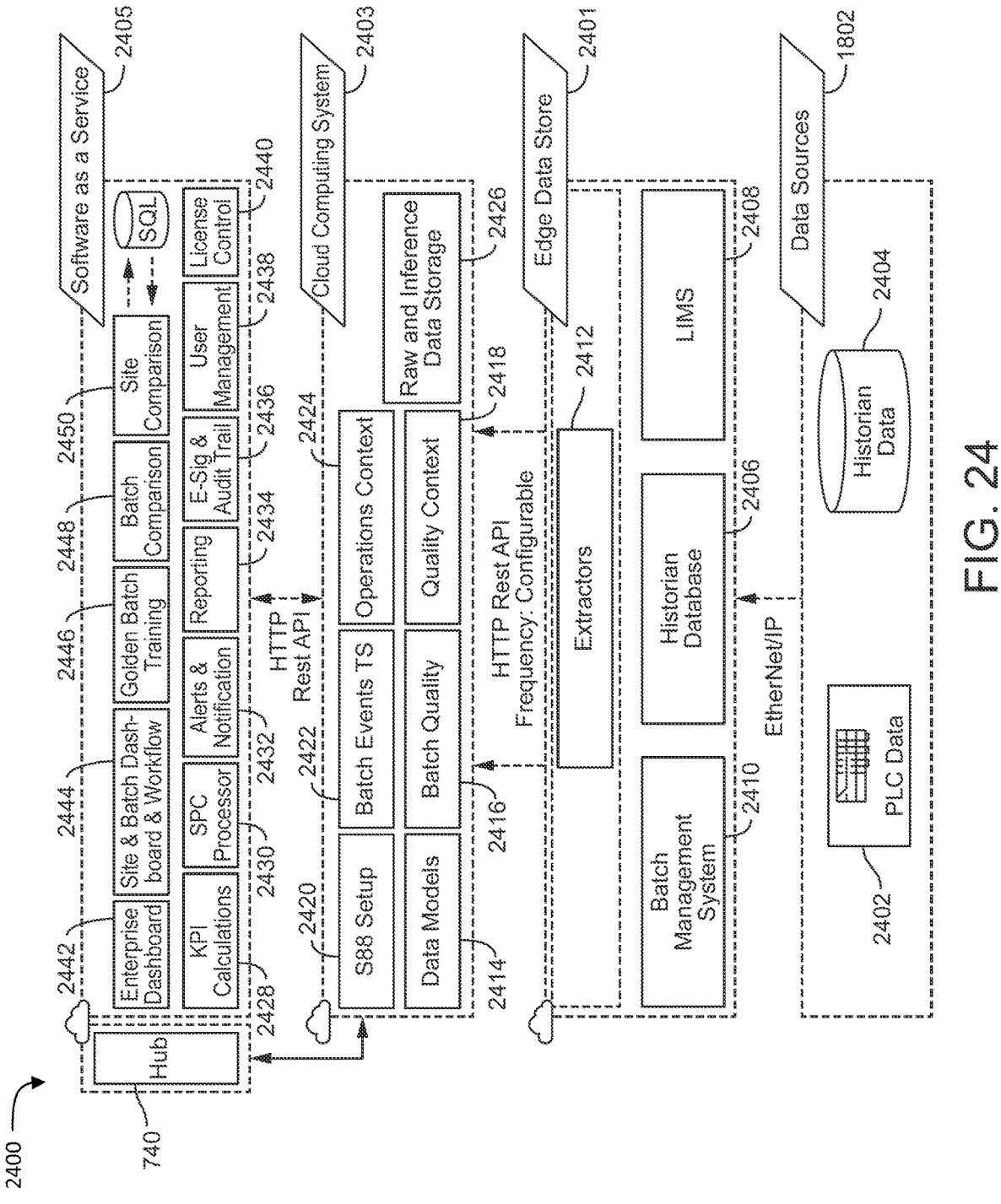
FIG. 24 is a first block diagram of the system architecture of the batch performance analytics system of FIG. 18, according to some embodiments.

Referring to FIG. 24, a first block diagram of a system architecture 2400 of the batch performance analytics system 1800 is shown according to an exemplary embodiment. In some embodiments, includes four portions that comprise the system architecture 2400 of batch performance analytics system 1800. Specifically, the system architecture includes data sources 1802, edge data store 2401, cloud computing system 2403, and a software as a service (SAAS) application 2405.

The data sources 1802 is a data layer that includes one or more data sources that are collected on-premises at a manufacturing plant. The data may include batch operation data for manufacturing one or more batches in a manufacturing plant. In some embodiments, the data sources 1802 includes many of the data sources discussed above. The batch operation data may be collected from shop floor systems, historians, laboratory information management systems, and manufacturing execution systems, among other data sources. In some embodiments, including the batch performance data may be stored in data historian 2404 and the plant system data 2402. The data historian 2404 may be a database which stores timeseries data associated with the batch manufacturing process. The plant system data 2402 may include data relating to control mechanisms for any of the plant components within a manufacturing plant (e.g., distributed control system (DCS), programmable logic controllers (PLC), etc.). The data collected at the data sources 1802 is sent to the edge data store 2401 through a network connection. In some embodiments, the network connection may include an Ethernet card and port for sending and receiving data via an Ethernet-based communications network and/or a Wi-Fi transceiver for communicating via a wireless communications network. The data sources 1802 may be structured to communicate with the edge data store 2401 via local area networks or wide area networks (e.g., the Internet) and may use a variety of communications protocols (e.g., IP, LON, Bluetooth, ZigBee, radio, cellular, near field communication).

The edge data store 2401 is another data storage layer within the system architecture 2402 where the data received from the on-premises manufacturing components (e.g., physical devices) is ingested and stored on the edge. The edge data store 2401 may be configured to store data which may be used for applications on the edge which is closer to the applications. Storing data on the edge, such as in the edge data store 2401, reduces latency by storing the data closer to the applications. In some embodiments, the edge data store 2401 includes one or more historian databases 2406. In some embodiments, the historian database 2406 stores the data received from the data sources 1802 in the historian database 2406. In some embodiments, the historian database 2406 contextualizes the data received from the data sources 1802 by associating process attributes to physical components in a manufacturing plant or facility.

In some embodiments, the edge data store 2401 may include batch management system 2410. The batch management system 2410 may be configured to automatically manage the batch generation process within a manufacturing plant. The batch management system 2410 may store data related to the batch manufacturing process. In some embodiments, the edge data store 2401 may include a laboratory information management systems (LIMs) 2408. The LIMs may be configured to keep track of data associated with samples, experiments, laboratory workflows, and instruments associated with a manufacturing plant.

The edge data store 2401 may also include extractors 2412. In some embodiments, the extractors 2412 may be configured to extract data from a database such as the historian database 2406. In some embodiments, data extraction may be implemented by a script or a tool that has access to the database and is configured to copy or transfer data from the database (such as the historian database 2406) to a separate application such as the cloud computing system 2403. In some embodiments, the extractors 2412 may include a PI extractor which is configured to extract data from a PI data management system. For example, PI extractor may be a Cognite PI extractor that connects to the OSISoft PI Data Archive and detects and streams time series data into Cognite Data Fusion (CDF) in near real-time. In parallel, the extractor ingests historical data (backfill) to make all time series available in CDF. The PI points in the PI Data Archive correspond to the time series in CDF. In some embodiments, the extractors 2412 may include a custom extractor. Custom extractors may be scripts or tools that source data from unconventional data sources like a custom database or a SAAS API and transform it to a form that can be loaded into the desired application or system such as the cloud computing system 2403. In some embodiments, the extractors 2412 may include a SQL extractor. The extracted data from the edge data store 2401 may sent to the cloud computing system 2403 by a Rest API call.

The cloud computing system 2403 may be configured to filter, process, and store the timeseries data received from the extractors 2412. The cloud computing system 2403 may include an S88 setup module 2420, batch analytic models 2414, batch events module 2422, batch quality modules 2416, operations context modules 2424, quality context modules 2418, and raw and inference data storage 2426. The S88 set up module 2420 may be configured to create a data structure with the cloud computing system 2403 according to S88 standards. In some embodiments, S88, or ISA-88, may be defined as a set of standards developed by the International Society of Automation (ISA) for batch process control. The S88 standard defines a modular approach to batch control, which involves breaking down the control system into smaller, more manageable modules. The S88 standard also defines a number of standard models that can be used for the different levels of the control system. In some embodiments, these models may include: an Equipment Module (EM): A model for the physical equipment and instruments used in the batch process. The models may include a Control Module (CM): A model for the control strategy used to implement the batch process. The models may include Recipe Procedure Model (RPM): A model for the batch procedures, including the recipe and the sequence of steps. By using these models, the S88 standard provides a structured approach to batch process control, which can help to reduce the complexity and increase the efficiency of the control system. The S88 standard is widely used in the process industries, such as chemical, pharmaceutical, and food and beverage manufacturing.

In some embodiments, the batch analytics models 2414 may be graph data structures which may be executed to determine batch analytics. In some embodiments, the batch events module 2422 may be configured to receive batch events. In some embodiments the batch quality module 2416 may be configured to determine the quality of a batch based on one or more KPIs determined for the batch. In some embodiments, the quality of a batch may be described by a batch performance index. In some embodiments, the operations context module 2424 may be configured to contextualize the batch performance operation data. In some embodiments, the quality context 2418 may be configured to contextualize the quality of the batches. In some embodiments, the batch operation data may be stored in raw and inference data storage 2426.

The contextualized batch performance operation data will be ingested by the SAAS application 2405 for training batch analytics models and generating key performance indicators for batches produced by a manufacturing process using batch analytics models. The SAAS application may include a plurality of modules which are configured to generate the batch performance KPIs and hub 740 for presenting the KPIs to a user. Specifically, the plurality of modules may include a KPI generation module 2428, a SPC processor module 2430, an alerts and notification master module 2432, a reporting module 2434, an E-Signature and audit trail module 2436, a user management module 2438, a license control module 2440, an enterprise dashboard 2442, a site and batch dashboard and workflow module 2444, gold batch tagging module 2446, a batch comparison module 2448, and a site comparison module 2450.

In some embodiments, the KPI generation module 2428 may be configured to determine the one or more KPIs for a batch or product as described above. In some embodiments, the statistical process control (SPC) processor module 2430 may be configured to use statistical methods to monitor and control the quality of a production process such as the manufacturing processes described herein. In some embodiments, the alerts and notification module 2432 may be configured to provide prioritized notifications and alerts to users regarding the generated KPIs.

In some embodiments, the reporting module 2432 may be configured to provide one or more reports including batch performance analytics. The report may include batch performance operation data, an assessment of batch KPIs compared to a golden batch, and an insights regarding the root causes for large variances between the batch KPIs and the golden batch KPIs. In some embodiments, the E-Signature and audit trail module 2436 may be configured to create a record of all GMP-relevant changes and deletions made by a user. For change or deletion of GMP-relevant data, the reason should be documented by the E-Signature and audit trail module 2436. Specifically, all changes to the batch performance data and settings (e.g., creations, modifications, and deletions incl. changes of access rights) should be captured in the audit logs in consolidated way with time stamp, user login, full username, old/new value and comments by the E-signature and audit trail module 2436.

In some embodiments, the user management module 2438 may be configured to manage the user experience for one or more users of the batch analytics system 1800. In some embodiments, the license control module 2440 may be configured to determine whether a user has a license to use the SAAS application 2405.

In some embodiments, the enterprise dashboard module 2442 may be configured to provide a graphical user interface which displays a dashboard. The enterprise dashboard may display information for all the sites at all the geographic locations which are associated with a particular entity The dashboard may include bath performance analytics including any generated KPIs for the batch. In some embodiments, the site and batch dashboard and workflow module 2444 may be configured to display to a user a particular site workflow view based on access right or role based permissions to that site dashboard that the user has access to.

In some embodiments, the golden batch tagging module 2446 may be configured to determine a golden batch for a product, determine any relevant KPIs for that golden batch, and link those KPIs to actual batch KPIs for the product. The golden batch KPIs and actual batch KPIs may be compared to determine a variation between the golden batch and the actual batch by the batch comparison module 2448. In some embodiments, the batch comparison module 2448 may be configured to compare multiple actual batches to each other. In some embodiments, the site comparison module 2450 may be configured to compare product KPIs between one or more sites.

In some embodiments, the hub 740 may be the front end of the application that is provided to the user. The hub 740 may be configured to authenticate and authorize users. Further, the hub 740 may be configured to generate and present graphical user interfaces to a user.

Figure 25:
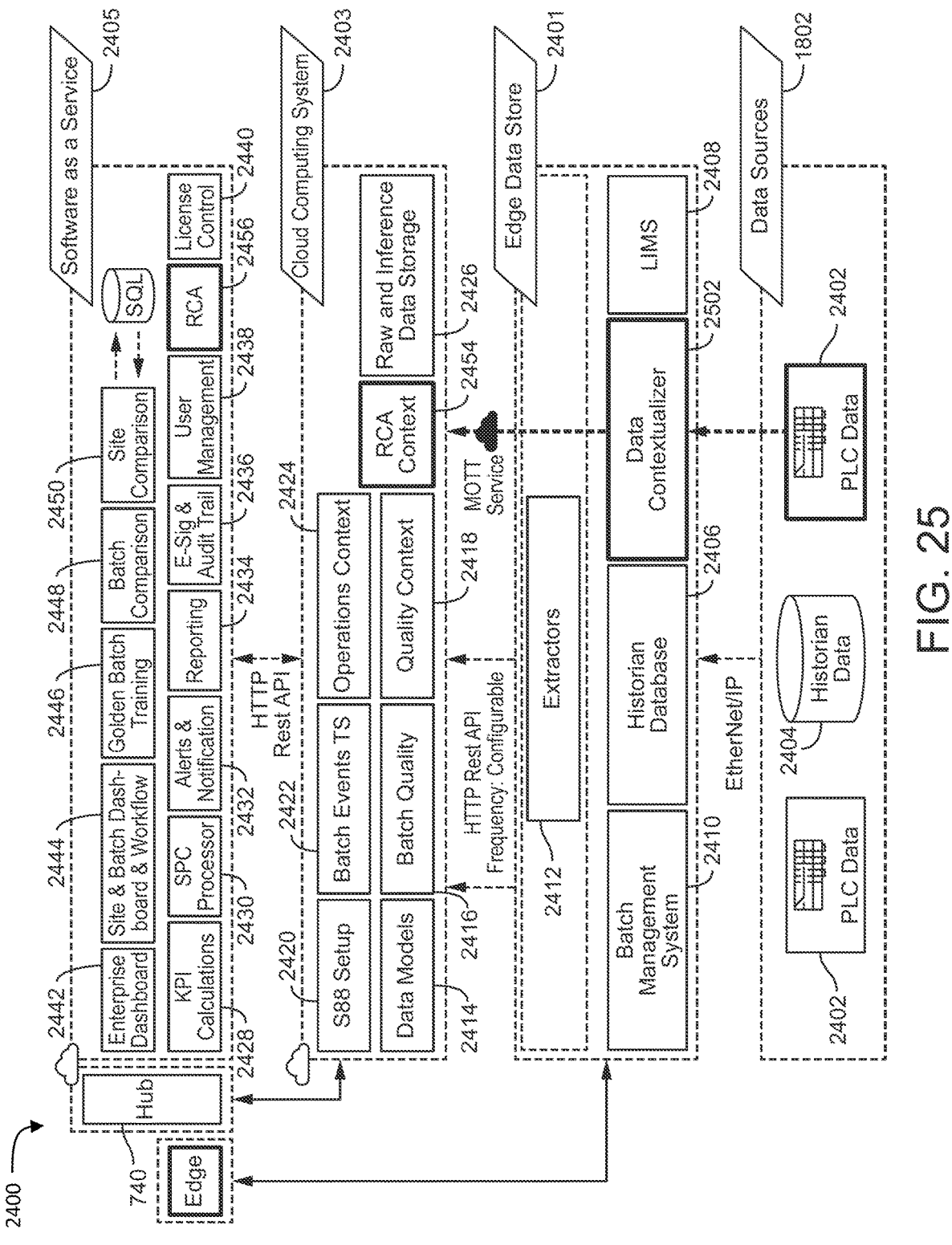
FIG. 25 is a second block diagram of the system architecture of the batch performance analytics system of FIG. 18, according to some embodiments.

Referring to FIG. 25, a second block diagram of system architecture 2400 of the batch performance analytics system 1800 is shown according to an exemplary embodiment. The second block diagram shown in FIG. 25 is similar to the first block diagram of the system architecture 2400 shown in FIG. 24. Specifically, the second block diagram includes many of same components described above with respect to FIG. 24. For example, the second block diagram, like the first block diagram of system architecture 2400, also includes four portions, data sources 1802, edge data store 2401, cloud computing system 2403, and SAAS application 2405, as described above.

The second block diagram of the system architecture 2400 differs from the first block diagram of the system architecture 2400 by including an additional component, namely a data contextualizer 2502. The data contextualizer 2502 may be configured to simplify and automate data collection and contextualization on the edge data store 1814. One of the challenges with data collection and analytics in manufacturing plants and operations is how to manage and contextualize the large volume of data generated from an incredibly wide range of equipment, sensors, and automation systems. This large volume of data is vital for the efficient management of these manufacturing plants and operations but only when this data is provided with proper context with its related equipment. At the edge, the data contextualizer 2502 may configure, connect, map, and contextualize the data to make the data stored in the edge data store 1814 to give the data more meaning. In some embodiments, the data contextualizer 2502 may further packages this data in a common information model.

The second block diagram of the system architecture 2400 shown in FIG. 25 also differs from the first block diagram shown in FIG. 24 by including a root cause analysis (RCA) context module 2454. As mentioned above with respect to FIG. 23, a root cause may be determined when the difference and variation between the actual KPIs for a batch and the golden batch is over a certain threshold. This root cause may be determined by RCA to determine the cause of this variation. The RCA context module 2454 may be configured to contextualize the root cause analysis data and provide the contextualized RCA data to the SAAS application 2405. The SAAS application 2405 may then be configured to determine, by a RCA module 2456, the root cause for the variation based on the RCA contextualized data.

Figure 26:
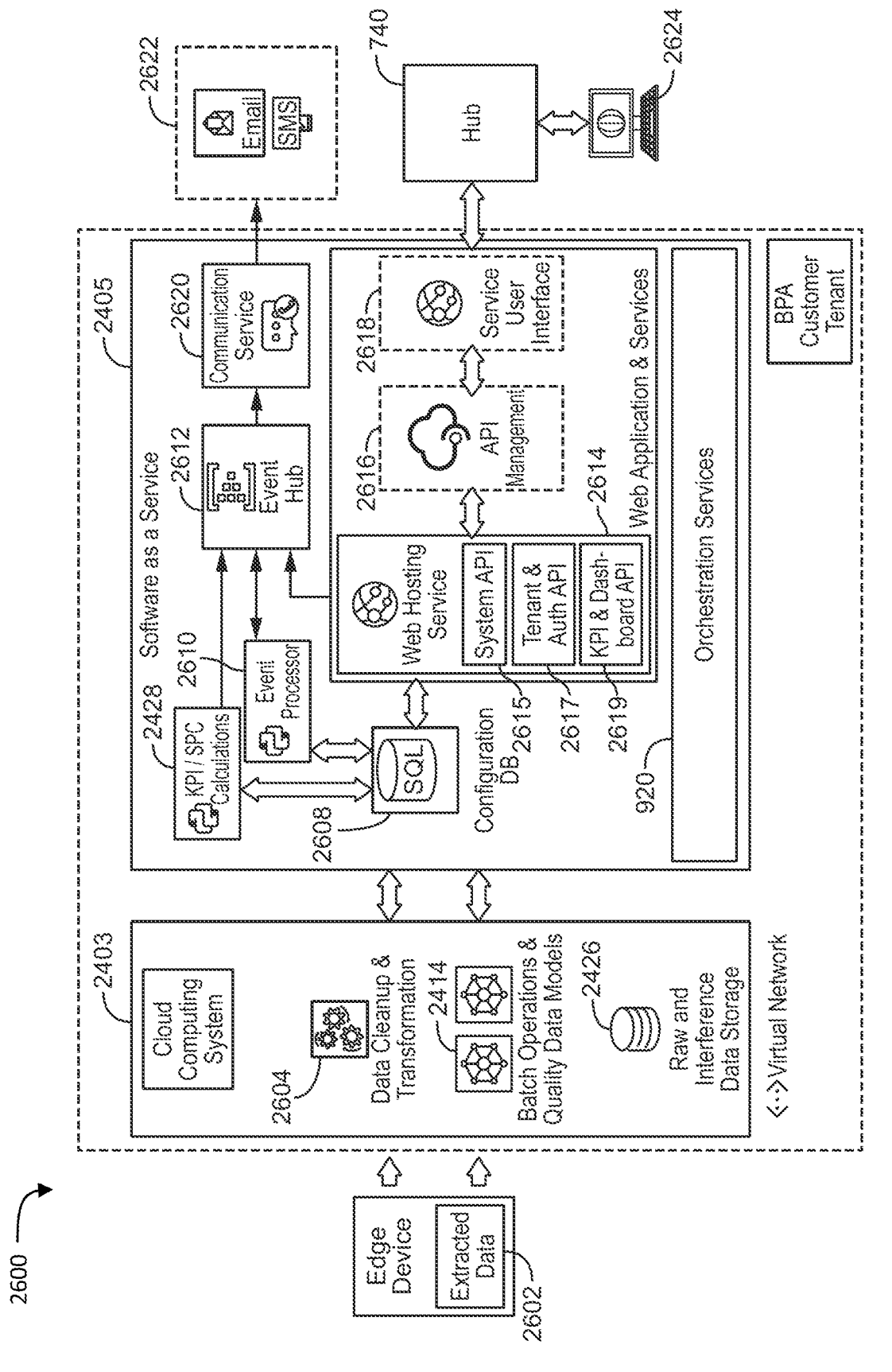
FIG. 26 is a block diagram of the application architecture of the batch performance analytics system of FIG. 18, according to some embodiments.

Referring now to FIG. 26, a block diagram of the application architecture 2600 of the batch performance analytics system 1800 is shown, according to an exemplary embodiment. The application architecture 2600 shows the architecture (e.g., back-end) of an application which gives the user access to the batch performance analytics system 1800.

The application architecture 2600 includes extracted data 2602. As described above, the extracted data 2602 may be received from the edge data store 1814. In some embodiments, the extracted data 2602 may be contextualized and transformed by data clean-up and transformation 2604. The extracted data 2602 may be sent to the cloud computing system 2403 where the data is processed. The cloud computing system 2403 also stores the batch analytics models 2414 and the extracted data 2602 in data storage (e.g., raw and inference data storage 2426). The data stored in the cloud computing system 2403 may be sent to the SAAS application 2405.

The SAAS application 2405 may be configured to ingest the contextualized data and batch analytics models 2414 to generate KPIs for one or more batches produced by a manufacturing process. Specifically, the SAAS application 2405 includes KPI calculation module 2428 which is configured to generate the KPIs for the one or more batches. As described above, the batch analytics models 2414 may be executed to generate the KPIs for one or more batches. For example, one or more KPIs may be generated which describe the performance of a batch may include a Cycle Time KPI, Quality KPI, Raw Materials KPI, Operator Performance KPI, and a Yield KPI. Any predictions or KPIs generated by the KPI calculation module 2428 may be stored in a configuration database 2608. The generated KPIs may be sent to an events hub 2612.

The events hub 2612 can represent a pipeline to stream or forward traffic from the KPI calculations module 2428 to a communication service 2620. For example, the events hub 2612 can be an intermediary device between the KPI calculations module 2428 and the communication service 2620. In some embodiments, the communication service 2620 provides multichannel communication APIs for facilitating communication between the SAAS application 2405 and any user devices. Specifically, the communication service 2620 may facilitate communication by adding email and SMS communication with user devices 2622.

The SAAS application 2405 includes one or more web application and services including multiple app service APIs 2614, an API management 2616, and a user interface framework 2618. In some embodiments, the configuration database 2608 is communicably coupled with the app service APIs 2614. The app service APIs may include a system API 2615, a tenant and authentication API 2617, and a KPI and dashboard API 2619. The system API 2615 may be configured to assist with deploying the SAAS application 2405. Specifically, the system API 2615 provides a service to centrally manage application settings and feature flags. Some software as a service applications that run in a cloud environment, such as SAAS application 2405, may have components which are distributed. Distributing configuration settings in a cloud across these components can lead to hard-to-troubleshoot errors during an application deployment. The system API 2615 can store all the settings for a software as a service application in one place to avoid this issue. The tenant and authentication API 2617 may be configured to authenticate users who would like to access the SAAS application 2405. In some embodiments, the tenant and authentication API 2617 may be configured to manage a multi-tenant application which serves and provides access for multiple tenants. The KPI and dashboard API 2619 may be configured to facilitate the generation of KPIs and presentation on one or more dashboards.

The API management 2616 is a hybrid, multi-cloud management platform for APIs across one or more environments. As a platform-as-a-service, the API management 2616 supports the complete API lifecycle. Specifically, the API management 2616 controls operations of the system API 2615, the tenant and authentication API 2617, the KPI and dashboard API 2619 and any other APIs associated with the SAAS application 2405.

The user interface framework 2618 may be a JavaScript based framework for developing applications and any associated user interfaces. The user interface framework 2618 may be used to develop user interfaces for the SAAS application 2405. The developed user interfaces may be sent to the hub 740 which is the front end application and displayed on a user device 2624. In some embodiments, the user device may be any type of computing device such as a laptop, a mobile device, a tablet, etc.

The SAAS application 2405 may also include data orchestration services 2620. In some embodiments, the data orchestration services 2620 may be a cloud service that you can use to create data analytics and create data transformations from unorganized data. The orchestration services 2620 does not perform the data transformations itself, but instead calls on different services to perform different tasks in order to facilitate the data transformation.

Energy Management Application of Homogeneous Data Model

Referring again to FIGS. 27-31, systems and methods for monitoring the consumption of energy and resources during industrial and manufacturing processes and managing the use of energy within a manufacturing process are shown according to exemplary embodiments. Energy is a critical asset for manufacturing or operation personnel to monitor to reduce costs, comply with regulations, and meet sustainability standards for industrial and manufacturing processes. There is valuable information contained within the machines and devices involved within the manufacturing process that can aid in understanding energy consumption and usage. However, this data can be difficult to extract, resulting in a costly, time-consuming effort to monitor and understand the energy consumption and usage. Improved awareness of energy usage is crucial for any energy management system—it helps an organization understand where, when, and how a manufacturing process in an industrial environment utilizes energy to establish the necessary scope of its energy savings efforts, define key metrics, and put the appropriate measures (such as schedules, alarms, and remediation) in place to meet any energy and sustainability standards.

Getting energy performance metrics from industrial equipment is challenging because the energy and resource data lacks operational context regarding time, source, type, and relation to the operational state of other manufacturing components and is generated at very high speeds. Without operational context, most industrial data is unstructured and captured at different timestamps, which creates a challenge to organize, manage, and glean insights from this data. Therefore, systems and methods for monitoring the consumption of energy and resources during industrial and manufacturing processes and manage the use of energy within a manufacturing process while accounting for operational context may be desired. Further, the systems and methods for managing energy described herein may use artificial intelligence and machine learning to control the production process for optimization of energy to reduce the cost as well as the carbon emission. Specifically, the system may be configured to determine the effects of weather versus production on energy usage, identify optimization opportunities, and detect early warnings for abnormal usage patterns.

Figure 27:
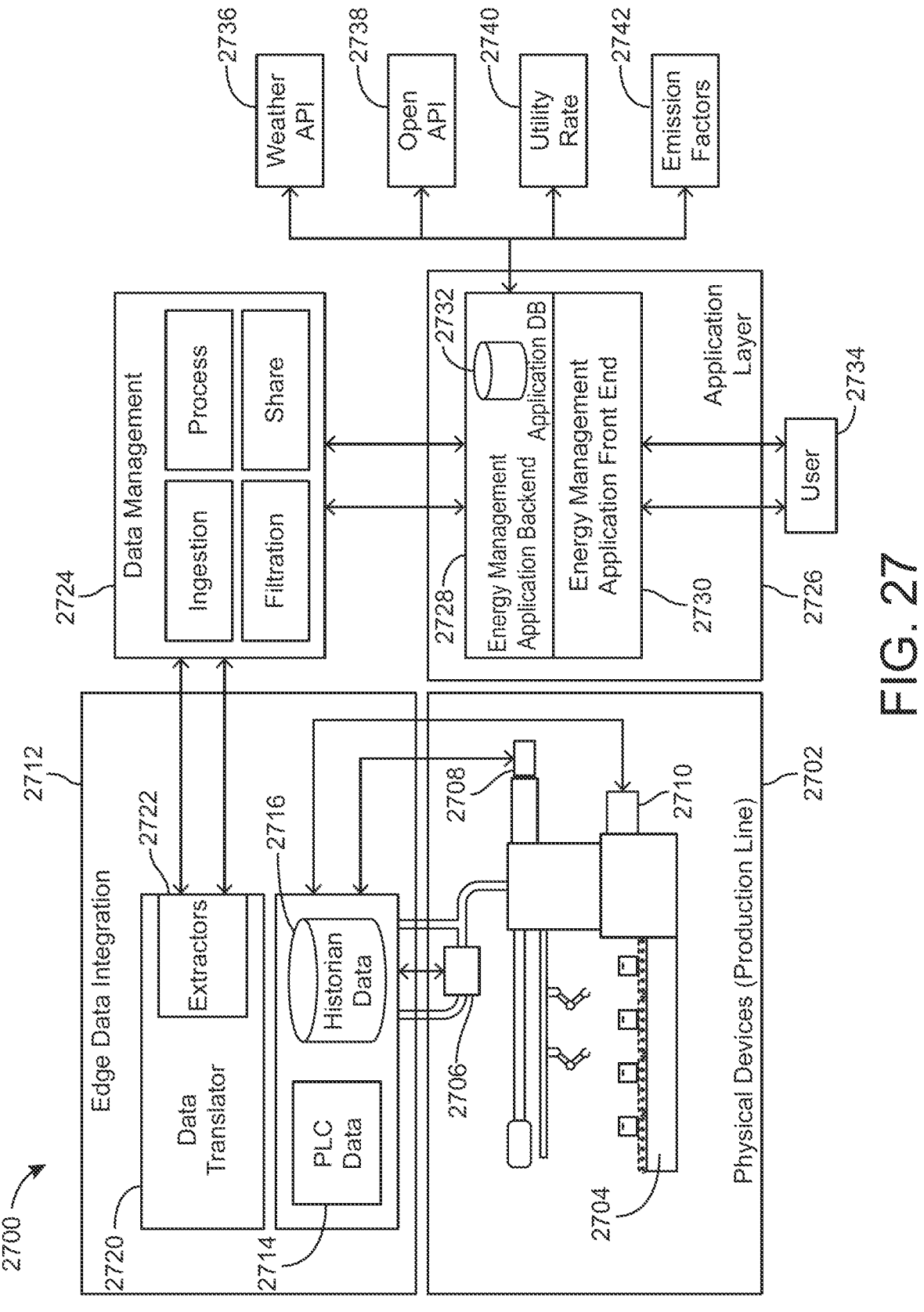
FIG. 27 is a block diagram of an energy management system using the homogeneous data model of FIG. 3, according to some embodiments.

Referring now to FIG. 27, a block diagram of an energy management system 2700 using the homogeneous data model 100 is shown, according to an exemplary embodiment. The energy management system 2700 may be configured to monitor the energy usage of a manufacturing process, gather energy data based on monitoring, and generate insights (e.g., analytics, KPIs, suggested actions, etc.) based on the gathered data.

The energy management system 2700 may include one or more physical devices 2702 used within a manufacturing process. In some embodiments, the manufacturing process may create a product. For example, the manufacturing process may be implemented in a chemical plant which produces chemical fertilizer. As another example, the manufacturing process may be implemented in a pharmaceutical industry which produces medicines. As yet another example, the manufacturing process may be implemented in an industrial bakery which produces food products. In some embodiments, the manufacturing process may be implemented by a production line 2704. The physical devices 2702 may include an electric meter 2708 which is configured to measure the electricity consumption by the production line 2704. The physical devices 2702 may also include a non-electric meter 2706 which is configured to measure the consumption of other resources (e.g., water, gas, etc.) by the production line 2704. In some embodiments, the one or more physical devices 2702 may also include a production sensor 2710 which is configured to determine the amount of product produced by the production line 2704.

In some embodiments, the data measured by the non-electric meter 2706, the electric meter 2708, and the production sensor 2710 may be sent to an edge data integration layer 2712. The edge data integration layer 2712 may be configured to receive data from a production line, pre-process the data, and store the data in a form that can be analyzed by a data management layer 2724. Specifically, the data from the physical devices 2702 can be stored in the historian database 2716. The historian database 2716 may be configured to store timeseries energy data from the physical devices 2702. The edge data integration layer 2712 may also include plant system data 2714. The plant system data 2714 may include data relating to control mechanisms for any of the physical devices (e.g., production lines) within a manufacturing plant (e.g., distributed control system (DCS), programmable logic controllers (PLC), etc.). The data stored in the edge data integration layer 2712 may be processed by a data translator 2720. Specifically, the data translator 2720 may be configured to retrieve operation data from automated devices such as the production line 2704 and deliver the operation data to third-party software.

The data integration layer 2712 may also include extractors 2722. In some embodiments, the extractors 2722 may be configured to extract data from a database such as the historian database 2716, parse the data, and send the data to the data management layer 2724. In some embodiments, data extraction may be implemented by a script or a tool that has access the database and is configured to copy or transfer data from the database (such as the historian database 2716) to a separate application such as the data management layer 2724. In some embodiments, the extractors 2722 may include a PI extractor which is configured to extract data from a PI data management system. For example, PI extractor may be a Cognite PI extractor that connects to the OSISoft PI Data Archive and detects and streams time series data into Cognite Data Fusion (CDF) in near real-time. In parallel, the extractor ingests historical data (backfill) to make all time series available in CDF. The PI points in the PI Data Archive correspond to the time series in CDF. In some embodiments, the extractors 2722 may include a custom extractor. Custom extractors may be scripts or tools that source data from unconventional data sources like a custom database or a SAAS API and transform it to a form that can be loaded into the desired application or system such as the data management layer 2724. In some embodiments, the extractors 2722 may include a SQL extractor.

The data management layer 2724 may be configured to filter, process, and store the energy data ingested from the extractors 2722. Specifically, the data management layer 2724 may be a cloud-based industrial data platform that provides unified access to all types of industrial data sources. It enables users to store, integrate, process, and analyze all types of industrial data, including time series, event logs, files, and contextual data. The platform is designed to provide a unified view of industrial data to enable better decision-making, increased efficiency, and reduced operational costs. Specifically, the data management layer 2724 provides a range of tools and services to enable data processing and analysis, including data transformation, aggregation, and visualization. The data management layer 2724 is used in the energy manager system 2700 to store and process time series data received from one or more physical devices (e.g., production lines or other physical assets) associated with the manufacturing process. In some embodiments, the data management layer 2724 may be configured to contextualize the data received from the physical devices 2702 and store asset hierarchy references, which may be used to generate a KPI for the energy use of the manufacturing process.

In some embodiments, the data management layer 2724 may create and store and energy model. The energy model may be an explicit data model which includes an asset hierarchy describing the one or more assets involved in the manufacturing process and timeseries data associated with those assets. The assets associated with the manufacturing process are organized in hierarchies and connect related data from different resource types. The asset hierarchy may include, from the top down, an enterprise (e.g., company) who owns the asset, a region for the asset, a product created by the asset, a site where the asset is operated, an area where the asset is operated, the asset and then any sub-components associated with the asset. In some embodiments, the timeseries data may describe the energy/resource use or consumption for different components or assets. The time series resource type stores a series of data points in time order. Every timeseries may be connected to an asset, and each asset can connect to many timeseries resource types. In some embodiments, the timeseries data may be electrical data connected from an electrical meter (e.g., electric meter 2708). The electrical timeseries data may be divided into individual datasets for a sub-component of the asset. For example, a production line (e.g., asset) may include an oven. The electrical timeseries data may include data about the power consumption and demand specifically for the oven. A user of the energy manager application may link the data specifically about the oven to the asset sub-component in the asset hierarchy. This process of linking timeseries data with their relevant assets and subcomponents may be referred to as data mapping. In some embodiments, the timeseries data may be non-electrical data collected from a non-electrical meter (e.g., non-electric meter 2706). Similar to the electric timeseries data, the non-electric timeseries can be data mapped to relevant assets and sub-components. In some embodiments, the timeseries data may be production data collected from a production sensor (e.g., production sensor 2710). Similar to the electric timeseries data, the non-electric timeseries can be data mapped to relevant assets and sub-components. In some embodiments, the timeseries data may be weather data received from a third party source.

In some embodiments, the data management layer 2724 may be configured to contextualize the data received from the physical devices 2702 and store asset hierarchy references, which may be used to generate a KPI for the energy use of the manufacturing process. In other embodiments, the edge data integration layer 2712 may be configured to contextualize the data from the physical devices 2702. The data management layer 2724 is designed to be scalable and can handle large volumes of data. In some embodiments, contextualizing the data may include data mapping which transforms data into a standardized schema. The data management layer 2724 may be further configured to share the energy data which it has filtered, processed, and/or contextualized with the application layer 2726.

The application layer 2726 includes an energy management application backend 2728 and energy management application frontend 2730. The energy management application backend 2728 may be configured to communicate with the data management layer 2724 to fetch and store the energy data to be displayed by the energy management application frontend 2730. In some embodiment, the energy management application backend 2728 would also integrate with third party services like a weather API 2736, a utility rate 2740, and emission factors 2742 to fetch the relevant data from these third-party resources to be displayed to a user 2734. In some embodiments, the energy management application backend 2728 may be integrated with one or more open APIs 2738. An open API may be defined as a publicly available application programming interface that provides access to software applications or web services. The open API 2738 allows the energy management application backend 2728 to receive data from a variety of third-party sources which may have relevant information for the energy management system 2700. For example, the energy management application backend 2728 may receive the emission factors 2742 through the open API 2738. In some embodiments, the energy management application backend 2728 would also integrate with third party sustainability management platforms (e.g., Microsoft Sustainability Manager) to provide the insights determined by the data management layer 2724 to the third party. In some embodiments, the energy management application backend 2728 may include an application database 2732. The application database 2732 may be a fully managed relational database service built for the cloud. Applications with the flexibility of a multi-model database that scales to meet demand can be built with the application database 2732. In some embodiments, the application database 2732 may be an Azure SQL database. In the energy management application, the application database 2732 may be configured to store assets, tag mapping, configuration, and alerts and notification event details related to energy management application. In some embodiments, the utility rates 2740 may be configured for each manufacturing plant. The utility rates 2740 is stored in the application database 2732. The utility rates 2740 will be valid for all assets at the manufacturing plant and used for generating relevant KPIs for the manufacturing plant. The process for generating the energy KPIs is described in more detail below with respect to FIG. 28.

The energy management application frontend 2730 is a user interface layer which is configured to display a dashboard of the energy data to the user 2734. The user 2734 can interact with the energy management application frontend 2730 to configure settings for the application and also select what data they would like to see.

Figure 28:
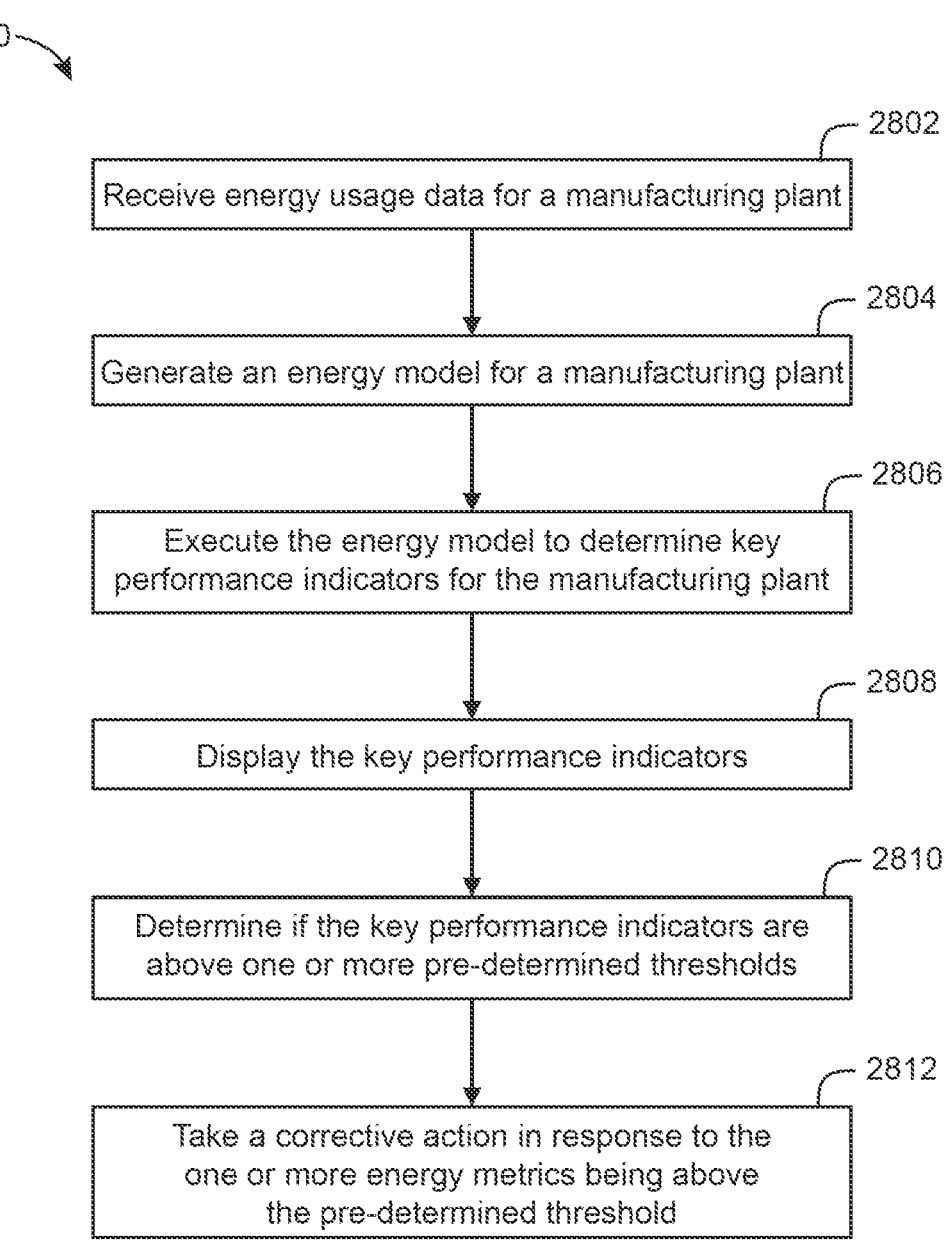
FIG. 28 is a flow diagram of a method implemented by the energy management system of FIG. 27, according to some embodiments.
Figure 29A:
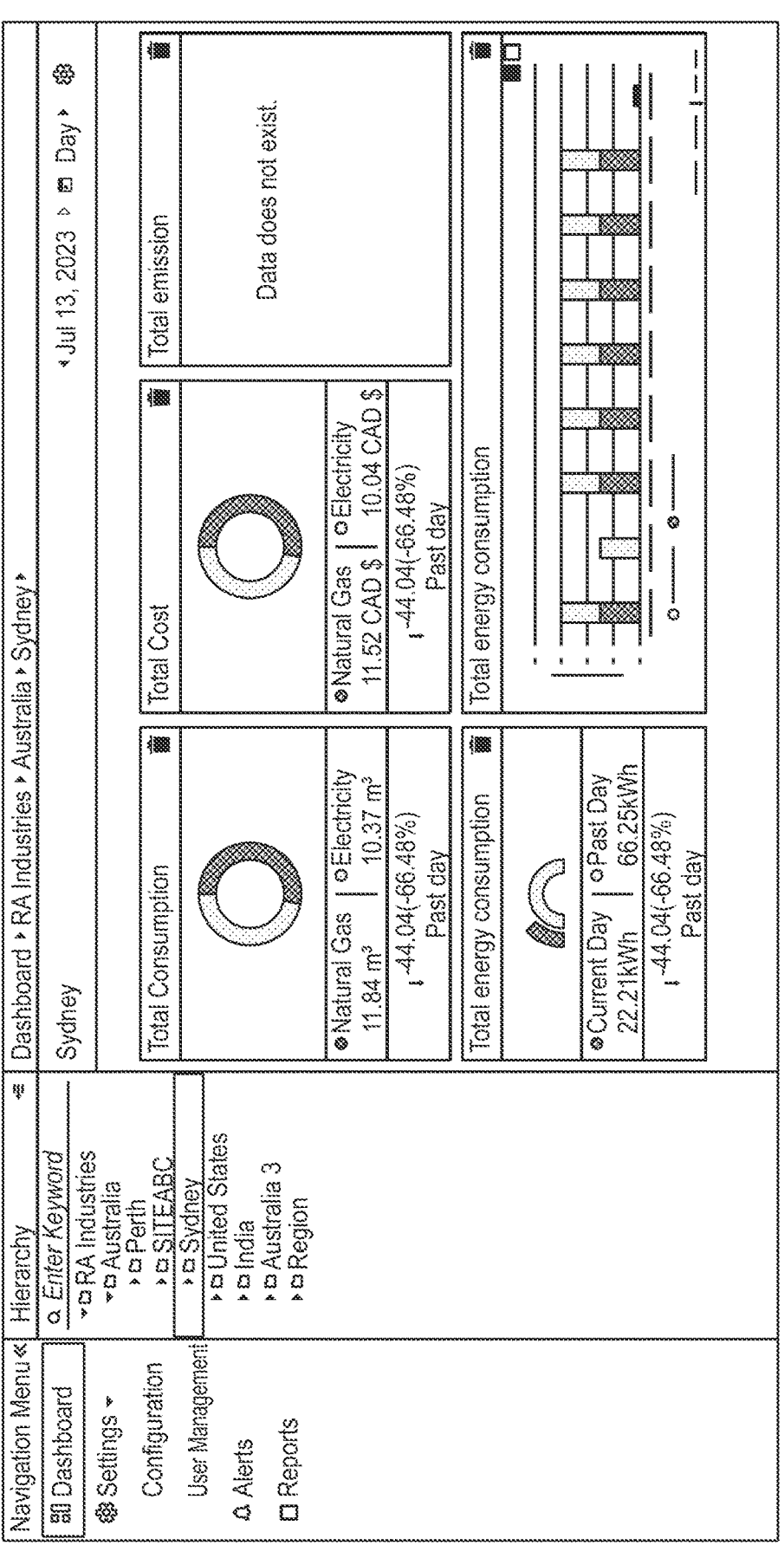
FIGS. 29A-29B show an example user interface displaying various dashboards and graphical illustrations produced the energy management system of FIG. 28, according to some embodiments.
Figure 29B:
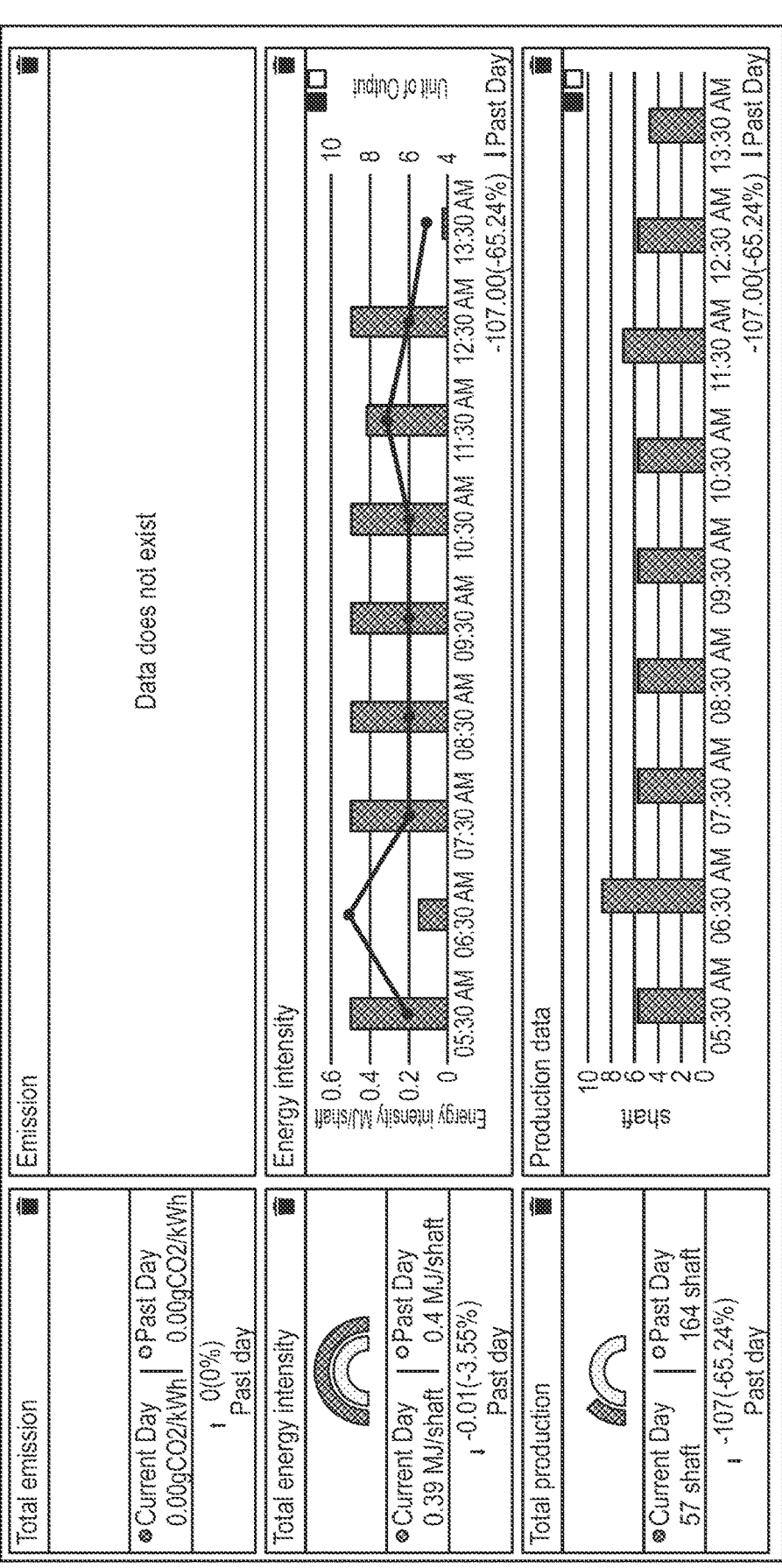

Referring now to FIG. 28, a method 2800 for generating one or more KPIs describing energy use within a manufacturing plant is shown according to an exemplary embodiment. In some embodiments, the method 2800 may be performed by the energy management system 2700.

The method 2800 begins at step 2802 where energy usage data is received. As described above, energy usage data may be received from the electric meter 2708, the non-electric meter 2706, and the production sensor 2710. In some embodiments, the energy usage data includes an electricity consumption and demand, a water consumption and demand, a gas consumption and demand, and a number of produced units.

The method 280 then proceeds to step 2804 where an energy model for a manufacturing plant is generated. In some embodiments, the energy model may be generated by the data management layer 2724. As described above, the energy model is an explicit data model which includes an asset hierarchy describing the one or more assets involved in the manufacturing process and timeseries data associated with those assets. In some embodiments, the timeseries data may include electrical timeseries data (e.g., electricity demand, electricity consumption, etc.), non-electrical timeseries data (e.g., water consumption, gas consumption, etc.), production timeseries data (e.g., number of units produced, etc.), and weather time series data.

The method 2800 continues to step 2808 where the energy model is executed to determine one or more KPIs for manufacturing plant based on the timeseries data. Specifically, the energy model ingests the tagged timeseries data for energy use associated with a given unit/asset which are mapped within the application. Based on the timeseries data, the energy model determines the energy mass balance based on standardized chemical equations stored in the model. In some embodiments, production timeseries tags that show how much of a given product was made in a given unit/asset over a period of time is also ingested by the energy model. Using the unit/asset and time frame as a framework, the energy model can determine energy use/demand per production units/rates. In some embodiments, the energy model generates an energy demand KPI, an energy consumption KPI, a cost energy KPI, a carbon emissions KPI, and a production unit KPI. The energy demand KPI describes the amount of energy an asset requires at a single moment in time. The energy consumption KPI describes the amount of electricity an asset uses over a period of time. The cost energy KPI describes a monetary cost of the asset based on a cost factor. The carbon emissions KPI describes an amount of emissions produced by the energy consumption of the manufacturing plant and is based on an emissions factor. The production unit KPI describes the amount units produced by the manufacturing plant. In some embodiments, the data model allows the system to compute energy-related KPIs (demand, consumption, intensity, emissions, costs) specifically as the KPIs relate to the various parts of the enterprise. This feature enables users to map and analyze data to the specific place in the enterprise, facility, line, and equipment which facilitates more precise analysis and comparison.

In some embodiments, the KPIs may be generated by the data management layer 2724. In some embodiments, the KPIs may be generated, on-demand, using a combine data API. Specifically, the combine data KPI may take timeseries data as an input with the mathematical expression, apply the mathematical expression to the input timeseries data and generates a new timeseries which reflects the KPI. For example, for generating the carbon emission KPI, the energy consumption timeseries data may be multiplied by an emission factor. The advantage of performing KPI generations on-demand versus at real-time is that it requires less storage and less processing power, thus reducing the overall cost. While generating and storing all KPI during data ingestion all data needs to be processed and stored. In contrast, when doing on-demand KPI generation, only the base timeseries data is stored and KPIs are only generated based on when they need to be displayed on the user interface (e.g., when the user requests to view certain KPIs).

The method 2800 continues to step 2808 where the KPIs generated at step 2806 are displayed to a user. Particularly, the KPIs may be displayed by the energy management application frontend 2730. The KPIs may be displayed on one or more dashboards. For example, if the user wants to view the energy use for a manufacturing process on an enterprise/region level, the user may select which enterprise/region they would like to view, the granularity they would like to see, and a date range for the data they would like to view. In this case, the dashboard would display total consumption, energy consumption per site, total emissions, emissions per site, total cost, energy cost per site, energy intensity per site, and energy production per site. For example, as shown in FIGS. 32A-32B, an example user interface 3200 displaying such a dashboard is shown.

The method 2800 continues to step 2810 where it is determined if the key performance indicators determined at step 2806 are above one or more pre-determined thresholds. For example, there may be pre-determined thresholds which set a limit for energy costs, energy demand, energy consumption, and emission levels. If the KPIs generated at step 2806 are above these pre-determined thresholds, then the energy management system 2700 may take a corrective action to address these KPIs being above the predetermined threshold at step 2812. In some embodiments, the corrective action may be automatically implemented control action for a piece of equipment to lower an energy usage amount. In other embodiments, the corrective action may be manually taken by manufacturing plant personnel. For example, the plurality of production lines at a facility may be evaluated to determine which lines perform the best and which perform the worst. This analysis can be used for the improvement and optimization of energy usage within a plant. In some embodiments, the corrective action may including highlighting and displaying unexpected energy usage such as when equipment is unnecessarily kept in operation. In some embodiments, the corrective action may include generating a notification alert which is sent to users when a target energy consumption amount is about to exceed a threshold so that the operation personnel can proactively reduce usage in order to avoid peak usage cost penalties.

Figure 30:
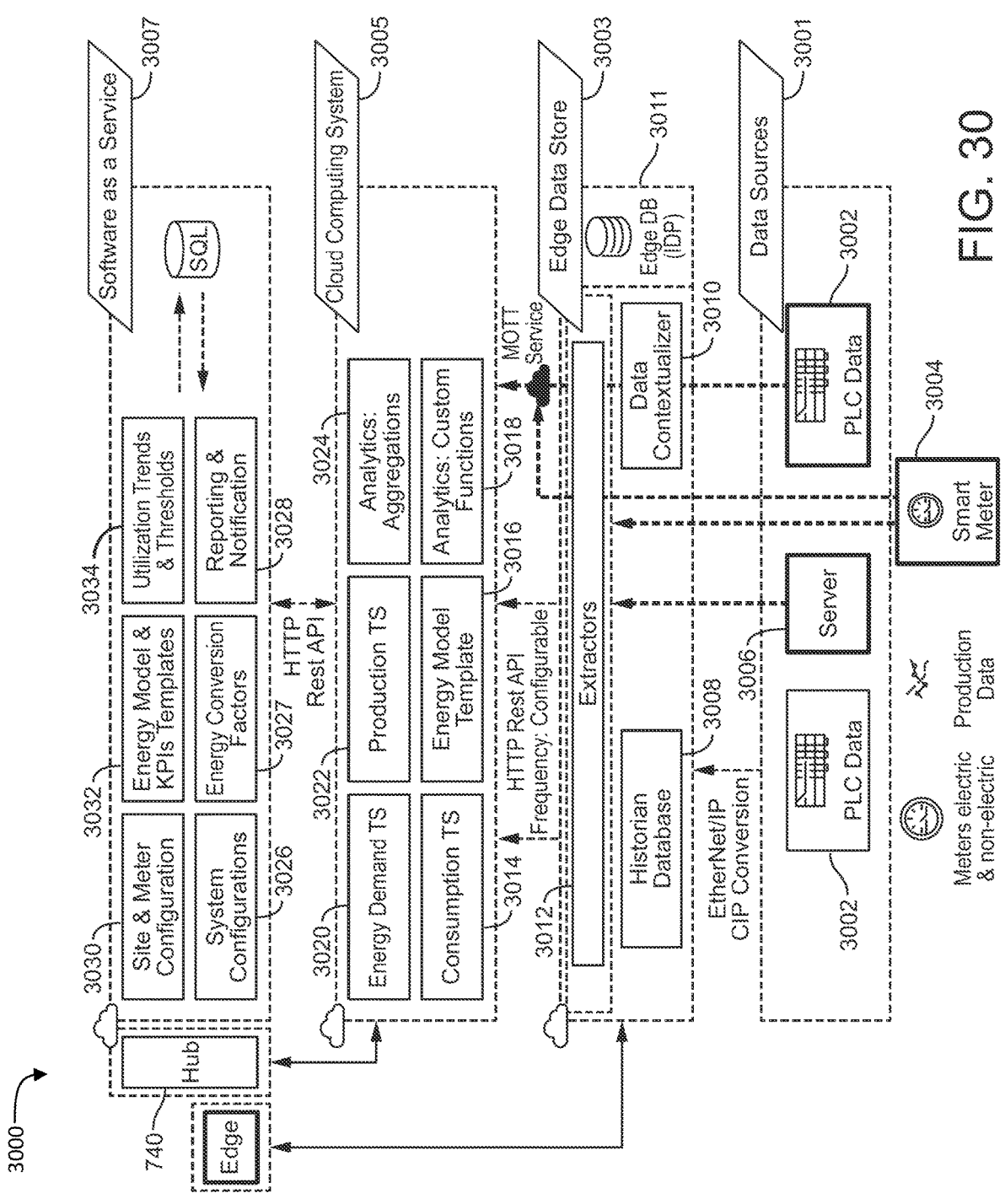
FIG. 30 is a block diagram of the system architecture of the energy management system of FIG. 28, according to some embodiments.

Referring now to FIG. 30, a block diagram of a system architecture 3000 of the energy management system 2700 is shown according to an exemplary embodiment. In some embodiments, includes four portions that comprise the system architecture 3000. Specifically, the system architecture includes data sources 3001, edge data store 3003, cloud computing system 3005, and a software as a service (SAAS) application 3007.

The data sources 3007 is a data layer that includes one or more data sources that are collected on-premises at a manufacturing plant. The data may includes timeseries data from one or more meters or sensors associated with a manufacturing plant. For example, the data may be received from an electric meter, a non-electric meter, or a production sensor. In some embodiments, the data may also be received from a smart meter 3004. A smart meter is similar to a traditional meter in that it measures and records energy consumption data. However, the smart meter is a digital device that can communicate remotely with a third party through a cloud network. For example, the smart meter may communicate data directly with the cloud computing system 3005. In some embodiments, the data sources 3001 may include plant system data 3002. The plant system data 3002 may be a connectivity platform that includes data relating to control mechanisms for any of the plant components within a manufacturing plant (e.g., distributed control system (DCS), programmable logic controllers (PLC), etc.). In some embodiments, the data sources 3001 may include server 3006. The server 3006 may store industrial automation data. The server 3006 may leverage Open Platform Communications (e.g., the automation industry's standard for interoperability) and IT-centric communication protocols (e.g., SNMP, ODBC, and web services) to provide a single source for industrial data.

The data collected at the data sources 3001 is sent to the edge data store 3003 through a network connection. In some embodiments, the network connection may include an Ethernet card and port for sending and receiving data via an Ethernet-based communications network and/or a Wi-Fi transceiver for communicating via a wireless communications network. The data sources 1802 may be structured to communicate with the edge data store 2401 via local area networks or wide area networks (e.g., the Internet) and may use a variety of communications protocols (e.g., IP, LON, Bluetooth, ZigBee, radio, cellular, near field communication).

The edge data store 3003 is another data storage layer within the system architecture 3000 where the data received from the on-premises manufacturing components (e.g., physical devices) is ingested and stored on the edge. The edge data store 3003 may be configured to store data which may be used for applications on the edge which is closer to the applications. Storing data on the edge, such as in the edge data store 3003, reduces latency by storing the data closer to the applications. In some embodiments, the edge data store 3003 includes one or more historian databases 3008. In some embodiments, the historian database 3008 stores the data received from the data sources 3001. In some embodiments, the historian database 3008 contextualizes the data received from the data sources 3001 by associating process attributes to physical components in a manufacturing plant or facility. In other embodiments, the edge data store 3003 may include a data contextualizer 3010 which contextualizes the data received from the data sources 3001 instead of the historian database 3008.

In some embodiments, the edge data store 3003 may include an edge database 3011. In some embodiments, the edge database 3011 may facilitate edge computing. Edge computing is a decentralized topology for storing and processing data as close as possible to the data sources 3001, at the edge of the network. The energy management system 2700 relies on durable data availability in order to provide effective analysis and reporting of energy parameters. Some of these parameters generate values at a second or subsecond frequency. The energy management system 2700 requires all values of the parameters to generate analysis for different time intervals e.g., total daily consumption, average daily consumption for last month. Since this data is captured by on-premises (edge) data integration systems and sent over to the edge data store 3003 via external network, there is a possibility of network issues causing data to get lost. Moreover, several on-premises data integration systems are streaming in nature and do not keep a local copy of data. The energy management system 2700 in a situation of missing data points will report incorrect metrices. The edge database 3011 is purposefully set up as a solution to prevent these data loss situations by providing a fail-safe mechanism for data capture in case of unforeseen network and connectivity issues.

The edge data store 3003 may also include extractors 3012. In some embodiments, the extractors 3012 may be configured to extract data from a database such as the historian database 3008. In some embodiments, data extraction may be implemented by a script or a tool that has access the database and is configured to copy or transfer data from the database (such as the historian database 3008) to a separate application such as the cloud computing system 3005. In some embodiments, the extractors 3012 may include a PI extractor which is configured to extract data from a PI data management system. For example, PI extractor may be a Cognite PI extractor that connects to the OSISoft PI Data Archive and detects and streams time series data into Cognite Data Fusion (CDF) in near real-time. In parallel, the extractor ingests historical data (backfill) to make all time series available in CDF. The PI points in the PI Data Archive correspond to the time series in CDF. In some embodiments, the extractors 3012 may include a custom extractor. Custom extractors may be scripts or tools that source data from unconventional data sources like a custom database or a SAAS API and transform it to a form that can be loaded into the desired application or system such as the cloud computing system 3005. In some embodiments, the extractors 3012 may include a SQL extractor. The extracted data from the edge data store 3003 may sent to the cloud computing system 3005 by a Rest API call.

The cloud computing system 3005 may be configured to filter, process, and store the timeseries data received from the extractors 3012. The cloud computing system 3005 may include a consumption timeseries module 3014, an energy demand timeseries module 3020, a production timeseries module 3022, an energy model template 3016, a custom function analytics module 3018, and an aggregation analytics module 3024. The consumption timeseries module 3014 may be configured to store the energy consumption timeseries received from the edge data store 3003. The energy demand timeseries module 3020 may be configured to store the energy demand timeseries data received from the edge data store 3003. The production timeseries module 3022 may be configured to store the production timeseries data received from the edge data store 3003. In some embodiments, the energy model template 3016 is an empty template of an energy data model. As mentioned above, the energy model includes an asset hierarchy describing the one or more assets involved in the manufacturing process and timeseries data associated with those assets. The asset hierarchy may be configured or filled out by a user to define the specific assets involved in their particular manufacturing plant.

In some embodiments, the custom function analytics module 3018 may be configured to implement one or more custom algorithms. The energy management system 2700 has several pre-packaged algorithms to analyze the data related to energy, water, air, etc. These algorithms are not available as part of an open source or packaged library and have been custom created to be used within the scope of the energy management system 2700. Some custom functions are monthly all-site water consumption, weighted energy consumption between regions etc. In some embodiments, the energy management system 2700 may also provide an interface for a user to write their own custom algorithms in Energy Manager. In some embodiments, the aggregation analytics module 3024 may be a custom function which primarily creates data aggregations at different levels (e.g., all air meters across sites, all water meters in a region, total energy consumption in the last 1 year etc.).

The data processed and stored by the cloud computing system 3005 may be sent to the SAAS application 3007 through a REST API. The SAAS application may include a plurality of modules which are configured to generate the energy use KPIs and hub 740 for presenting the KPIs to a user. Specifically, the plurality of modules may include a site and meter configuration module 3030, a system configuration module 3026, an energy model and KPI template module 3032, an energy conversion factors module 3027, a reporting and notification module 3028, and a utilization trends and threshold module 3034.

In some embodiments, the site and meter configuration module 3030 may be configured to provide the user with capabilities to configure (e.g., set up) or customize an asset hierarchy for a site. In some embodiments, the site and meter configuration module 3030 may be configured to set up the settings of a meter within an asset hierarchy. This asset hierarchy may be added to an energy model for the site. In some embodiments, the system configurations module 3026 may be configured to set up the settings for the SAAS application 3007. In some embodiments, the energy model and KPIs templates 3032 may be configured to fill out the energy model template from cloud computing system 3005 with the relevant asset hierarchy and timeseries data. In some embodiments, the energy model and KPIs template module 3032 may also be configured to determine energy KPIs as described above.

In some embodiments, the energy conversion factors module 3027 may be configured to facilitate the conversion of energy data in different units and forms to whatever standardized unit the user desires. In some embodiments, the utilization trends and thresholds 3034 may be configured to determine the energy utilization trends within a manufacturing plant. Further, the utilization trends and thresholds 3034 may store one or more pre-determined thresholds which the KPIs may be compared to determine whether a corrective action should be taken.

In some embodiments, the reporting and notification module 3028 may be configured to provide one or more reports including the energy KPIs. The report may include energy use data and an assessment of the energy KPIs. In some embodiments, the reporting and notification module 3027 may be configured to facilitate sending notifications to a user regarding the energy KPI.

In some embodiments, the hub 740 may be the front end of the application that is provided to the user. The hub 740 may be configured to authenticate and authorize users. Further, the hub 740 may be configured to generate and present graphical user interfaces to a user.

Figure 31:
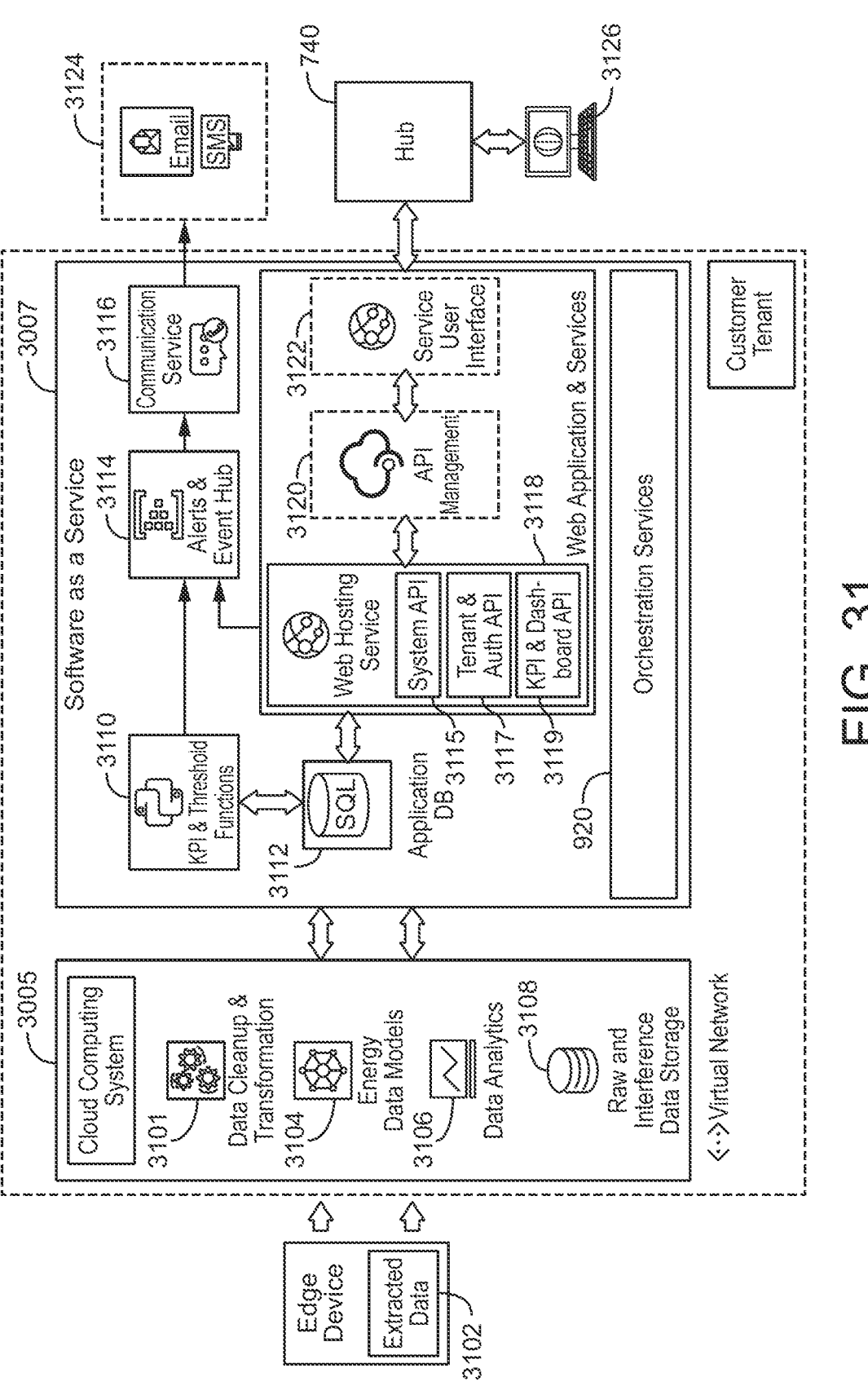
FIG. 31 is a block diagram of the application architecture of the energy management system of FIG. 28, according to some embodiments.

Referring now to FIG. 31, a block diagram of the application architecture 3100 of the energy management system 2700 is shown, according to an exemplary embodiment. The application architecture 3100 shows the architecture (e.g., back-end) of an application which gives the user access to the energy management system 2700.

The application architecture 3100 includes extracted data 3102. As described above, the extracted data 3202 may be received from the edge data store 3003. In some embodiments, the extracted data 3202 may be contextualized and transformed by data clean-up and transformation 3101. The extracted data 3202 may be sent to the cloud computing system 3005 where the data is processed. The cloud computing system 3005 also stores the energy data models 3104, the data analytics 3106, and the extracted data 3602 in data storage 3108. The data stored in the cloud computing system 3005 may be sent to the SAAS application 3007.

The SAAS application 3007 may be configured to ingest the contextualized data and energy data models 3104 to generate KPIs for one or more batches produced by a manufacturing process. Specifically, the SAAS application 3007 includes KPI and threshold calculation module 3110 which is configured to generate energy KPIs for the manufacturing plant. As described above, the energy data models 3104 may be executed to generate the KPIs for the manufacturing plant. For example, one or more KPIs may be generated which describe the performance of a batch may include an energy demand KPI, an energy consumption KPI, a cost energy KPI, a carbon emissions KPI, and a production unit KPI. Any predictions or KPIs generated by the KPI calculation module 3110 may be stored in an application database 2608. The generated KPIs may be sent to an alerts and events hub 3114.

The alerts and events hub 3114 can represent a pipeline to stream or forward traffic from the KPI and threshold calculation module 3110 to a communication service 3116. For example, the alerts and events hub 3114 can be an intermediary device between KPI and threshold calculation module 3110 and the communication service 3116. In some embodiments, the communication service 3116 provides multichannel communication APIs for facilitating communication between the SAAS application 3007 and any user devices. Specifically, the communication service 3116 may facilitate communication by adding email and SMS communication with user devices 3124.

The SAAS application 3007 includes one or more web applications and services including multiple app service APIs 3118, an API management 3120, and a user interface framework 3122. In some embodiments, the application database 3112 is communicably coupled with the app service APIs 3118. The app service APIs may include a system API 3115, a tenant and authentication API 3115, and a KPI and dashboard API 3119. The system API 3115 may be configured to assist with deploying the SAAS application 3007. Specifically, the system API 3115 provides a service to centrally manage application settings and feature flags. Some software as a service applications that run in a cloud environment, such as software as a service application 3007, may have components which are distributed. Distributing configuration settings in a cloud across these components can lead to hard-to-troubleshoot errors during an application deployment. The system API 3115 can store all the settings for a software as a service application in one place to avoid this issue. The tenant and authentication API 3117 may be configured to authenticate users who would like to access the SAAS application 3007. In some embodiments, the tenant and authentication API 3119 may be configured to manage a multi-tenant application which serves and provides access for multiple tenants. The KPI and dashboard API 3119 may be configured to facilitate the generation of KPIs and presentation on one or more dashboards.

The API management 3120 is a hybrid, multi-cloud management platform for APIs across one or more environments. As a platform-as-a-service, the API management 3120 supports the complete API lifecycle. Specifically, the API management 3120 controls operations of the system API 3115, the tenant and authentication API 3117, the KPI and dashboard API 3119 and any other APIs associated with the SAAS application 3007.

The user interface framework 3122 may be a JavaScript based framework for developing applications and any associated user interfaces. The user interface framework 3122 may be used to develop user interfaces for the SAAS application 3007. The developed user interfaces may be sent to the hub 740 which is the front end application and displayed on a user device 3126. In some embodiments, the user device may be any type of computing device such as a laptop, a mobile device, a tablet, etc.

The SAAS application 3007 may also include data orchestration services 3120. In some embodiments, the data orchestration services 3120 may a cloud service that you can use to create data analytics and create data transformations from unorganized data. The orchestration services 3120 does not perform the data transformations itself, but instead calls on different services to perform different tasks in order to facilitate the data transformation.

Configuration of the Exemplary Embodiments

As utilized herein with respect to numerical ranges, the terms "approximately," "about," "substantially," and similar terms generally mean+/−10% of the disclosed values. When the terms "approximately," "about," "substantially," and similar terms are applied to a structural feature (e.g., to describe its shape, size, orientation, direction, etc.), these terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein. The term "processing circuit" is not limited to a single physical device but rather can encompass a cloud platform or multiple devices that each perform one or more steps or operations described herein. The processing circuit may include any collection of components that are capable of performing the operations described herein, regardless of whether they are located on-site, in the cloud, distributed across multiple physical devices/locations, etc.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products including machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the systems and components shown in the various exemplary embodiments is illustrative only. Additionally, any element disclosed in one embodiment may be incorporated or utilized with any other embodiment disclosed herein. For example, the techniques and controls of the control signal generator 318 of the exemplary embodiment shown in at least FIG. 12 may be incorporated in the segment controllers 50 of the exemplary embodiment shown in at least FIG. 8. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A system for monitoring and controlling an industrial process using a data model extensible to different industry applications, the system comprising one or more memory devices configured to store instructions, that, when executed by the one or more processors, cause the one or more processors to:

receive data describing the industrial process from one or more data sources in a first format;

contextualize and transform the data by determining one or more tags for the data, the one or more tags comprising context information describing characteristics of entities involved in the industrial process and relationships between the entities;

generate a data model describing the industrial process based on the one or more tags, wherein the data model is a graph data structure comprising:

a first plurality of nodes representing entities associated with the industrial process; and a first plurality of edges connecting the first plurality of nodes and describing relationships between the first plurality of nodes, wherein at least one of the first plurality of nodes or the first plurality of edges are generated using the context information;

receive a first indication from a user indicating a first industry application to which the data model will be applied; and extend the data model to include a second plurality of nodes representing entities associated with the first industry application and a second plurality of edges connecting the second plurality of nodes and describing relationships between the second plurality of nodes.

2. The system of claim 1, wherein the data from the one or more data sources include at least one of timeseries data, industrial system data, or data describing control mechanisms for the industrial process.

3. The system of claim 1, wherein the one or more processors determine the one or more tags by receiving a string of characters from the one or more data sources and automatically determining the one or more tags for the data based on the string of characters.

4. The system of claim 1, wherein the data model is generated based on a rule set allowing customization for the different industry applications.

5. The system of claim 1, wherein the first industry application comprises at least one of an asset intelligence application, a batch performance analytics application, or an energy manager application.

6. The system of claim 1, wherein each of the plurality of first nodes and the plurality of second nodes includes at least one attribute, and wherein the at least one attribute is determined based the one or more tags.

7. The system of claim 1, wherein the one or more processors are further configured to:

receive an indication from the user regarding a second industry application to which the data model will be applied; and extend the data model to include a third plurality of nodes representing entities associated with the second industry application and a third plurality of edges connecting the third plurality of nodes and describing the relationship between the third plurality of nodes.

8. The system of claim 7, wherein the one or more processors are further configured to execute the data model to generate one or more key performance indicators across both the first industry application and the second industry application.

9. A method for monitoring and controlling an industrial process using a data model extensible to different industry applications, the method comprising:

receiving data describing the industrial process from one or more data sources in a first format;

contextualizing and transform the data by determining one or more tags for the data, the one or more tags comprising context information describing characteristics of entities involved in the industrial process and relationships between the entities;

generating a data model describing the industrial process based on the one or more tags, wherein the data model is a graph data structure comprising:

a first plurality of nodes representing entities associated with the industrial process; and a first plurality of edges connecting the first plurality of nodes and describing relationships between the first plurality of nodes, wherein at least one of the first plurality of nodes or the first plurality of edges are generated using the context information;

receiving a first indication from a user indicating a first industry application to which the data model will be applied; and extending the data model to include a second plurality of nodes representing entities associated with the first industry application and a second plurality of edges connecting the second plurality of nodes and describing relationships between the second plurality of nodes.

10. The method of claim 9, wherein the data from the one or more data sources include at least one of timeseries data, industrial system data, or data describing control mechanisms for the industrial process.

11. The method of claim 9, further comprising determining the one or more tags by receiving a string of characters from the one or more data sources and automatically determining the one or more tags for the data based on the string of characters.

12. The method of claim 9, wherein the data model is generated based on a rule set allowing customization for the different industry applications.

13. The method of claim 9, wherein the first industry application comprises at least one of an asset intelligence application, a batch performance analytics application, or an energy manager application.

14. The method of claim 9, wherein each of the plurality of first nodes and the plurality of second nodes includes at least one attribute, and wherein the at least one attribute is determined based the one or more tags.

15. The method of claim 9, further comprising:

receiving an indication from the user regarding a second industry application to which the data model will be applied; and extending the data model to include a third plurality of nodes representing entities associated with the second industry application and a third plurality of edges connecting the third plurality of nodes and describing the relationship between the third plurality of nodes.

16. The method of claim 15, further comprising executing the data model to generate one or more key performance indicators across both the first industry application and the second industry application.

17. A non-transitory computer readable medium having computer-executable instructions embodied therein that, when executed by at least one processor of a computing system, cause the computing system to perform operations, the operations comprising:

receiving data describing an industrial process from one or more data sources in a first format;

contextualizing and transform the data by determining one or more tags for the data, the one or more tags comprising context information describing characteristics of entities involved in the industrial process and relationships between the entities;

generating a data model describing the industrial process based on the one or more tags, wherein the data model is a graph data structure comprising:

a first plurality of nodes representing entities associated with the industrial process; and a first plurality of edges connecting the first plurality of nodes and describing relationships between the first plurality of nodes, wherein at least one of the first plurality of nodes or the first plurality of edges are generated using the context information;

receiving a first indication from a user indicating a first industry application to which the data model will be applied; and extending the data model to include a second plurality of nodes representing entities associated with the first industry application and a second plurality of edges connecting the second plurality of nodes and describing relationships between the second plurality of nodes.

18. The non-transitory computer readable medium of claim 17, the operations further comprising:

receiving an indication from the user regarding a second industry application to which the data model will be applied; and extending the data model to include a third plurality of nodes representing entities associated with the second industry application and a third plurality of edges connecting the third plurality of nodes and describing the relationship between the third plurality of nodes.

19. The non-transitory computer readable medium of claim 18, the operations further comprising: executing the data model to generate one or more key performance indicators across both the first industry application and the second industry application.

20. The non-transitory computer readable medium of claim 17, wherein the first industry application comprises at least one of an asset intelligence application, a batch performance analytics application, or an energy manager application.

*     *     *     *     *